US010998702B2

(12) United States Patent
Strong

(10) Patent No.: US 10,998,702 B2
(45) Date of Patent: May 4, 2021

(54) MODULAR LOW PROFILE RACEWAY TO PROVIDE POWER AND/OR DATA CONNECTIVITY

(71) Applicant: STRONG PRODUCTS GROUP, LTD., Dallas, TX (US)

(72) Inventor: Clinton Strong, Dallas, TX (US)

(73) Assignee: Legrand Connectrac, Dallas, TX (US)

( * ) Notice: Subject to any disclaimer, the term of this patent is extended or adjusted under 35 U.S.C. 154(b) by 0 days.

(21) Appl. No.: 16/583,231

(22) Filed: Sep. 25, 2019

(65) Prior Publication Data

US 2020/0099206 A1 Mar. 26, 2020

Related U.S. Application Data

(60) Provisional application No. 62/823,611, filed on Mar. 25, 2019, provisional application No. 62/737,094, filed on Sep. 26, 2018.

(51) Int. Cl.
| | | |
|---|---|---|
| *H01R 13/64* | (2006.01) | |
| *H02G 3/04* | (2006.01) | |
| *H01R 31/06* | (2006.01) | |
| *H01R 25/16* | (2006.01) | |
| *H02G 3/12* | (2006.01) | |
| *H02G 3/38* | (2006.01) | |

(52) U.S. Cl.
CPC ........... *H02G 3/0437* (2013.01); *H01R 13/64* (2013.01); *H01R 25/162* (2013.01); *H01R 25/164* (2013.01); *H01R 31/06* (2013.01); *H02G 3/0418* (2013.01); *H02G 3/0456* (2013.01); *H02G 3/128* (2013.01); *H02G 3/383* (2013.01)

(58) Field of Classification Search
CPC .. H02G 3/0437; H02G 3/0418; H02G 3/0456; H02G 3/128; H02G 3/383; H02G 3/0493; H01R 31/06; H01R 13/64; H01R 25/164; H01R 25/162
See application file for complete search history.

(56) References Cited

U.S. PATENT DOCUMENTS

| | | | | |
|---|---|---|---|---|
| 5,024,614 A * | 6/1991 | Dola | ................... | H02G 3/0431 174/486 |
| 5,516,298 A * | 5/1996 | Smith | ................... | A47B 21/06 439/131 |
| 5,685,113 A * | 11/1997 | Reuter | ................. | E04B 2/7422 174/651 |
| 6,437,244 B1 * | 8/2002 | Vander Velde | ...... | H02G 3/0418 174/101 |
| 6,459,038 B1 * | 10/2002 | Waszak | ............... | H02G 3/0608 174/135 |

(Continued)

*Primary Examiner* — Truc T Nguyen
(74) *Attorney, Agent, or Firm* — Ferguson Braswell Fraser & Kubasta PC; Elizabeth Philip Dahm; Kelly J. Kubasta

(57) ABSTRACT

In various implementations, a raceway may be provided that is capable of providing power and/or data connectivity to items (e.g., devices, articles of furniture, etc.) coupled to the raceway. The raceway may be low profile. The raceway may be disposed on floor and/or under floor. The raceway may include an integrated power housing. The raceway may include segments that are selected, as desired for an application configuration, and that are coupleable to each other or other components of the raceway (e.g., nodes, joints, etc.). The housing of component(s) of the raceway may include a base and wall(s) with at least curved section and at least one straight section.

20 Claims, 71 Drawing Sheets

(56) References Cited

U.S. PATENT DOCUMENTS

| | | | | |
|---|---|---|---|---|
| RE38,709 E * | 3/2005 | Gutgsell | ............... | H02G 3/0418 |
| | | | | 108/50.02 |
| 6,903,265 B1 * | 6/2005 | VanderVelde | ........ | H02G 3/0418 |
| | | | | 174/481 |
| 7,612,300 B2 * | 11/2009 | Owens | ................ | H02G 3/0437 |
| | | | | 174/480 |
| 7,829,797 B2 * | 11/2010 | VanderVelde | .......... | H02G 3/128 |
| | | | | 174/481 |
| 8,851,711 B2 * | 10/2014 | Ladewig | ............... | F21V 15/013 |
| | | | | 362/294 |
| 9,841,179 B2 * | 12/2017 | Williams | ............... | F21V 33/006 |
| 10,103,528 B2 * | 10/2018 | Lewinski | ................ | H02G 3/045 |
| 2003/0089515 A1 * | 5/2003 | Federspiel | ........... | H02G 3/0437 |
| | | | | 174/480 |
| 2008/0041623 A1 * | 2/2008 | Makwinski | ............ | H02G 3/128 |
| | | | | 174/481 |
| 2008/0280470 A1 * | 11/2008 | Byrne | .................... | H01R 31/06 |
| | | | | 439/215 |
| 2014/0179132 A1 * | 6/2014 | Byrne | ................. | H01R 25/162 |
| | | | | 439/92 |
| 2015/0294768 A1 * | 10/2015 | Sakaki | ............ | H01B 13/01209 |
| | | | | 174/68.3 |
| 2020/0099206 A1 * | 3/2020 | Strong | ................... | H01R 13/64 |

* cited by examiner

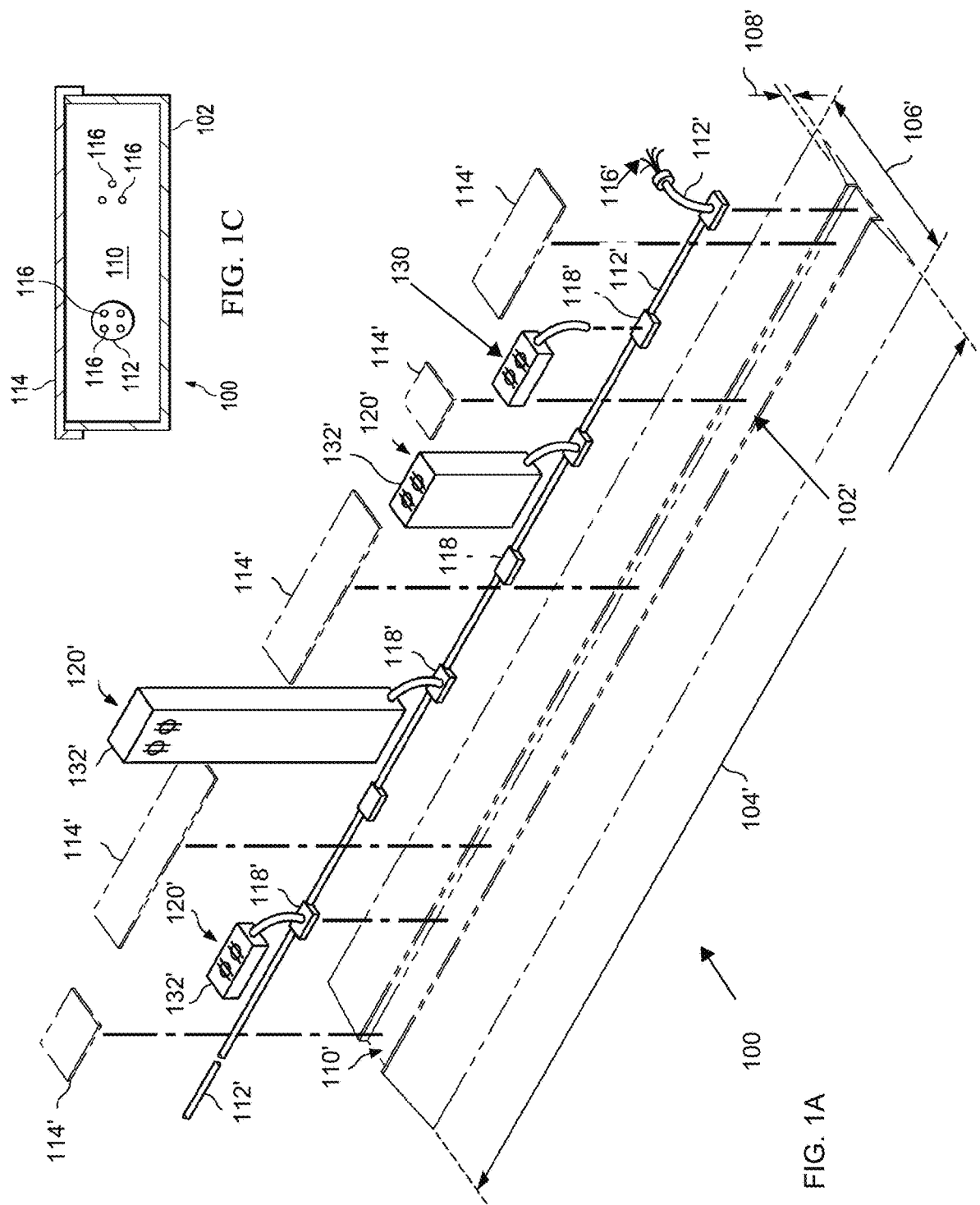

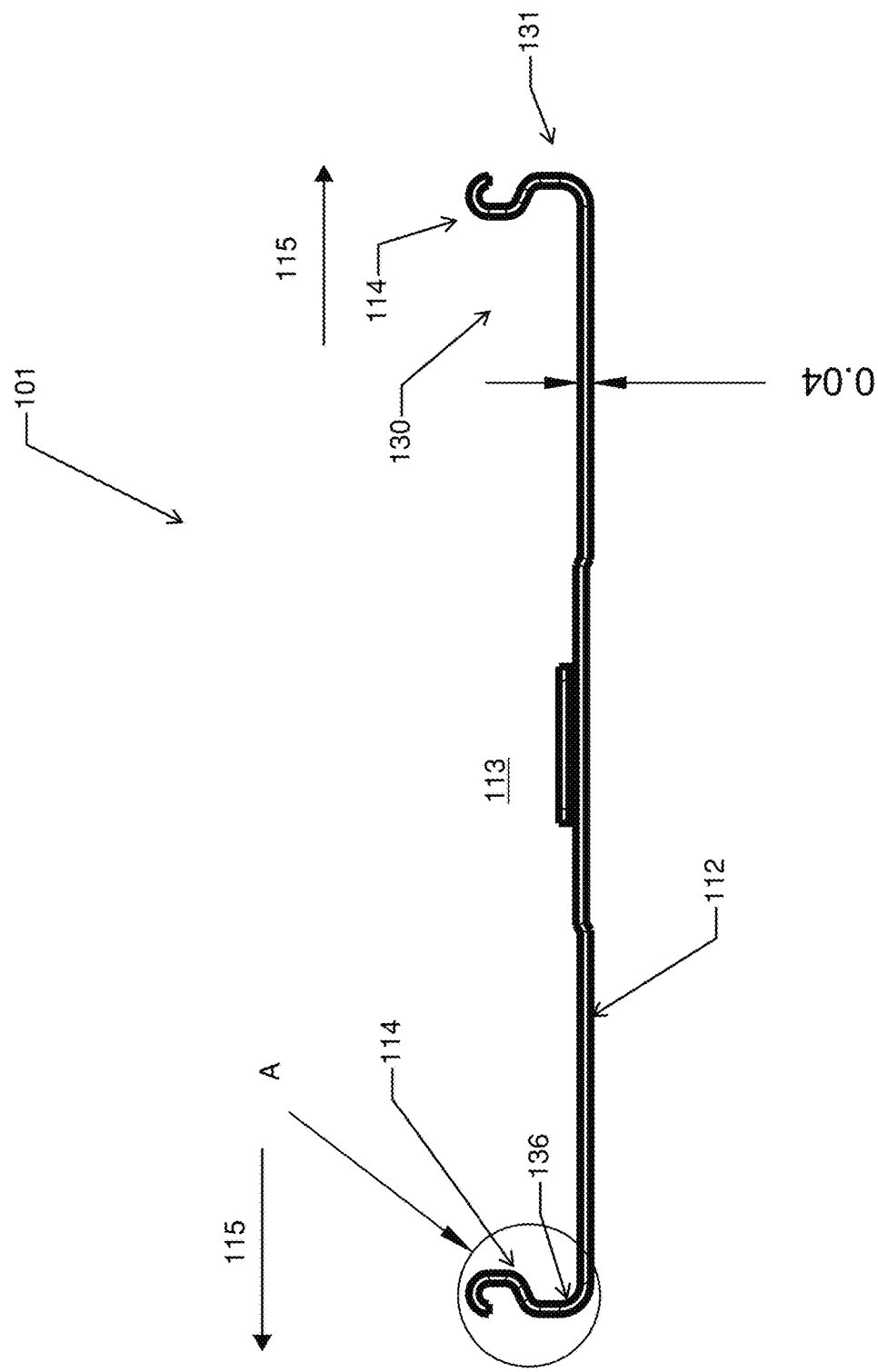

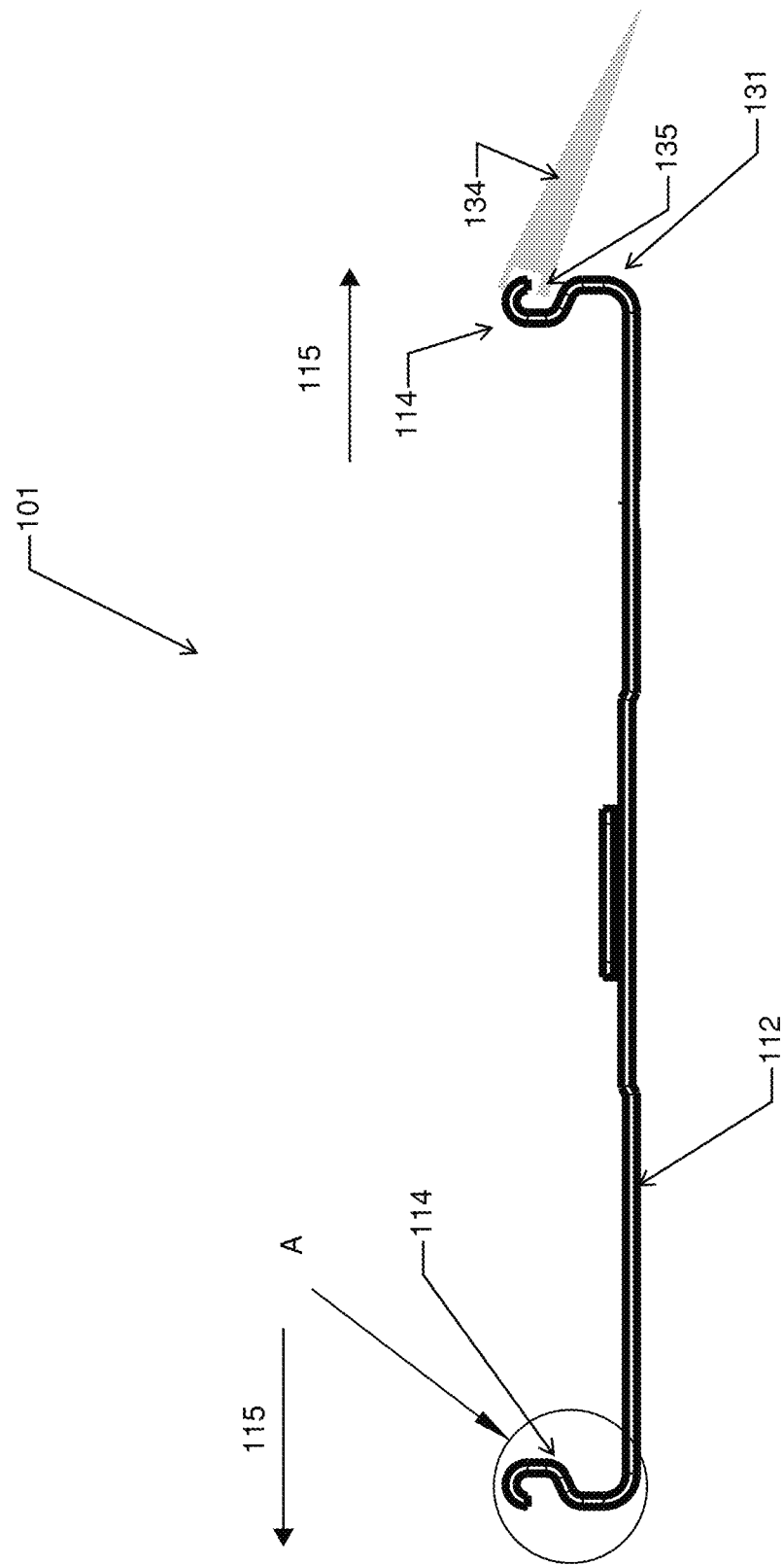

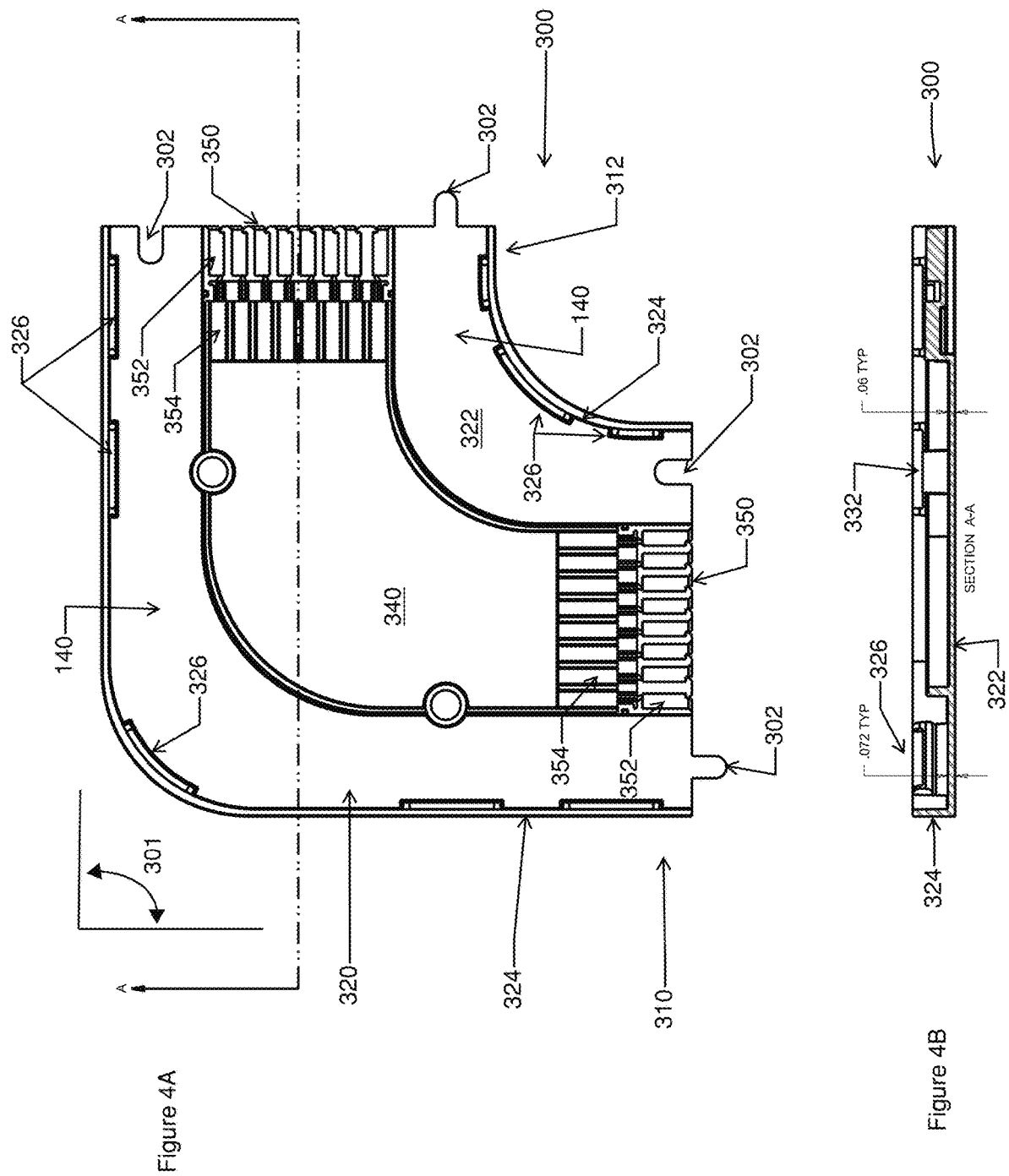

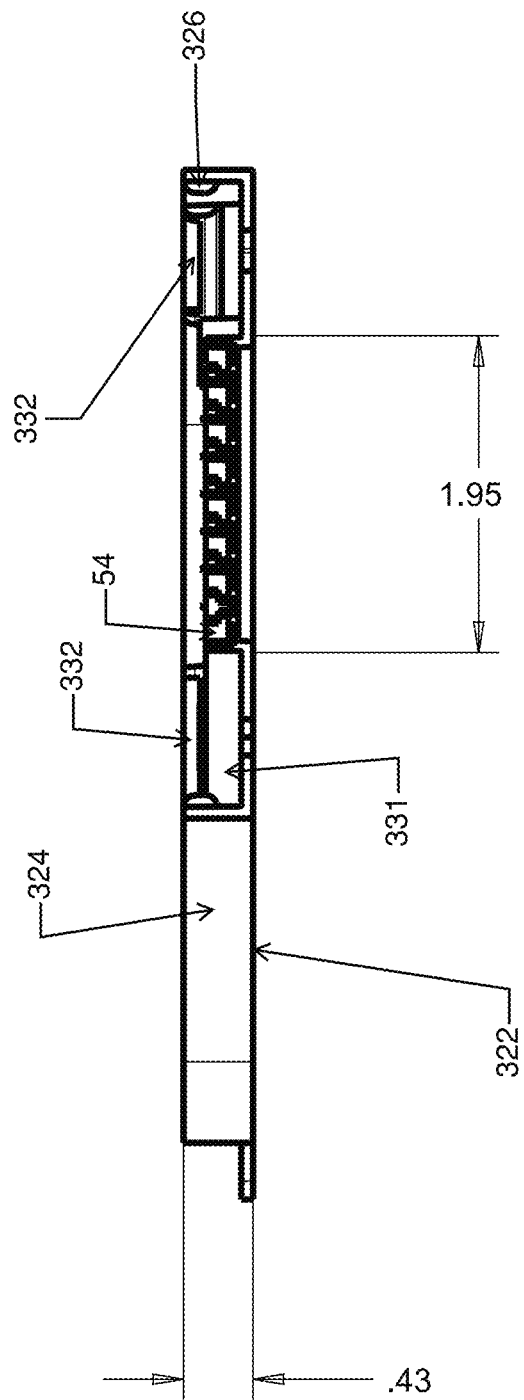

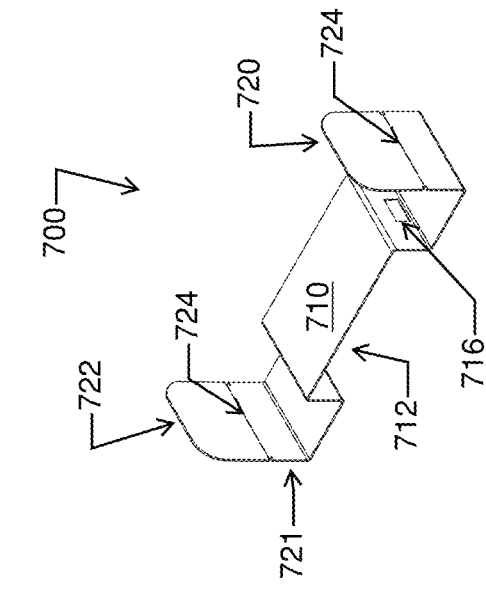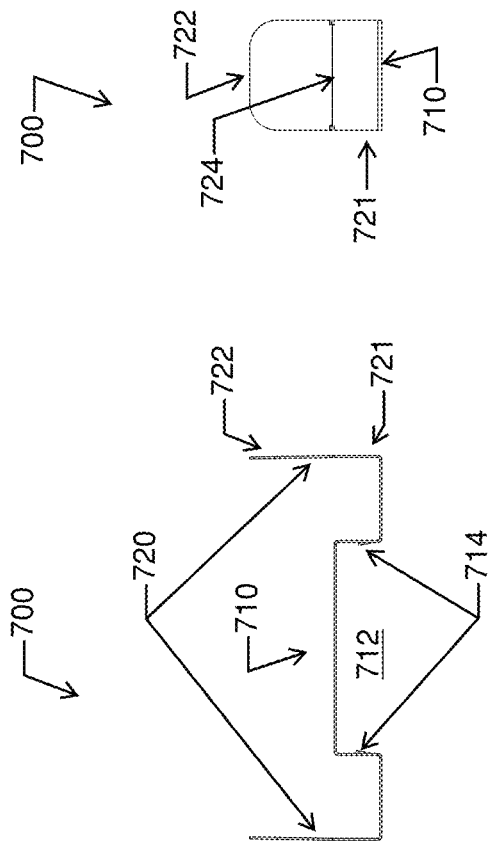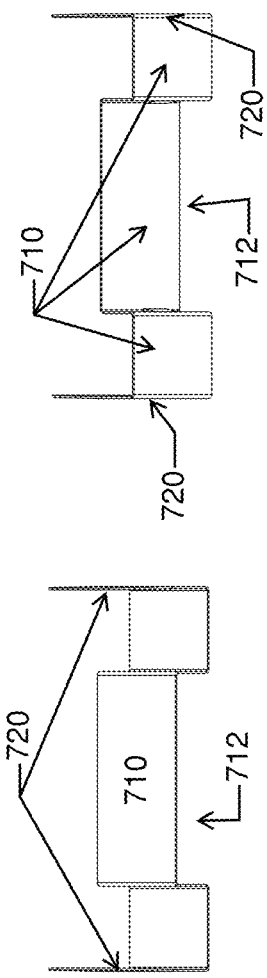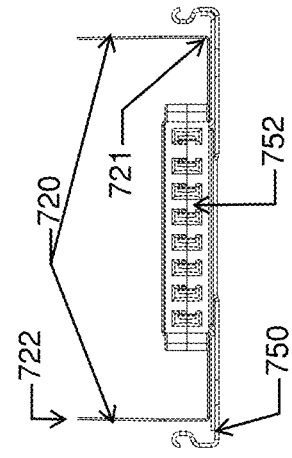
Figure 7A
Figure 7B
Figure 7C
Figure 7D
Figure 7E
Figure 7F

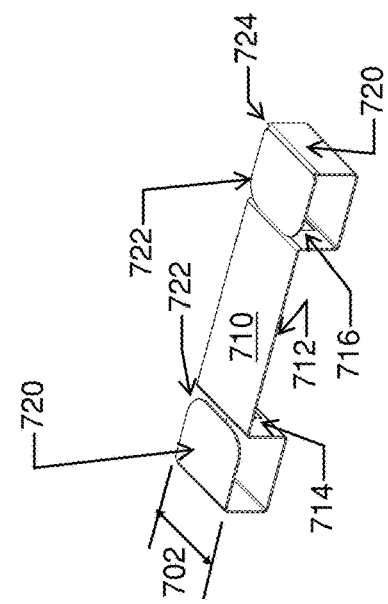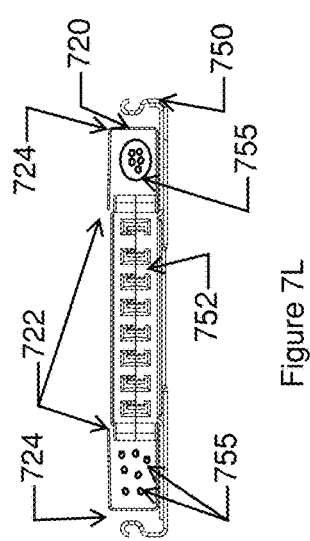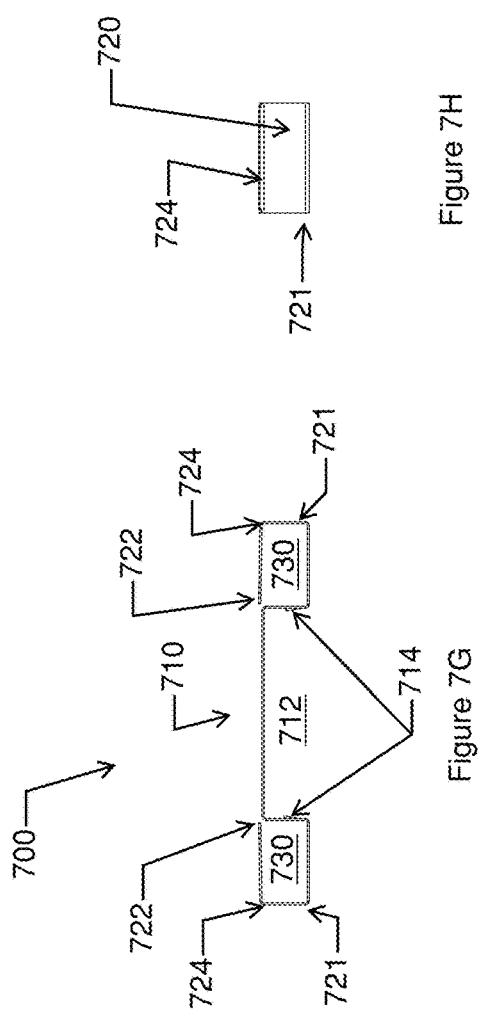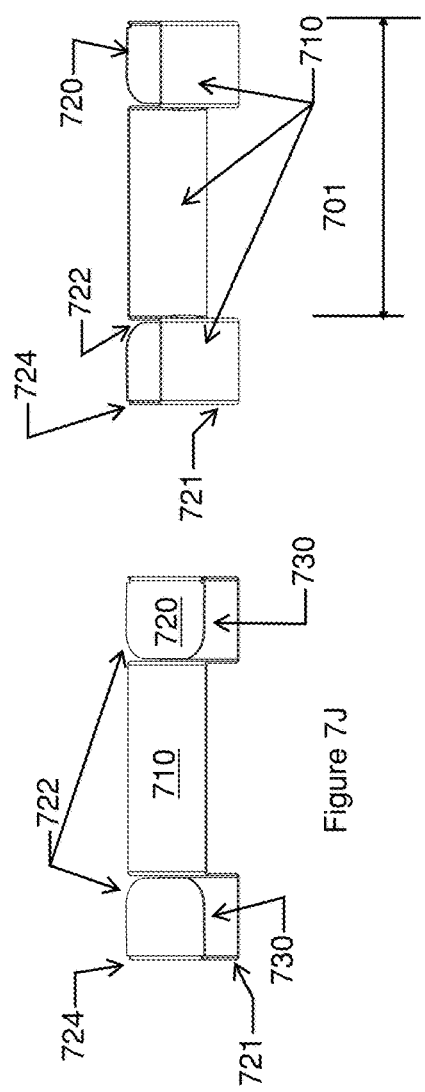

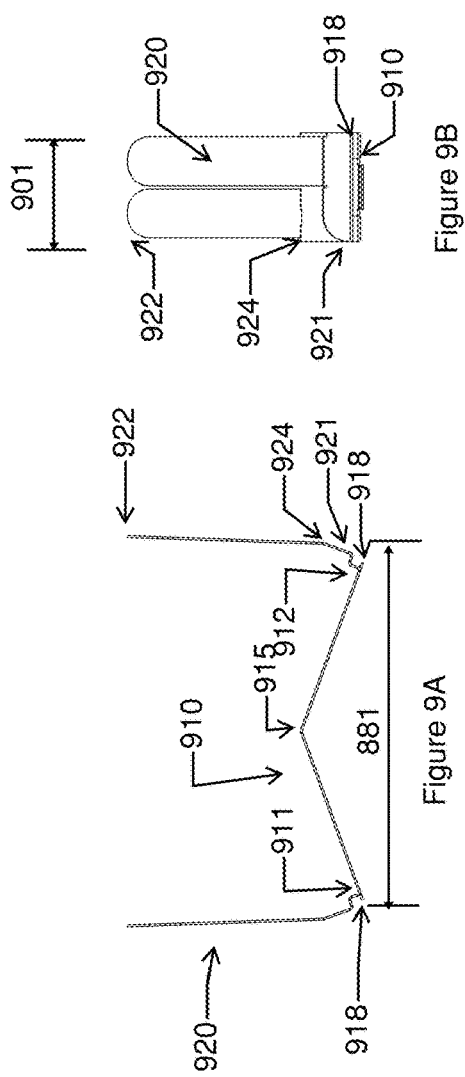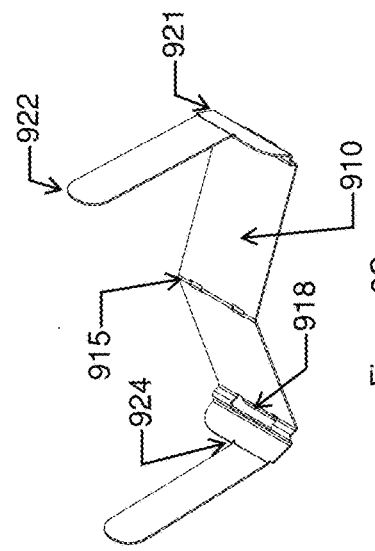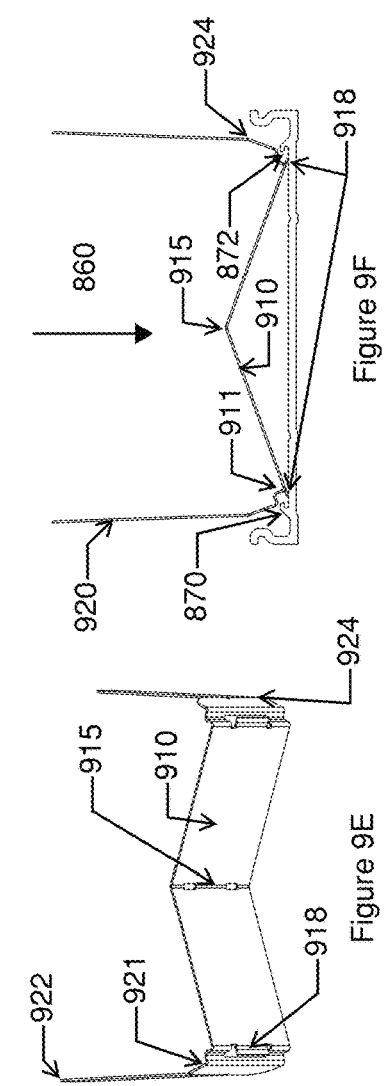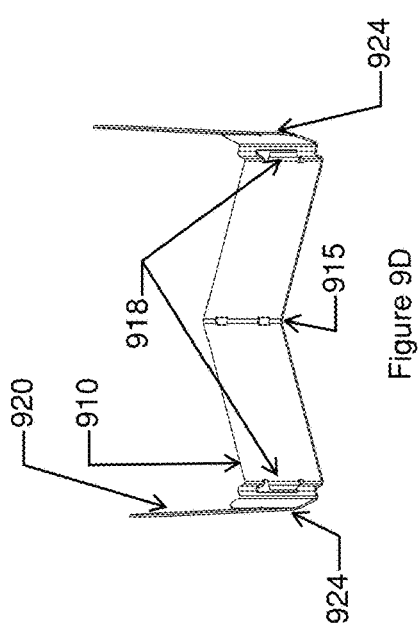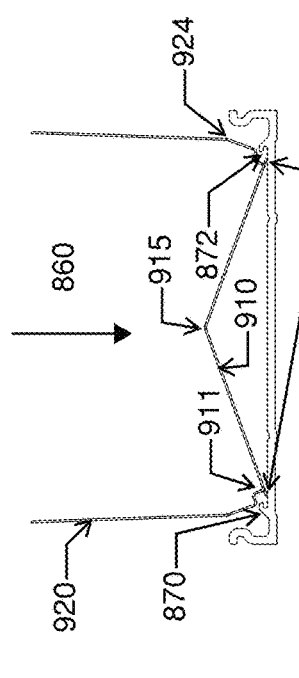

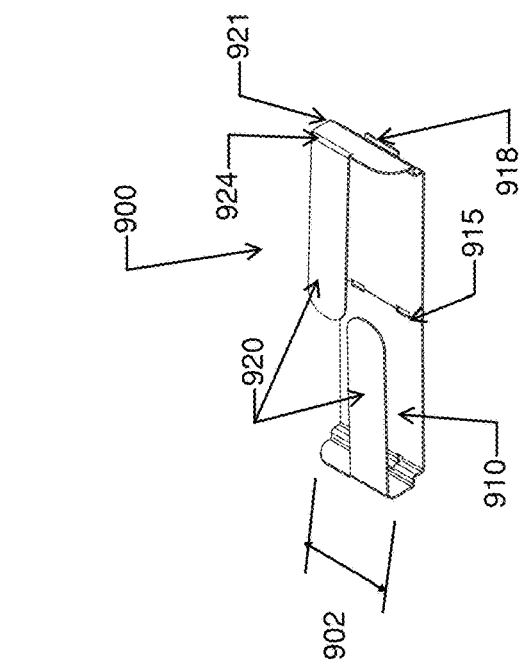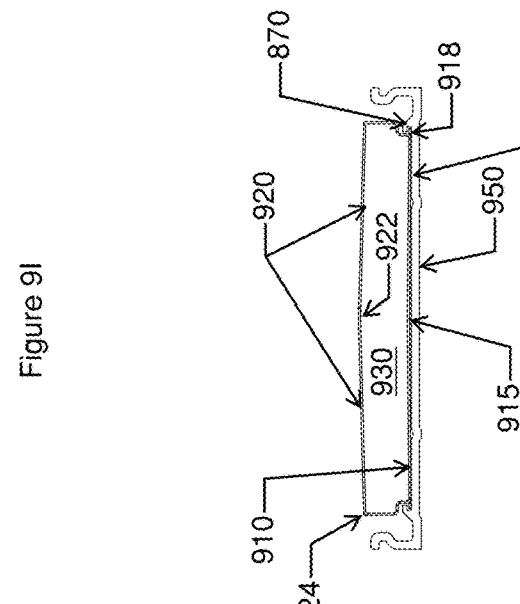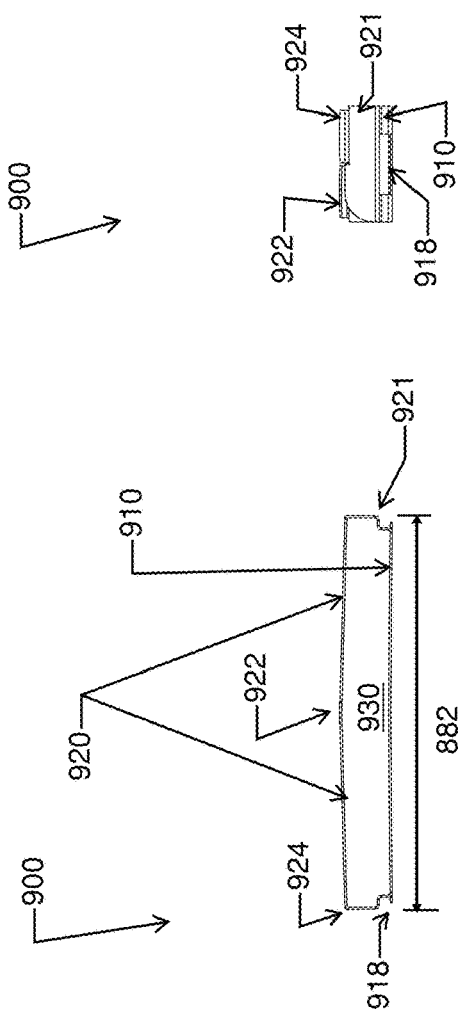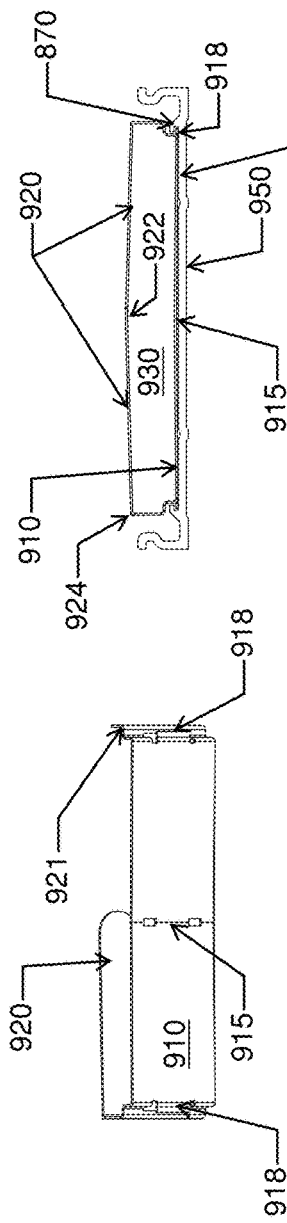
Figure 9G
Figure 9H
Figure 9I
Figure 9J
Figure 9K
Figure 9L

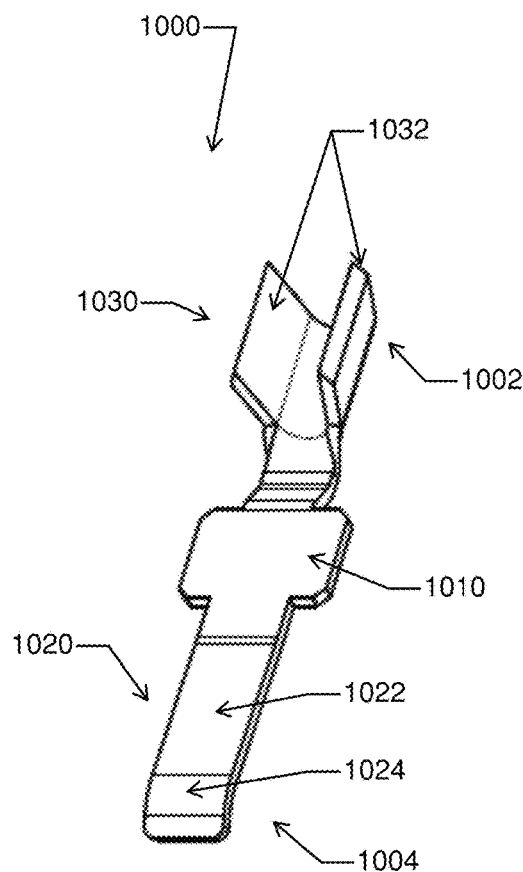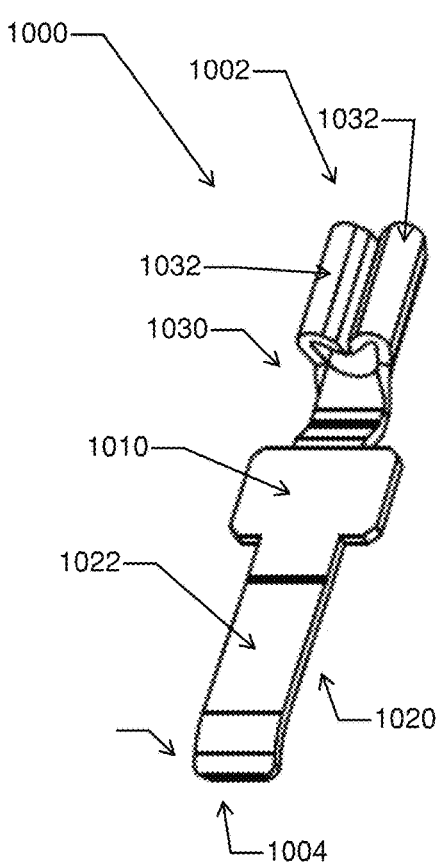
Figure 10A
Figure 10B

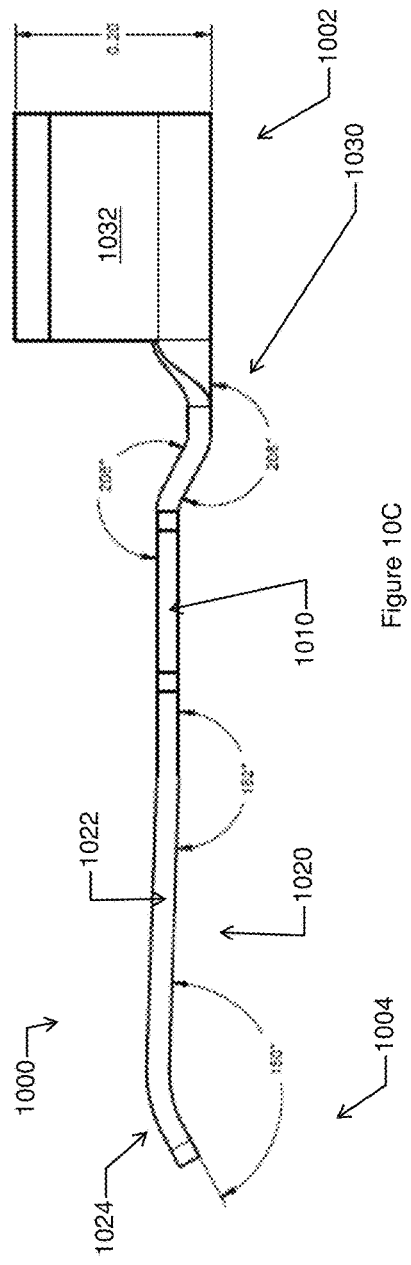
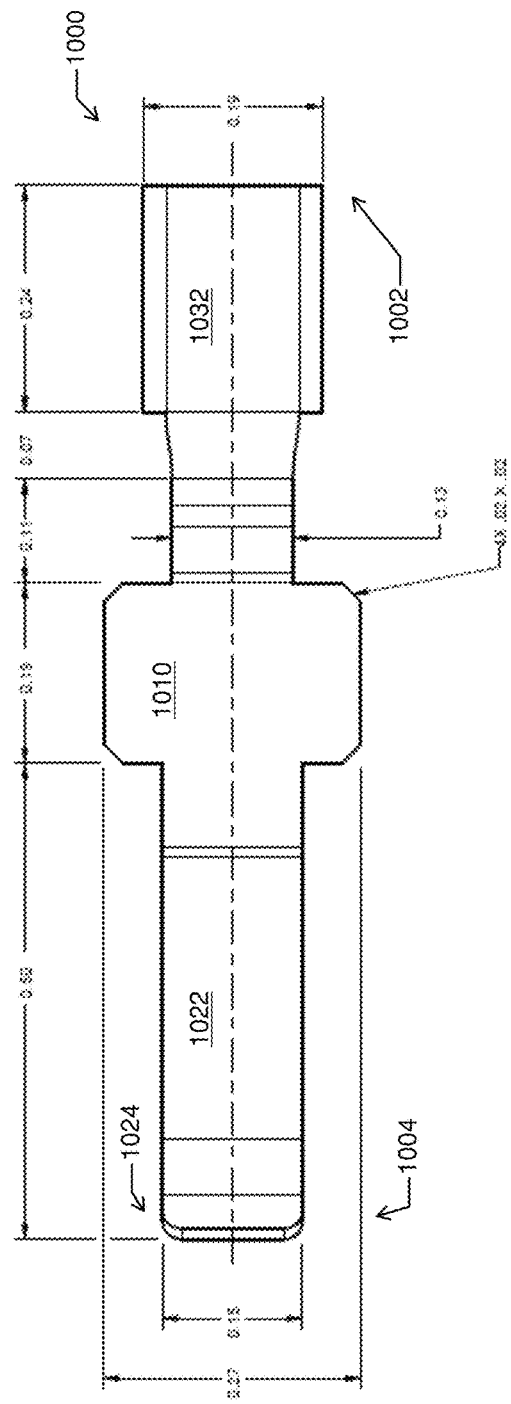
Figure 10C
Figure 10D

MODULAR LOW PROFILE RACEWAY TO PROVIDE POWER AND/OR DATA CONNECTIVITY

CROSS-REFERENCE TO RELATED APPLICATIONS

This application claims the benefit of priority of U.S. Provisional Patent Application Ser. No. 62/737,094 entitled "Modular Low Profile Raceway to Provide Power and Data Connectivity", which was filed on Sep. 26, 2018 and U.S. Provisional Patent Application Ser. No. 62/823,611 entitled "Modular Low Profile Raceway to Provide Power and/or Data Connectivity", which was filed on Mar. 25, 2019, both of which are hereby incorporated by reference for all purposes.

TECHNICAL FIELD

The present invention relates to low profile raceways capable of providing power and/or data connectivity.

BACKGROUND

Power and communications capabilities can be provided to a location (e.g., desks, conference tables, televisions, etc.) in a structure by modifying and/or providing new electrical and communication wiring. Often providing new wiring or modifying existing wiring to a location may include coring through concrete flooring, creating openings in walls, and/or otherwise making modifications to the structure. Furthermore, electricians and/or specialty contractors may be required to rewire, gain access points, and/or fix walls and/or floors. In addition, as needs change, the wiring may need to be adjusted to accommodate wiring location layout changes, new types of data connectivity, and/or the need for additional connectivity. These changes may include making further modifications to the structure. Some power tracks, such as extension cords and other power tracks can provide power to locations away from a wall or a floor outlet. These power tracks can cause trip hazards when positioned on and/or under flooring due to the large heights and differences in heights; and, they are inflexible since an electrician must still hardwired receptacles at desired points in the power track. There exists a need for raceways that are flexible, allow modifications to power and communication capabilities, and do not cause trip hazards.

SUMMARY

In various implementations, a raceway may be provided that provides connectivity (electrical and/or communications) to a location. In some implementations, the raceway may be coupled to a floor of a structure and provide connectivity to one or more locations proximate the raceway. In some implementations, the raceway may be positioned above a flooring of a structure to provide connectivity (e.g., electrical and/or communication) to one or more locations proximate the raceway. One or more receptacles may be coupled to the raceway and connectivity may be provided through the receptacle to a device coupled (e.g., wirelessly, via Bluetooth, via USB, and/or via Ethernet) to the receptacle. Fixed and/or modular receptacles may be coupled to the raceway. The modular receptacles may provide electrical and/or data connectivity to device(s) via one or more power sockets and one or more modular connectivity sockets. In various implementations, a raceway may be utilized to provide connectivity to devices, furniture, and/or equipment, for example, via receptacles. A raceway may include a raceway housing that includes a cavity, cable(s), and two or more connectivity couplers (e.g., nodes). The cable(s) may be adapted to provide connectivity when the cable(s) are coupled to a connectivity source (e.g., power source and/or communications source). The connectivity couplers (e.g., nodes) may be coupled to at least one of the cables. The connectivity couplers may include a first connectivity coupler and a second connectivity coupler. The first connectivity coupler may provide connectivity to first receptacle(s) coupled to the first connectivity coupler and may be directly coupled to a connectivity source member via the cable(s) of the raceway. The second connectivity coupler may provide connectivity to second receptacle(s) coupled to the second connectivity coupler. The raceway may allow the second connectivity coupler to provide connectivity to the second receptacle(s) coupled to the second connectivity coupler when the first connectivity coupler is not coupled to at least one of the first receptacles and when the first connectivity coupler is coupled to at least one of the first receptacles. Thus, a receptacle may be capable of independently providing connectivity to a coupled receptacle whether or not other connectivity couplers (e.g. nodes) are coupled to other receptacles. In some implementations, this may increase user satisfaction with a raceway since a raceway with connectivity couplers present even when not in use has more flexibility (e.g., users may select which connectivity couplers to utilize and which to not based on user preferences rather than being limited by a specific receptacle configuration).

In various implementations, a raceway may be provided to provide connectivity (e.g., along a length of the raceway, to coupled receptacles, to devices and/or furniture plugged into receptacles, etc.). The raceway may include one or more segments. A segment may have a housing that includes a base. The base may have a first side and a second side, and a length. The cross-section of the base along the length may not be uniformly shaped, in some implementations. The housing may include two side walls extending from the base of the housing. One side wall may be disposed proximate the first side of the base, and the other side wall may be disposed proximate the second side of the base. A side wall may include a first end coupled to the base and an opposing end. The side wall may include a first curved section disposed at a first distance from the second end of the side wall and/or a second curved section disposed at a second distance from the first curved section. A side wall may include a first straight section disposed between the first curved section and the second curved section and/or a second straight section disposed between the second curved section and the first end of the side wall. The first straight section and the second straight section may be approximately parallel to each other. The first straight section and/or the second straight section may be approximately perpendicular to the base, in some implementations. The second end of a side wall may be disposed below at least a portion of the first curved section such that a gap is created between the side wall and a cover of the raceway. The gap may allow a tool to be disposed between a flange of the cover and the side wall to remove the cover from the raceway. At least a portion of the side wall may be flexible. The housing of the segment may include at least one cavity disposed between the two side walls. A cavity may be capable of receiving a power track, cables (e.g., power and/or data), and/or conduit to provide connectivity.

Implementations may include one or more of the following features. The first curved section and the second curved section may be angularly curved and/or have a smooth curve. The raceway may include at least one cover. The cover may couple with the housing of the segment of the raceway. A cover may include two walls extending from an inner side of the cover. A wall of the cover may be disposed such that when the cover is inserted into the raceway, the wall is disposed on the base of the housing of the segment of the raceway such that force exerted on the cover (e.g., from people walking on the raceway, from objects being disposed on the raceway, etc.) is at least partially transferred to the base of the housing of the segment of the raceway. At least a portion of the first straight sections of the side walls may guide the position of and may contact the side walls of the cover, when the cover is inserted in the housing. The cover may include one or more flanges extending from ends of the cover. The flanges may inhibit damage to the raceway. A gap may reside between the one or more flanges of the cover and the side walls of the housing and this gap may be utilized to remove the cover (e.g., to access the cavity of the raceway, to couple a receptacle, etc.). The housing of the segment of the raceway has a height of less than approximately 1 inch and/or a width of less than approximately 3 inches. The raceway may include a first ramp coupled to the first side of the base and a second ramp coupled to the second side of the base. The raceway may include a power track disposed in the cavity of the housing. The power track may be coupled to the housing of the segment of the raceway. The power track may include a housing with a cavity and cables and/or conduit to provide connectivity may be disposed in the power track (e.g., in the cavity in the housing of the power track). The power track may be coupled to the housing of the segment of the raceway. The raceway may include additional cable(s) to provide connectivity and the additional cable(s) to provide connectivity may be disposed outside the power track (e.g., in the housing of the segment and outside the housing of the power track). The raceway segment may include a node. The node may include a node housing disposed in the cavity of the housing. The node housing may be coupled to the housing of the segment of the raceway and/or cables and/or conduit to provide connectivity is be disposed in the node housing. The node housing may include at least three access points. An access point may be disposed through a top surface of the node housing and may allow at least three receptacle prongs of at least one coupled receptacle to contact at node connectivity components via the access points to provide power to the at least one coupled receptacles. The housing of the raceway may include a set of receivers disposed in the housing, such as proximate the node housing. The set of receivers may mate with protrusions on coupled receptacles. The set of receivers may be configured such that one orientation of a mating of one of the node housings and one of the coupled receptacle is allowed and at least one orientation of the mating of the one of the node housings and the one of the coupled receptacle is restricted. The raceway may include receptacles coupleable to the raceway. A receptacle may be coupleable to at least one node housing via the access points. The receptacle may couple with the set of receivers, be screwed to a location, and/or otherwise secured. In some implementations, the receptacle may snap onto node housing. Coupling the receptacles to the at least one node housing provides connectivity via ports on the receptacles. The raceway may include one or more wire clips, in some implementations. A wire clip may include a base with a first cavity to receive a power track and at least one coupling member disposed on at least one wall of the cavity. The coupling member of the wire clip may couple with a part of an outer surface of a power track and/or a part of an outer surface of a node housing. The wire clip may include one or more flanges disposed at an end of the base of the wire clip. A flange may fold to create a secondary cavity between walls of the flange and the base that is separate from the first cavity. The secondary cavity may receive a power track, cables, and/or conduit to provide connectivity. The housing of the segment of the raceway may include at least one male connector and/or at least one female connector. The male connector of a first segment and the female connector of a different segment of the raceway may be configured to couple with each other. A male connector may include a first side, a second opposing side; two arms, and one or more flanges. A first arm may be disposed on the first side of the male connector and the second arm may be disposed on the second side of the male connector. An arm may be coupled at one end to the housing and a flange at the other end of the arm. The flange may extend from the arm and is configured to couple with a ledge of a female connector to inhibit accidental release. The male connector may include a set of protrusions (e.g., 8). One or more of the protrusions in the set of protrusions may be approximately C shaped. The protrusions may be created by channels extending at least partially through the node housing. A bus bar may be disposed in at least one of channels and maybe coupled to a wiring to transmit connectivity. The bus bars of a male connector and a female connector may contact to transmit power and/or other connectivity between the connectors and thus their respective segments. A female connector may include a first side, a second opposing side, and at least one ledge on the first side and second side. A ledge may couple with a flange extending from an arm of a female connector to inhibit accidental release (e.g., the flange may latch onto the ledge). The female connector may include a set of recesses. One or more of the recesses in the set of protrusions may be approximately C shaped. The recesses may be created by channels extending at least partially through the node housing. A bus bar may be disposed in at least one of channels and is coupled to a wiring to transmit connectivity.

In various implementations, a raceway may be provided to provide connectivity. The raceway may include one or more segments. A housing of a segment of a raceway may include a base and two side walls. The base may include a first side, a second side, and a length. A side wall may extend from the base of the housing. One of the side walls arms may be disposed proximate the first side of the base, and the other side wall may be disposed proximate the second side of the base. A side wall may include a first end coupled to the base and a second opposing end. The side wall may include one or more coupling members. A coupling member may extend from one end of a side wall to another end of the side wall (e.g., along a length of the wall) and/or coupling member(s) may be segments that are disposed along a length of the segment housing. A coupling member may include a first end disposed proximate to the base and a second opposing end disposed proximate a second end of the side wall. The coupling member may include a first curved section disposed proximate the second end of the coupling member and a second curved section disposed at a second distance from the first curved section. The coupling member may include a first straight section disposed between the first curved section and the second curved section. At least one recess may be disposed in the first curved section. A recess may extend from the second end of the coupling member. A recess may create at least one gap between the coupling member and a cover of the raceway (e.g., which may allow a tool to be disposed between a flange of the cover and the side wall to remove the cover from the raceway). The side wall may include a second straight section disposed between the second curved section and the first end of the coupling member. The first straight section and the second straight section may be approximately parallel to each other and/or the first straight section and the second straight section may be approximately perpendicular to the base. The housing of the segment of the raceway may include a cavity disposed between the two side walls. The cavity may receive a power track, cables, and/or conduit to provide connectivity.

Implementations may include one or more of the following features. The side wall may include a plurality of coupling members, and two or more of the coupling members of the side wall may be separated from each other by a second distance. The housing of the segment of the raceway may include a first side, second opposing side proximate the side walls, a third side disposed between the first side and the second side, and a fourth side opposing the third side and disposed between the first side and the second side. A side wall may include one coupling member that extends from proximate the third side to proximate the fourth side of the housing of the segment of the raceway. The raceway may include a power track disposed in the cavity of the housing of the segment of the raceway. The raceway housing may be linear, angled, and/or approximately T-shaped. The base of the housing may include one or more protrusions that extend from the base into the cavity of the segment of the raceway. A protrusion may inhibit crushing of cabling disposed in the cavity during use and/or may receive a fastener via an opening in the protrusion. The fastener may at couple the segment of the raceway to a location and/or couple a cover to the segment of the raceway.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 1A illustrates an exploded view of an implementation of an example raceway system.

FIG. 2D illustrates a cross-sectional view of an implementation of a portion of the example segment of a raceway illustrated in FIG. 2A.

FIG. 2F illustrates a side view of an implementation of a portion of the example segment of a raceway illustrated in FIG. 2A.

FIG. 2I illustrates a cross-sectional view of an implementation of a portion of an example power track of a raceway.

FIG. 4A illustrates top cross-sectional view of an implementation of an example angled segment.

FIG. 4B illustrates side cross-sectional view of an implementation of the example angled segment illustrated in FIG. 4A.

FIG. 4E illustrates another side view of an implementation of the example angled segment illustrated in FIG. 4A.

FIG. 7A illustrates a front view of an implementation of an example wire clip in an open position.

FIG. 7B illustrates a side view of an implementation of the example open wire clip illustrated in FIG. 7A.

FIG. 7C illustrates a side perspective view of an implementation of the example open wire clip illustrated in FIG. 7A.

FIG. 7D illustrates a top perspective view of an implementation of the example open wire clip illustrated in FIG. 7A.

FIG. 7E illustrates a bottom perspective view of an implementation of the example open wire clip illustrated in FIG. 7A.

FIG. 7F illustrates a front view of an implementation of the example open wire clip, illustrated in FIG. 7A, disposed in a component of raceway.

FIG. 7G illustrates a front view of an implementation of the example wire clip of FIG. 7A in a closed position.

FIG. 7H illustrates a side view of an implementation of the example wire clip illustrated in FIG. 7A in a closed position.

FIG. 7I illustrates a side perspective view of an implementation of the example wire clip illustrated in FIG. 7A in a closed position.

FIG. 7J illustrates a top perspective view of an implementation of the example wire clip illustrated in FIG. 7A in a closed position.

FIG. 7K illustrates a bottom perspective view of an implementation of the example wire clip illustrated in FIG. 7A in a closed position.

FIG. 7L illustrates the wire clip of FIG. 7A disposed in a component of a raceway.

FIG. 9A illustrates a front view of an implementation of an example open wire clip.

FIG. 9B illustrates a side view of an implementation of the example open wire clip illustrated in FIG. 9A.

FIG. 9C illustrates a side perspective view of an implementation of the example open wire clip illustrated in FIG. 9A.

FIG. 9D illustrates a top perspective view of an implementation of the example open wire clip illustrated in FIG. 9A.

FIG. 9E illustrates a bottom perspective view of an implementation of the example open wire clip illustrated in FIG. 9A.

FIG. 9F illustrates a front view of an implementation of the example open wire clip, illustrated in FIG. 9A, disposed in a component of raceway.

FIG. 9G illustrates a front view of an implementation of the example wire clip of FIG. 9A in a closed position.

FIG. 9H illustrates a side view of an implementation of the example wire clip illustrated in FIG. 9A in a closed position.

FIG. 9I illustrates a side perspective view of an implementation of the example wire clip illustrated in FIG. 9A in a closed position.

FIG. 9J illustrates a top perspective view of an implementation of the example wire clip illustrated in FIG. 9A in a closed position.

FIG. 9K illustrates a bottom perspective view of an implementation of the example wire clip illustrated in FIG. 9A in a closed position.

FIG. 9L illustrates a front view of an implementation of the example wire clip, illustrated in FIG. 9A, disposed in a component of raceway and in a closed position.

FIG. 15A top perspective view of illustrates an implementation of an example receptacle.

FIG. 15C top perspective view of illustrates an implementation of a portion of the example receptacle illustrated in FIG. 15A.

Like reference symbols in the various drawings indicate like elements.

DETAILED DESCRIPTION

Figure 1B:
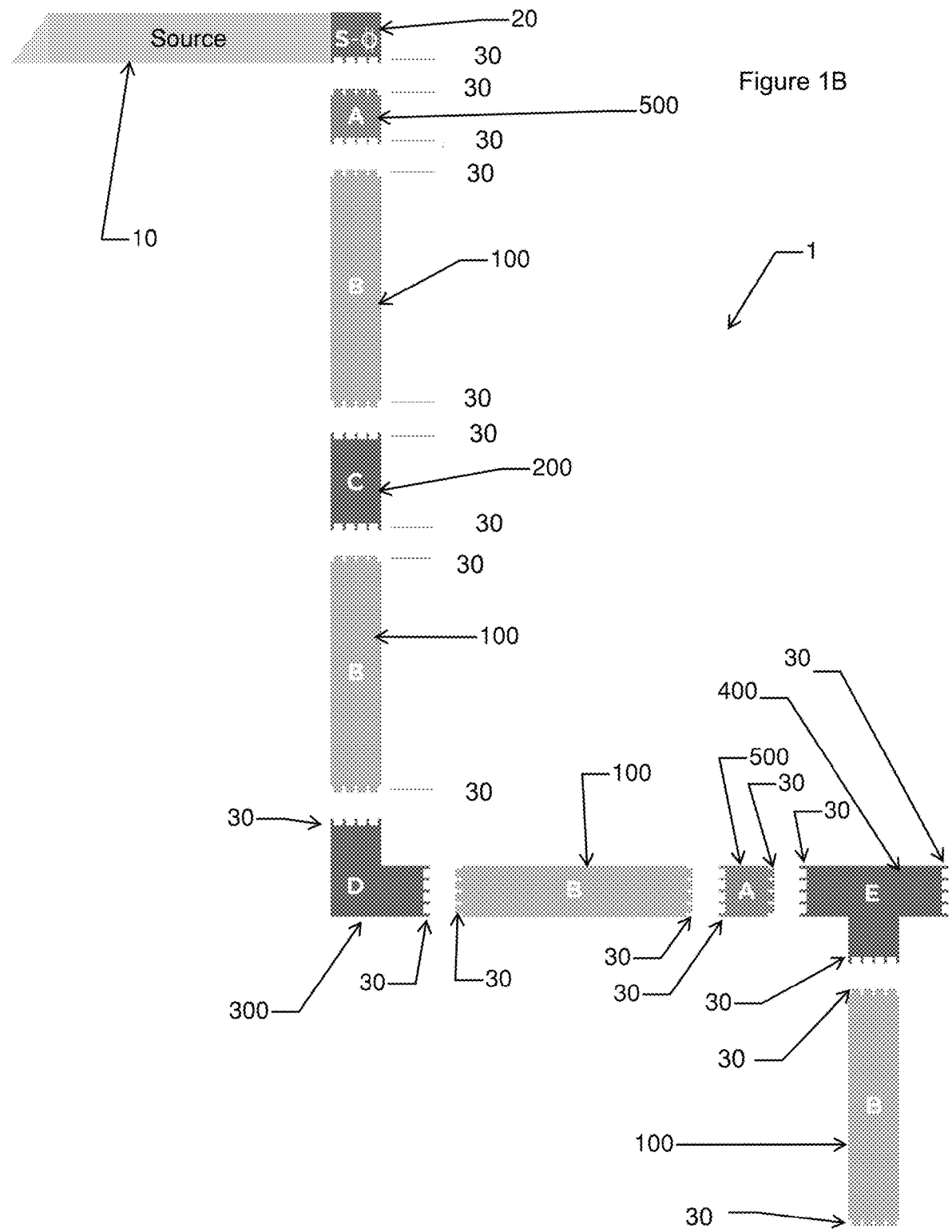
FIG. 1B illustrates an implementation of an example raceway.

In various implementations, a raceway may be utilized to provide connectivity to, for example, receptacles (into which objects may be plugged), furniture, and/or to provide connectivity to any other appropriate object. A raceway may be disposed on the ground (e.g., under flooring, above flooring, inline with flooring, etc.), in some implementations. A raceway may be coupled to connectivity source(s), such as power source(s) (e.g., from wall power lines, core wiring, etc.) and/or data sources (e.g., in wall data lines, etc.). The raceway may provide the connectivity from the connectivity sources to one or more receptacles, outlets, and/or positions along the raceway. Thus, receptacles, furniture, and/or objects do not need to be directly connected to a power source (e.g., such as with wall receptacles and/or hardwired objects) but rather can use the raceway to gain connectivity.

In various implementations, the raceway may be positioned on a location, such as on top of a subfloor and/or on top of flooring. The raceway may include components, which include cable(s), and connectivity couplers (e.g., nodes) disposed along a length of the cable. Receptacle(s) may be coupled to the connectivity coupler(s). Since the raceway is modular and flexible, as needed, raceway segments and/or receptacles may be removed, replaced, and/or be added to the raceway (e.g., by coupling the receptacle(s) to connectivity coupler(s) and/or other coupled receptacle(s); by adding and/or removing segments of the raceway; etc.).

In some implementations, the use and/or the layout of a location, such as an open concept office, a library, a conference center, a meeting hall, a school, and/or other locations, may change and thus, by utilizing a raceway the locations along the raceway at which connectivity is provided may be altered. The ability to alter the locations at which connectivity is provided may allow a single raceway to be used and/or adapted for use during a variety of changes in a location. For example, when a conference center hall includes furniture such as rows of benches or desks, a first configuration of a raceway may be utilized. Furniture may be coupled to one or more connectivity couplers (e.g., nodes) of the raceway. When the use of the conference center hall changes, such as to a dance hall, the furniture may be uncoupled and covers may be placed over the previously used connectivity couplers (e.g. nodes). When the use of a conference center hall changes, for example, to a trade show, the connectivity couplers (e.g. nodes) may be coupled to kiosks and/or receptacle(s) (e.g., modular receptacle(s) such as towers and/or approximately flush mounted receptacle(s)) to provide connectivity to user devices proximate a kiosk.

In some implementations, a location may be utilized for a plurality of temporary purposes (e.g., meeting spaces, retail spaces such as pop up shops, and/or office conference rooms). Utilizing one or more raceways may provide flexible connectivity configurations for the location. For example, a multi-purpose room may be reconfigured based on, for example, use. When the room is utilized for training, the room may arranged in a first configuration, such as with tables arranged in rows, conference table(s), and/or chairs in rows. The raceway may be configured (e.g., receptacles may be coupled and/or uncoupled from one or more locations on the raceway, for example via a connectivity couplers, such as nodes; types of receptacles utilized may be adjusted; and/or number of receptacles may be adjusted) based at least partially on the first configuration. As the use of the multi-purpose room changes, a different second configuration of the room (e.g., from the first configuration) may be utilized. Thus, the configuration of the raceway (e.g., the coupling of the receptacles to the raceway and/or other receptacles coupled to the raceway; and/or the coupling of the cover(s) to the housing) may be adjusted based at least partially on the second configuration. While the raceway housing may be maintained (e.g., may remain in place at a location), the configuration of the housing may be adjusted to accommodate various applications, uses, and/or changes in technology.

In some implementations, a raceway may be utilized in a location, such as a library, and the room may change based on use and/or based on technology demands. For example, when a room is used as study space, rows of desks may be coupled to raceway(s). When a room is used as a reading room, receptacles to provide connectivity proximate seating may be utilized with the raceway.

In some implementations, a raceway may be utilized in a location such as an open office environment. The arrangement of furniture, seating, equipment and/or people may change based on the use of portions of the open office environment. As the environment changes, the raceway may be adjusted (e.g., number, type, and/or location of receptacles coupled to the raceway may be adjusted; the coupling of the receptacles to the raceway and/or other receptacles coupled to the raceway; and/or the coupling of the cover(s) to the housing) based on the use.

In some implementations, a raceway may be utilized in a cafeteria (corporate, educational, etc.). In a cafeteria, tables and lounging sections (e.g., chairs and/or sofas) may be utilized and the raceway may allow connectivity to both types of sections.

In some implementations, a raceway may be utilized in airports (e.g., boarding areas, lounges, and/or dining areas). Since the traffic in airports vary (e.g., based on time of year, time of day, and/or services provided at specific locations), the raceway (e.g., the coupling of the receptacles to the raceway and/or other receptacles coupled to the raceway; and/or the coupling of the cover(s) to the housing) may be adjusted to accommodate changes in traffic and/or use of spaces in airports. For example, extra kiosks may be provided for airline use during the winter to handle weather delays and flight changes. Thus, during the winter the raceway may be utilized to provide connectivity to the furniture (e.g., desk outlets) and/or device (e.g. computer) of the kiosk, for example. In other seasons, the area may be rededicated to lounge area and receptacles (e.g., towers, modular and/or fixed receptacles to provide power, Ethernet, and/or Wi-Fi connections) for flyers awaiting flights may be coupled to the raceway.

In some implementations, a plurality of raceways may be positioned in a first configuration (e.g., rows, latticed, about a periphery, and/or other arrangements) in a location such as a room, area, or other space. Then, as the location is used for a space, receptacle(s) may be coupled, uncoupled, and/or replaced based on the use. In some implementations, repairs and/or maintenance may be facilitated since receptacle(s) may be replaced rather than repaired in place or replacing the entire raceway.

By allowing the raceway to be adjusted (e.g., number, type, and/or location of receptacles may be adjusted), the use of a space may be enhanced (e.g., since a space can accommodate changes in use and/or technology demands); traffic flow may be improved when compared with systems that include fixed receptacles (e.g., since the cover of the raceway may be at approximately the same height as flooring, since the raceway may include sloped sides to inhibit tripping, and/or since the cover of the raceway may be within a predetermined trip height of the top surface of the flooring); and/or ease of use of the raceway may be improved (e.g., when compared to a system that must be removed and replaced to provide a new arrangement of receptacles or different types and/or numbers of receptacles). In some implementations, the adjustability of the raceway may facilitate adjustments based on changes in technologies (e.g., new data connectivity connectors, new power plugs, increased use of a device when compared with previous usage). In addition, the cost of a raceway over the lifetime of the raceway and/or the location may be decreased (e.g., when compared with conventional power arrangements) since the raceway may be adjusted to accommodate repairs, replacements, new technology needs, and/or new location usages.

The raceway may be designed such that a top surface of the raceway or portion thereof is at approximately the same height as installed flooring (e.g., the raceway may be installed at least partially under flooring). For example, a top surface of the raceway may be less than approximately 1 inch higher than a top surface of flooring installed at a location (e.g., inside a building or outside a building). In some implementations, the raceway may be installed in a location above existing flooring. The sides of the raceway may be angled to reduce trip hazards, in some implementations. Examples of raceways are described in U.S. Pat. No. 6,566,598 filed on Apr. 10, 1997 and U.S. Pat. No. 6,844,493 filed on May 19, 2003, which are both hereby incorporated by reference to the extent that the disclosures do not conflict with the described systems and processes. For example, housings or portions thereof similar to the housings described in U.S. Pat. Nos. 6,566,598 and 6,844,493 may be utilized with one or more of the raceways described herein.

FIG. 1A illustrates an exploded view of an implementation of an example raceway 100'. The raceway 100' may provide connectivity (e.g., power, communication, and/or other types of connectivity) to one or more locations proximate the raceway. For example, the raceway may include one or more fixed positions at which connectivity may be provided to receptacle(s) and/or device(s) (e.g., furniture).

The raceway 100' may include a raceway housing 102'. The housing 102' may include plastic, metal (e.g., steel and/or aluminum), rubber, reinforcement (e.g., carbon and/or fiberglass fibers), and/or any other appropriate material. In some implementations, the housing or portions thereof may be water-resistant and/or water-proof. For example, in outdoor, wet room, and/or other applications, the raceway may be at least partially water-proof to satisfy codes (e.g., government, industry and/or company standards). The housing 102' may have a strength such that when people walk on, people walk over, and/or equipment rolls over the housing, the housing is not substantially deformed. For example, the housing may have elastic flexibility such that deformation that occurs when a person walks on at least a portion of the housing is substantially reduced once the person steps, for example, off the raceway. In some implementations, the housing may have a strength that allows a live load of at least approximately 100 psf.

The housing 102' may include any appropriate shape and/or size. For example, a housing may have an approximately rectangular cross-sectional shape, approximately square cross-sectional shape, an approximately trapezoidal cross-sectional shape, and/or any other appropriate regular or irregular cross-sectional shape.

The housing 102' may have dimensions, such as a length 104', a width 106', and a height 108'. The dimensions of the housing 102' may be selected based on the application of the raceway 100' and/or the components (e.g., cables and/or connectivity couplers) to be included in one or more cavities of the raceway. For example, a length 104' of the housing 102' may be based at least partially on a length of a room in which the raceway 100' will be installed. A width 106' of a housing 102' may be based on the type and/or size of cables, which will be housed in the housing, and/or based on the type of receptacles, which will be coupled to the housing. The raceway 100' may include segments and the overall length 104' of the raceway may be based on a combination of a plurality of segments. In some implementations, the height 108' of the housing 102' may be based at least partially on the height of the flooring to be used in a location in which the raceway 100' will be installed (e.g., such that the top surface of the housing is approximately the same as the top surface of the flooring and/or such that the top surface of the housing is approximately within a predetermined trip tolerance, such as 1 inch, of the top surface of the flooring).

The housing 102' may include one or more cavities 110'. The one or more cavities 110' may reside between the two walls proximate ends of a base of a raceway housing 102'. At least a portion of the cavity may be shaped such that the portion couples with covers, receptacles, and/or portions thereof. As illustrated, the housing 102' may include a cavity in which one or more conduits 112' reside. In some implementations, a housing 102' may include a segment housing and/or cabling (e.g., cables, bus bars, etc.) based on the type of segment (e.g., power track, node, data, extender, etc.). In some implementations, the housing 102' may include more than one cavity 110'. For example, a first cavity may include one or more first conduits and a second cavity may include one or more second conduits. The first conduit(s) and the second conduit(s) may be similar or different (e.g., in size, type, number, and/or contents such as types of cables included.).

The housing may include one or more covers 114'. The cover may include a material similar or dissimilar to other portions of the housing. A cover may have a strength such that when people and/or equipment travel (e.g., walk or roll) over and/or on the cover and/or housing, the cover and/or the housing are not substantially deformed. The cover may be configured to reside over at least a portion of the cavity of the housing. A cover may be removable or fixed. When a cover is removed, access to the cavity and/or components (e.g., connectivity couplers, conduit, and/or cables) may be provided. The cover(s) 114' may couple with a portion of the housing 102' (e.g., lower portion), in some implementations. For example, a cover 114' may snap (e.g., via a cover coupling member; by deflection of side walls of the housing) into a portion of a housing 102' (e.g., a cover coupling member of a housing), may be disposed in one or more recesses of a housing, may be positioned in a track of the housing, etc. For example, the walls of the raceway housing may guide and/or retain the cover (or portion thereof, such as a leg of a cover) to couple the cover to the raceway housing. In some implementations, fasteners (e.g., screws, bolts, clips) may be utilized to couple the cover 114' to the housing 102'.

A cover 114' may be positionable over at least a portion of a cavity 110' of a housing 112'. Cover(s) May be available in various lengths (e.g., to accommodated flooring heights; to accommodate cabling needs; etc.). Cover(s) 114' utilized in a raceway 100' may be of similar and/or dissimilar lengths. In some implementations, a length of a cover 114' may be adjustable (e.g., the cover may include material that may be cut by a user and/or the cover may include perforations along which the cover may be broken, cut and/or otherwise trimmed).

A cover 114' may be may be selected to be flush with a flooring in an installation area, in some implementations. A cover 114' may be selected to inhibit tripping (e.g., a cover may form a planar surface and/or a surface that is elevated within a trip tolerance range of flooring and/or a top surface of the housing of the raceway).

One or more conduits 112' may be disposed at least partially in the housing 102', for example, at least partially in a cavity 110' of the housing. A conduit 112' may include one or more cables 116'. For example, one or more cables 116' may be disposed at least partially in the conduit 112'. A conduit may provide protection for cable(s) disposed at least partially in the cavity of the conduit and/or satisfy code (e.g., government, industry, and/or company) requirements in an application. For example, the conduit may be at least partially static resistant, fire resistant, abrasion resistant, and/or water resistant. In some implementations, as illustrated in FIG. 1B, the cables may be disposed in housings of the segment. For example, a power cable may be disposed in the lumen between a case of a power segment (e.g., power track) and the base of a raceway housing.

Cables may include any appropriate cable. For example, cables may include power cables, communication cables, etc. For example, the cables may include power cords, CAT 5 cables, CAT 6 cables, phone cables, coaxial cable, fiber optic, etc.

The raceway 100' may include one or more connectivity couplers 118' (e.g., node segments or portions thereof). A raceway may include more than one fixed location at which connectivity may be provided. For example, a raceway may include a plurality of connectivity couplers (e.g., nodes) disposed across a length of the raceway, conduit, and/or cable at fixed locations. In some implementations, the raceway may include segments. Thus, the connectivity couplers (e.g., nodes) may be provided at locations based on user preferences since various segments (e.g., power segments, node segments, etc.) can be selected such that connectivity can be provided at a location. A connectivity coupler may be located on and/or coupled to the conduit and/or cable proximate the locations.

In some implementations, the raceway 100' may include more than one connectivity couplers (e.g., node segments or portions thereof). The connectivity couplers may be coupled to the conduit and/or cables (e.g., directly and/or via a connectivity segment such as a power and/or communication segments; via bus bars and/or wires in a segment; etc.) to provide the connectivity provided by the cable to receptacle(s) coupled to the connectivity coupler(s). For example, a first power cable (e.g., directly and/or via a power segment) may be coupled to a first connectivity coupler. When a first receptacle is coupled to the first connectivity coupler, the first power cable may be able to provide power connectivity (e.g., via the first connectivity coupler) to devices (e.g., laptops, phones, lights, furniture, etc.) coupled to the first receptacle. In some implementations, a second data cable (e.g., Ethernet, fiber optic, and/or phone line) may be coupled (e.g., via hardwiring and/or via a segment) to the first connectivity coupler and/or a different connectivity coupler. When the first receptacle is coupled to the first connectivity coupler and/or other connectivity coupler, data connectivity may be provided via one or more sockets in the first receptacle to a device, furniture, and/or equipment, for example.

The connectivity couplers may be coupled to the conduit and/or cables using any appropriate coupling. For example, connectivity couplers may be coupled using a hardwire connection to the cable and/or conduit. Connectivity couplers may be coupled via twisted pair coupling and/or other appropriate couplings. As another example, coupling between the segments of a raceway may couple connectivity couplers, such as nodes with connectivity cabling within other segments, such as power segments, communication connectivity segments, and/or extenders. Connectivity couplers may be coupled to each other and/or to other segments in a modular raceway (e.g., that allows assembly and/or customization of the raceway via segments). In some implementations, the location of a connectivity coupler along a length of conduit and/or cable may not be adjustable. For example, segments of a raceway may be added, removed, and/or replaced to adjust a location of a connectivity coupler (e.g., node segment) on a raceway.

In various implementations, the connectivity couplers may be coupled to the conduit and/or cable such that a connectivity coupler may not be inhibited from providing connectivity (e.g., electrical and/or communication connectivity) to a receptacle when another connectivity coupler of the raceway is and/or is not coupled to a receptacle. Thus, for example, if a raceway has plurality of connectivity couplers and one or more first connectivity couplers are not coupled to first receptacle(s), one or more second connectivity couplers that are coupled to one or more second receptacles may not be restricted from providing connectivity to the second receptacle(s). This type of flexibility may increase user satisfaction (e.g., from increased flexibility, decreased costs, etc.) since receptacles may be added and/or removed based on user need.

In some implementations, the connectivity couplers may be coupled to the conduit and/or cable (e.g., directly hardwired and/or via connections between and/or within segments) such that restriction of connectivity to coupled receptacles is inhibited when one or more connectivity couplers is not coupled to receptacle(s). For example, as opposed to power systems in which an electrical and/or communication circuit is broken by the absence of coupling of a receptacle and cable, the raceway described may provide connectivity to a receptacle coupled to any of the connectivity coupler disposed along a raceway independent of whether other connectivity couplers of a raceway are coupled or uncoupled to other receptacles.

In some implementations, a raceway may include at least a first connectivity coupler and a second connectivity coupler. The first connectivity coupler may be directly coupled (e.g., via a cable of the raceway) to a connectivity source. For example, a cable may be coupled at a first end to a connectivity source (e.g., via a connectivity source member and/or connectivity source coupling member, such as a plug and a socket and/or a hardwire connection). As the cable extends away from the connectivity source, the first connectivity coupling that the cable is coupled to may be the first connectivity coupler, and thus the first connectivity coupler may be directly coupled to the connectivity source.

One or more of the other connectivity couplers may be coupled to the connectivity source indirectly. For example, as the cable extends away from the first connectivity coupler, the cable may be coupled to the second connectivity coupler. The cable may provide connectivity (e.g., when coupled to a connectivity source) for the second connectivity coupler to transmit to coupled receptacle(s). A third connectivity coupler may be coupled to the cable at a position farther away from the connection source than the first and second coupling members, in some implementations.

The raceway may allow one or more of the connectivity couplers to provide connectivity to receptacle(s) coupled to the connectivity coupler(s) independently of whether other connectivity couplers are also coupled to receptacle(s). For example, the second connectivity coupler may be allowed to provide connectivity to second receptacle(s) coupled to the second connectivity coupler when the first connectivity coupler and/or the third connectivity coupler is or is not coupled to at least one receptacle. Thus, if a first receptacle is uncoupled from a first connectivity coupler such that the first connectivity coupler is not coupled to at least one receptacle, the second connectivity coupler may still provide connectivity to second receptacles coupled to the second connectivity. The third connectivity coupler may be allowed to provide connectivity to third receptacle(s) coupled to the third connectivity coupler when the first connectivity coupler and/or the second connectivity coupler is or is not coupled to at least one receptacle.

By allowing the connectivity couplers of a raceway to not be inhibited from providing connectivity when other connectivity couplers (e.g., a first connectivity couplers, other connectivity couplers disposed sequentially along a cable closer to the connectivity source, and/or other connectivity couplers) are and/or are not coupled to a receptacle, the raceway may provide flexibility of use and lower cost (e.g., when compared with system with a fixed number of receptacles hardwired to the cable). For example, by allowing the flexibility in the raceway, receptacles may be added and/or removed based on need in an application. Additional flexibility may be provided in some implementations by utilizing modular raceways such that the connectivity couplers may be added, repositioned, removed, etc. In some implementations, costs may be decreased since the raceway may be customized to the application rather than utilizing a device with a fixed number of receptacles hardwired to the cable.

The connectivity couplers 118' may be coupled along a length of the raceway 100'. The distance between the connectivity couplers 118' may be vary or be approximately the same among a plurality of connectivity couplers. For example, four or more connectivity couplers may be spaced approximately equidistant from each other along a length or portion of a length of a raceway. As another nonlimiting example, the segments of the raceway may be selected to provide a specified distance between connectivity couplers. The connectivity couplers 118' may reside at least partially in a cavity of a raceway. In some implementations, a connectivity coupler 118' may reside below a cover of a raceway when a cover is disposed above at least a portion of the connectivity coupler.

The connectivity couplers 118' may be coupleable to one or more receptacles 120'. A receptacle may include a coupling member that allows a user to couple a device to the socket(s) of receptacle to provide connectivity to a device (e.g., furniture, projectors, screens, and/or computers). For example, receptacle(s) may include a member with power sockets to provide power to laptops and/or furniture. The receptacles may be fixed receptacles 130' and/or modular receptacles 132'. When a connectivity coupler is coupled to a receptacle, the connectivity of cable(s) coupled to the connectivity coupler may be provided to the receptacle (e.g., sockets of the receptacles). The connectivity coupler may be coupled to one or more receptacles using any appropriate coupling. The connectivity coupler may include a first coupling member and the receptacle may include a second coupling member. The second coupling member may be adapted to coupled with the first coupling member to allow the receptacle and the connectivity coupler to be coupled together. For example, the first coupling member of the connectivity coupler may include a male and/or female connector (e.g., first pin and/or socket connection) and the second coupling member may include a male and/or female connector (e.g., a second pin and/or socket connection) that is coupleable with the first male and/or female connection. When the connections are coupled (e.g., the first pin and/or socket connection is coupled to the second pin and/or socket connection), then the connectivity coupler and the receptacle may be coupled. As illustrated in FIGS. 6C and 15E, a node (e.g., connectivity coupler) may include access points (e.g., sockets through the top of the node) and a receptacle may include prongs that are received by the access points. The prongs of the receptacle may contact connectivity components (e.g., electrical bars, cables, leads, contacts, etc.) of the node (e.g., connectivity coupler) and connectivity (e.g., power and/or data) may be provided to the receptacle via the contact between the prongs and the connectivity components. In some implementations, the connectivity coupler and the receptacle may couple via twisted pair, hardwire connection, spliced connection, and/or quick connect coupling, such as pin and socket connection (e.g., Molex connectors, lightening connectors, prong and access point, and/or USB connectors); recesses and/or protrusions; tracks; fasteners; other cable connectors, and/or other appropriate couplings. In some implementations, a tool (e.g., screwdriver) may not be required to couple a receptacle to a connectivity coupler. For example, the receptacle may snap into a connectivity coupler, such as a node, of a raceway. In some implementations, fasteners may secure the receptacle to the raceway or portions thereof.

In some implementations, one or more receptacles 120' may be coupled to the raceway 100' via one or more connectivity couplers 118'. A receptacle 120' may include one or more sockets through which connectivity may be provided to a device coupled to the receptacle via a socket. For example, a receptacle may include a power socket. When a plug of a device, such as furniture and/or a computer, is coupled with the power socket, power may be provided to the device (e.g., when the receptacle is coupled to a power cable, for example via a connectivity coupler).

A receptacle may be fixed and/or modular. For example, a number of sockets type(s) of sockets, and/or configuration of sockets on a modular receptacle may be adjusted. In a fixed receptacle, adjustment of a number of sockets, type of sockets, and configuration of sockets may be restricted.

In some implementations, when a receptacle is to be coupled to the raceway, a cover may be removed from a portion of the raceway to reveal an opening. The opening may include at least a portion of a cavity of the raceway and/or one or more connectivity couplers. The receptacle may be coupled to a connectivity coupler accessible via the opening. For example, when the cover is removed from a portion of the raceway a connectivity coupler may reside in this portion of the raceway. In some implementations, the conduit may be manipulated (e.g., pulled and/or pushed) such that a connectivity coupler may be accessed through the opening produced when the cover is removed. In some implementations, when the receptacle is coupled to the raceway, a top surface of the receptacle may be at approximately the same height from a top surface of flooring as the cover. In some implementations, when the receptacle is coupled to the raceway, a distance between a top surface of the receptacle and a top surface of the cover may be less than 1 inch. In some implementations, the receptacle may include a tower. A tower height may exceed the height between the top surface of a cover and a top surface of a flooring.

The raceway may include a connectivity source member 122'. The connectivity source member 122' may couple to a connectivity source 124' (e.g., electrical lines and/or data lines in a structure) to allow the raceway 100' to provide connectivity.

Although FIGS. 1A, 1B, and 1C illustrate implementations of a raceway other implementations may be utilized, such as the modular raceways described herein. In addition the raceway may include one or more other features in conjunction with and/or instead of the described features, such as the features described in U.S. Ser. No. 15/967,455 and/or U.S. patent application Ser. No. 14/776,916, both of which are incorporated fully herein to the extent that their teachings do not conflict with the teachings herein.

For example, a raceway may include receptacles that are similar or dissimilar from each other. A raceway may include a fixed number of connectivity couplers. The raceway connectivity couplers may be equidistant and/or at different distances from other connectivity couplers.

The raceway, such as the raceway described in FIG. 1B may be modular, in some implementations, which may allow low costs customization. For example, the raceway may include components among which appropriate components may be selected for an application. Thus, rather than disposing cabling along a length of the entire raceway, the raceway may include segments that are self-contained (e.g., include connectivity cabling within a housing and/or connectors to facilitate connection between segments without additional tools), in some implementations. FIG. 1B illustrates an implementation of an example raceway 1. As illustrated, the raceway may include a plurality of segments. The raceway 1 is coupled to a connectivity source 10 (e.g., data and/or power) via a connectivity source adapter 20. The connectivity source may be a wall connectivity source and/or core connectivity source (e.g., extending through a floor such as a concrete floor). The connectivity source adapter may couple with the connectivity source via any appropriate connection method, such as hardwiring the adapter to the connectivity source. The adapter may couple with the raceway via connectors (e.g., male/female, quick connect, and/or other connectors). Thus, the connection between the raceway and the connectivity source adapter may be performed without licensed electricians, data installers, etc. This may reduce costs and/or ease installation. In some implementations, modularity of the raceway may be increased since a user may uncouple a particular raceway component and replace it with another raceway components (e.g., for repair, replacement, alterations to the configuration, etc.) rather than hiring a licensed professional to rewire components.

As illustrated, the raceway 1 may extend from the adapter 30 to provide connectivity to various locations in an area of application. The raceway 1 may include segments 100 (e.g., through which connectivity cabling may be disposed) and nodes 200 that provide connectivity to receptacles, furniture, objects, etc. For example, a node 200 may include power socket(s) and/or data socket(s), which may provide connectivity, when coupled, to other objects such as, but not limited to devices (e.g., computers, equipment, robotics, etc.), lighting, wireless gateways and/or routers, furniture (e.g., desks, bookcases, tables, islands, portable kitchens, etc.), towers, and/or any other appropriate object.

Segments of the raceway may include a power track and/or cabling (e.g., data and/or power) and may include connectors 30 at end(s). The power track and/or cabling may transmit connectivity along the length of the segment. As illustrated, segment 100 may be approximately linear (e.g., connectors 30 may be disposed at opposing ends of the segments). Segments of different orientations may be utilized, as appropriate, in addition to and/or instead of linear segments 100. As illustrated, angular segments 300 may be utilized. The angular segments may include connectors disposed at an angle (e.g., approximately 90 degrees, approximately 120 degrees, etc.) relative to each other. As also illustrated, segments may include branching segments. Branching segments 400 may allow more than one segment to be joined to a single segment and/or allow a single segment to be branched into more than one segment. The two of the connectors may be disposed at opposing ends and/or at an angle relative to each other. These segments may be provided in various lengths, in some implementations. Thus, a user may not need to cut and/or bend the segments for various applications. In some implementations, the extenders 500 may be utilized with the raceway 1. Extenders 500 may be similar to segment 100 (e.g., but shorter in length). In some implementations, an extender 500 may include connectors 30 disposed on opposing ends and coupled via cabling (e.g., bars, wires, etc.). For example, the extender may or may not include a power track.

In some implementations, the connectors 30 on components may be compatible. This may provide flexibility in arrangement. For example, the connectors may be selected such that segments and nodes may be placed per a desired arrangement. In some implementations, various components may include at least one male connector and at least one female connector. This may allow these components to be interconnected in any appropriate arrangement. In some implementations, a connector type may be based on the type of component. For example, as illustrated, linear segments 100 may include male connectors, and nodes and other types of segments may include female connectors. Extenders may include at least one male and at least one female connector such that it may couple with either type of connector. Connector adapters and/or extenders may be utilized to connect components with like connectors.

In various implementations, a raceway may be modular. A kit or other source may provide components that allow a raceway to be generated using the components. Components may vary. For example, the raceway may include segments in different lengths and/or orientations (e.g., different room sizes, different arrangements of raceway, etc.). The use of segments may allow custom arrangements (e.g., of nodes and/or pathways of the raceway). In some implementations, the segments may be coupled and/or uncoupled without extra tooling and/or cutting.

A segment of a raceway may include a housing, a power track and/or cabling capable of providing connectivity (e.g., data and/or power), and/or a cover. The housing of the raceway may be utilized to secure cabling (e.g., via a power track and/or wires) and allow transmission of power and/or data connectivity along a length of the raceway.

The housing may include a base with at least two walls that extend from the base. The walls may include coupling members that allow covers and/or receptacles to be at least partially disposed in and/or coupled to the raceway. The power track and/or cabling may be disposed between the walls and/or proximate the base of the housing.

Figure 2A:
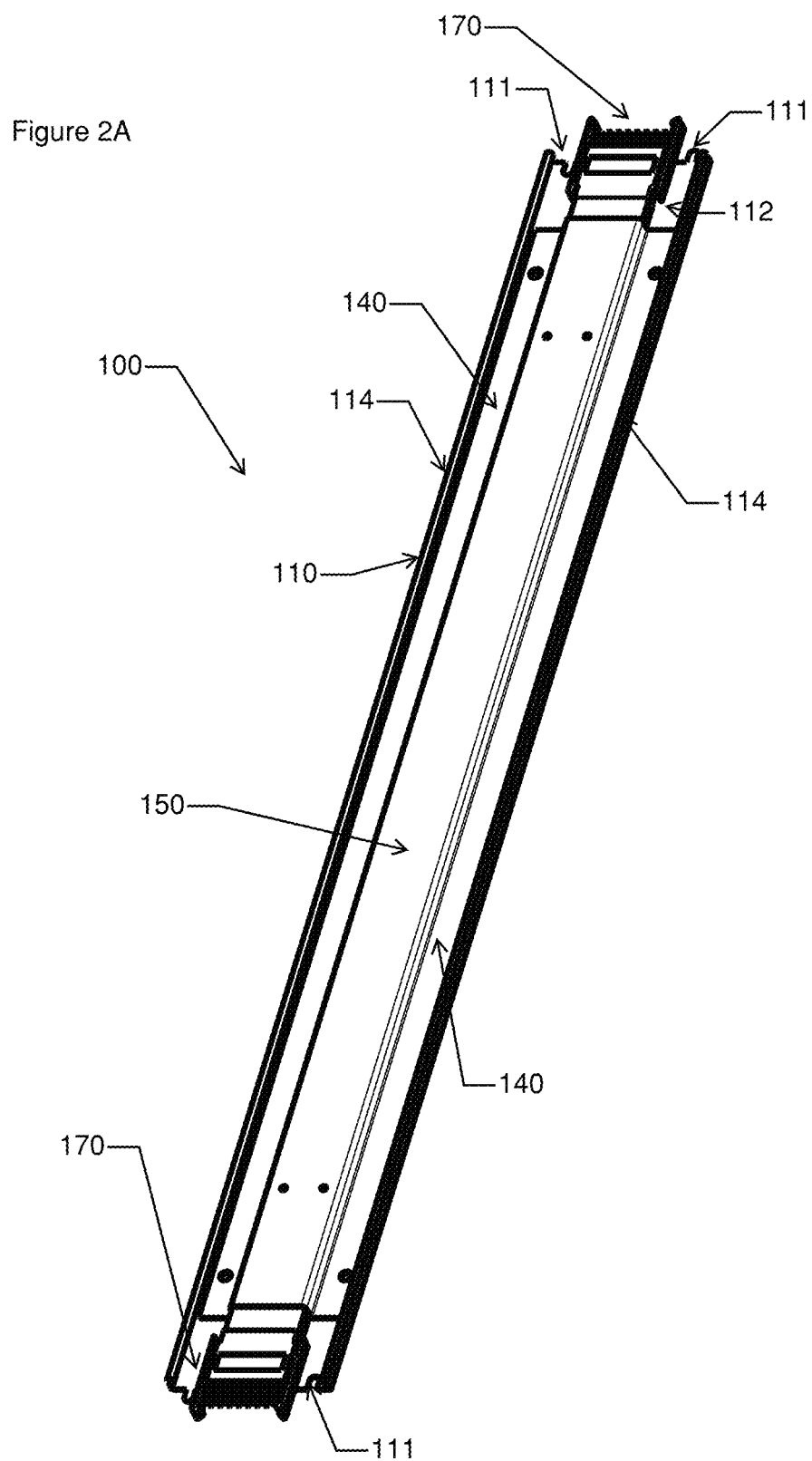
FIG. 2A illustrates a perspective view of an implementation of an example segment of a raceway that provides power connectivity.
Figure 2B:
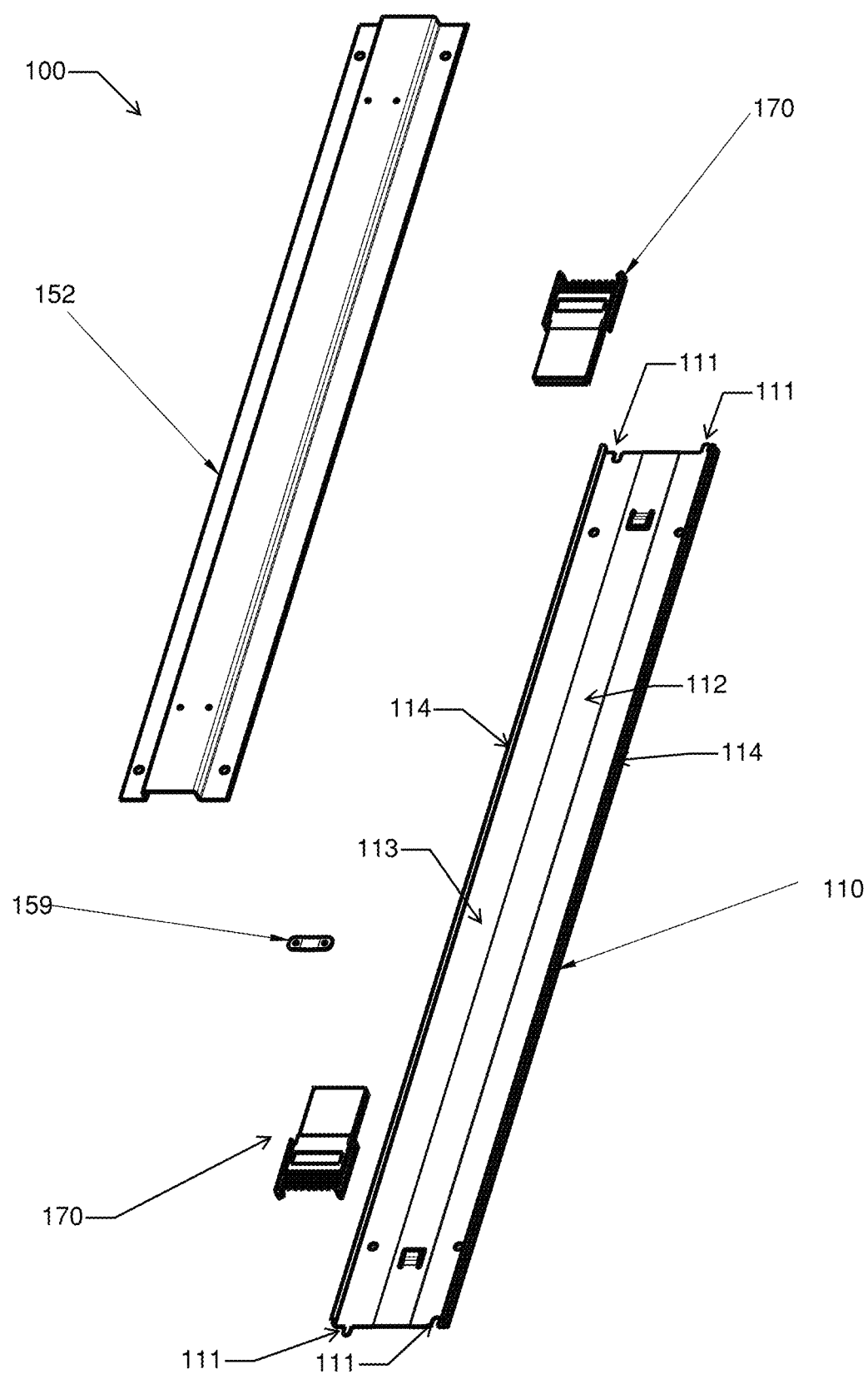
FIG. 2B illustrates an exploded view of implementation of the example segment of a raceway illustrated in FIG. 2A.
Figure 2C:
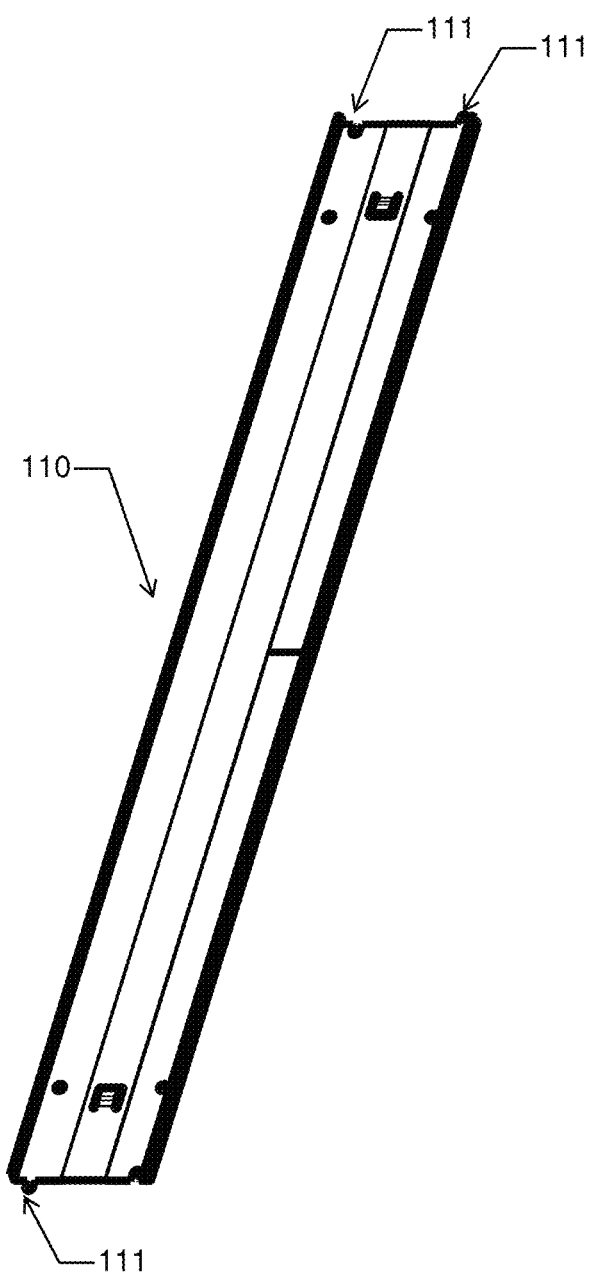
FIG. 2C illustrates a bottom view of an implementation of the example segment of a raceway illustrated in FIG. 2A.
Figure 2E:
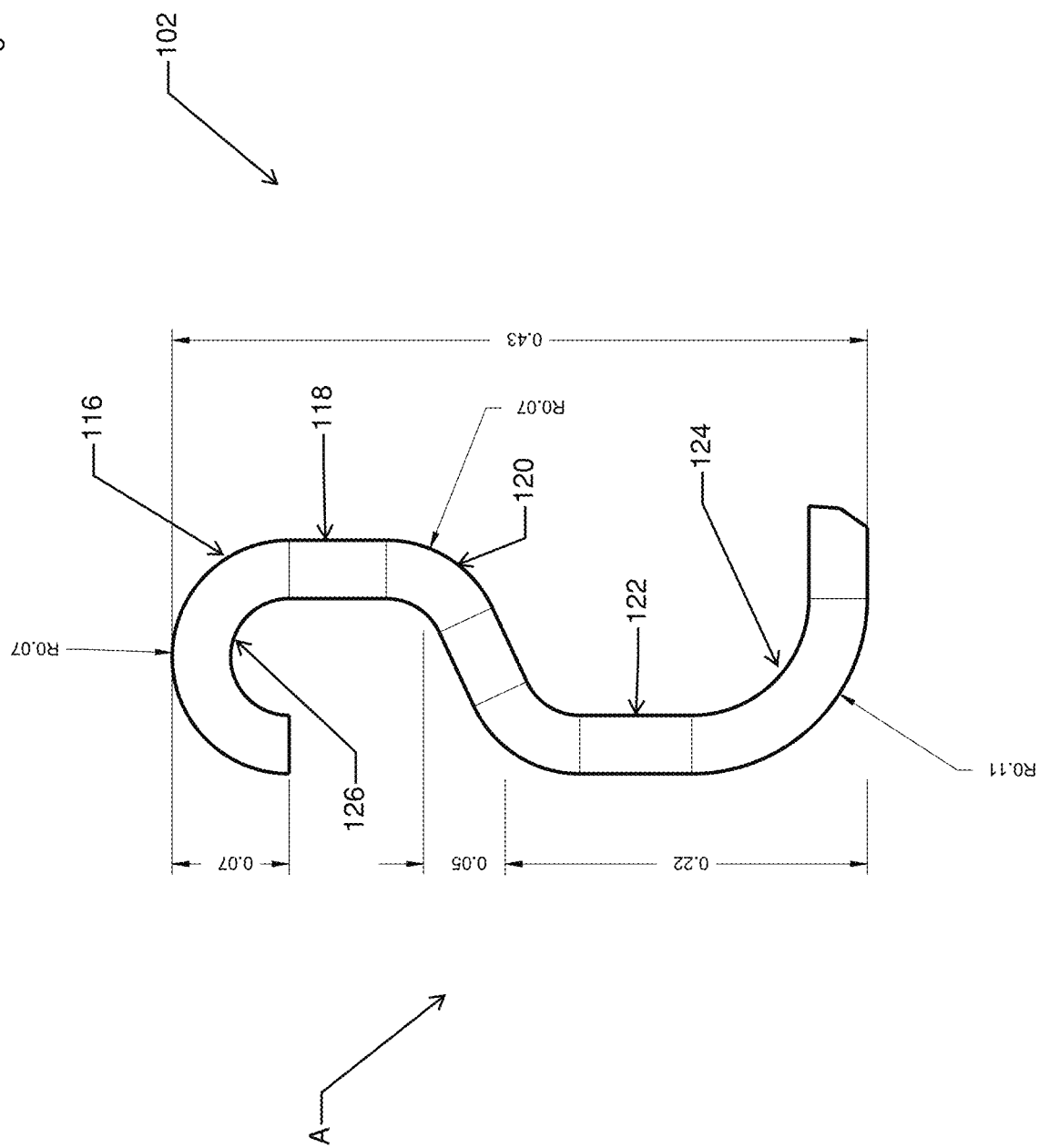
FIG. 2E illustrates a cross-sectional view of an implementation of a portion of the example segment of a raceway illustrated in FIG. 2D.
Figure 2G:
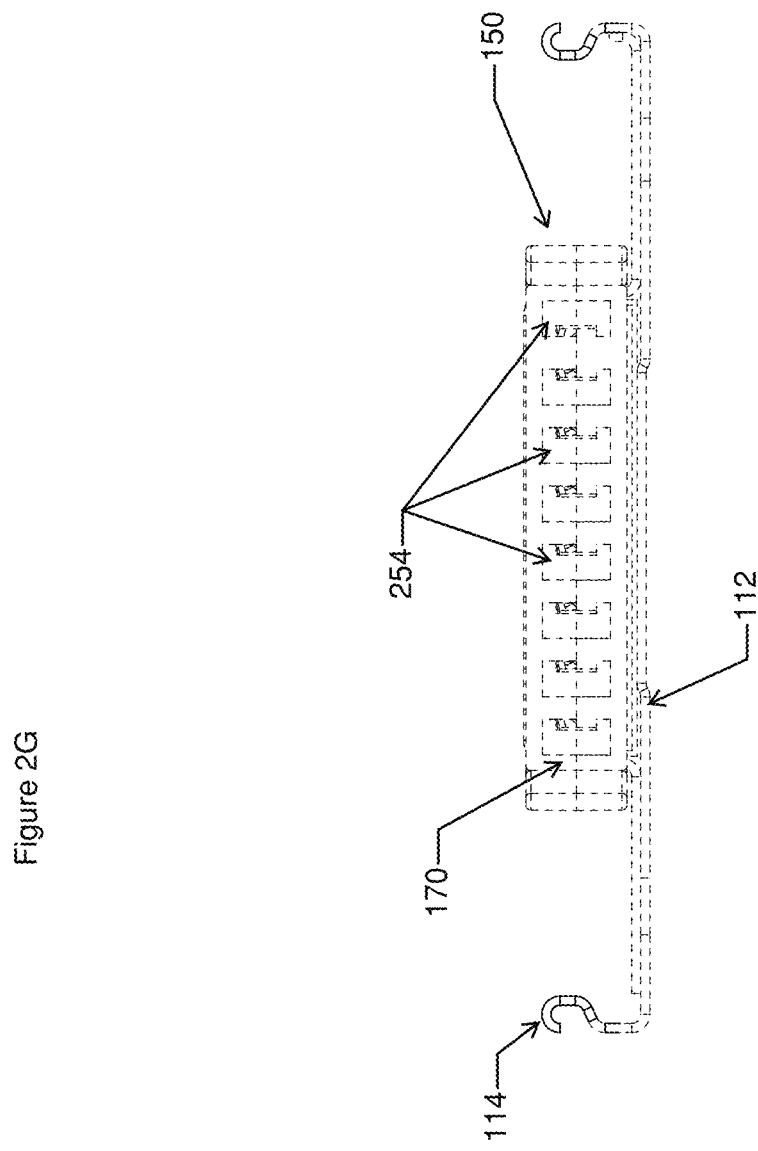
FIG. 2G illustrates a cross-sectional view of an implementation of a portion of the example segment of a raceway illustrated in FIG. 2A.

FIGS. 2A-2G illustrate various perspective views of an implementation of an example segment 100 of raceway or portions thereof. FIG. 2A illustrates a perspective view of an implementation of a segment of a raceway 100 and FIG. 2B illustrates an exploded view of the segment 100 of a raceway. FIG. 2C illustrates a bottom view of the segment 100 of the raceway illustrated in FIG. 2A. FIG. 2D illustrates a cross-sectional view of an implementation of a portion 101 of the segment 100 of the raceway, and FIG. 2E illustrates a cross-sectional view of a portion 102 (e.g., at least a portion of the section marked A in FIG. 2D) of the segment 100 of the raceway. FIG. 2F illustrates a cross-sectional view of the segment 100 of the raceway and FIG. 2G illustrates a side view of the segment 100 of the raceway.

As illustrated, a segment 100 (e.g., of the raceway) may include a housing 110 and a power track 150 disposed in the housing. The housing 110 may include key(s) 111 (e.g., recess(es), protrusion(s), slot(s), bar(s), etc.) to facilitate connection of the segment in a proper orientation relative to another component of the raceway. For example, key(s) from a first component may be received by and/or receive key(s) from a component to which it is coupling. As illustrated, a key may include a protrusion and/or a recess on at least on side of the housing of the segment. If a user attempted to couple one segment 100 with another segment 100 in a flipped orientation (e.g., protrusions from segments would align rather than a protrusion aligning with a recess), the protrusion on one of the segments may inhibit coupling by creating a gap between the segments. The housing 110 of raceway may include a base 112 and two walls 114 extending from the base and/or a wall 114 may extend from an end of the base 112 of the housing. A first wall may be disposed on opposing side of the base as the second wall. The walls (e.g., on each side of the base) may have similar cross-sectional shapes and/or dimensions to facilitate coupling other components such as receptacles and/or covers to the housing.

The walls 114 of the housing 110 may couple cover(s), receptacles, ramps, and/or other components of the raceway with the housing. Walls 114 may be flexible. Thus, as cover(s) and/or receptacles are inserted at least partially into the housing 110, the walls 114 may flex outward 115 (e.g., in a direction away from the base). The walls may exert a force on inserted cover(s) and/or receptacle(s) to retain and/or inhibit release of the cover(s) and/or receptacle(s) from the housing 110. For example, as a cover is inserted, it may cause the walls to be deflected outwards 115. As the walls 114 attempt to return to their initial position, the walls may exert a force in the direction opposed to direction 115 on the cover. Since a wall and the base are coupled and since a wall may inhibit deformation (e.g., the walls may be elastically flexible), a force opposing the direction 115 may be exerted by the coupling and thus by the wall to return the wall to its initial position.

As illustrated in FIGS. 2D and 2E, the walls may include straight and curved sections. A wall may include a first curved section 116 (e.g., at least a portion is curved) and a first straight section 118 (e.g., at least a portion is straight). The first curved section 116 may facilitate insertion of cover(s), receptacles, etc. In some implementations, since the walls are configured to secure the cover(s) and/or receptacles to the housing, the curvature of the first curved section may make it easier for cover(s) and/or receptacles to gently deflect the wall while inhibiting damage to the wall. The first straight section 118 may guide the inserted object (e.g., cover, receptacle, etc.) into the cavity 113 of the housing. The wall may include a second curved section 120 (e.g., at least a portion is curved) and a second straight section 122 (e.g., at least a portion is straight). The second curved section 120 may couple the first straight section 118 and the second straight section 122. The second curved section 120 may curve outward 115 and may allow the first straight section 118 to be disposed closer to an inner side 130 of the housing than the second straight section 122. The second straight section 120 may be disposed closer to the outer side 131 than the first straight section 118. The second straight section 122 being set back from the first straight section 118 (e.g., relative to the inner side 130) may create an area which is configured to receive portions of the power track, cover(s), etc. This area may facilitate coupling the component such as a power track 150 and/or cover to the housing. The wall 114 may include a third curved section 124 (e.g., at least a portion is curved). The third curved section may be capable of receiving and/or coupling with at least a portion of components disposed in the housing, such as at least a portion of the power track. The wall may include a fourth curved section 126 (e.g., at least a portion is curved). The fourth curved section 126 may be proximate an outer side 131 of the housing 110 and/or may be configured to receive components external to the cavity 113 of the housing. For example, the fourth curved section 126 may receive at least a portion of a ramp 134 (e.g., coupled to the raceway to decrease trip hazards caused by a height difference between a raceway and a floor) disposed proximate an outer side 131 of the housing 110, as illustrated in FIG. 1I.

A protrusion 135 of the ramp 134 may be received in the fourth curved section 126 of a wall 114.

Figure 3A:
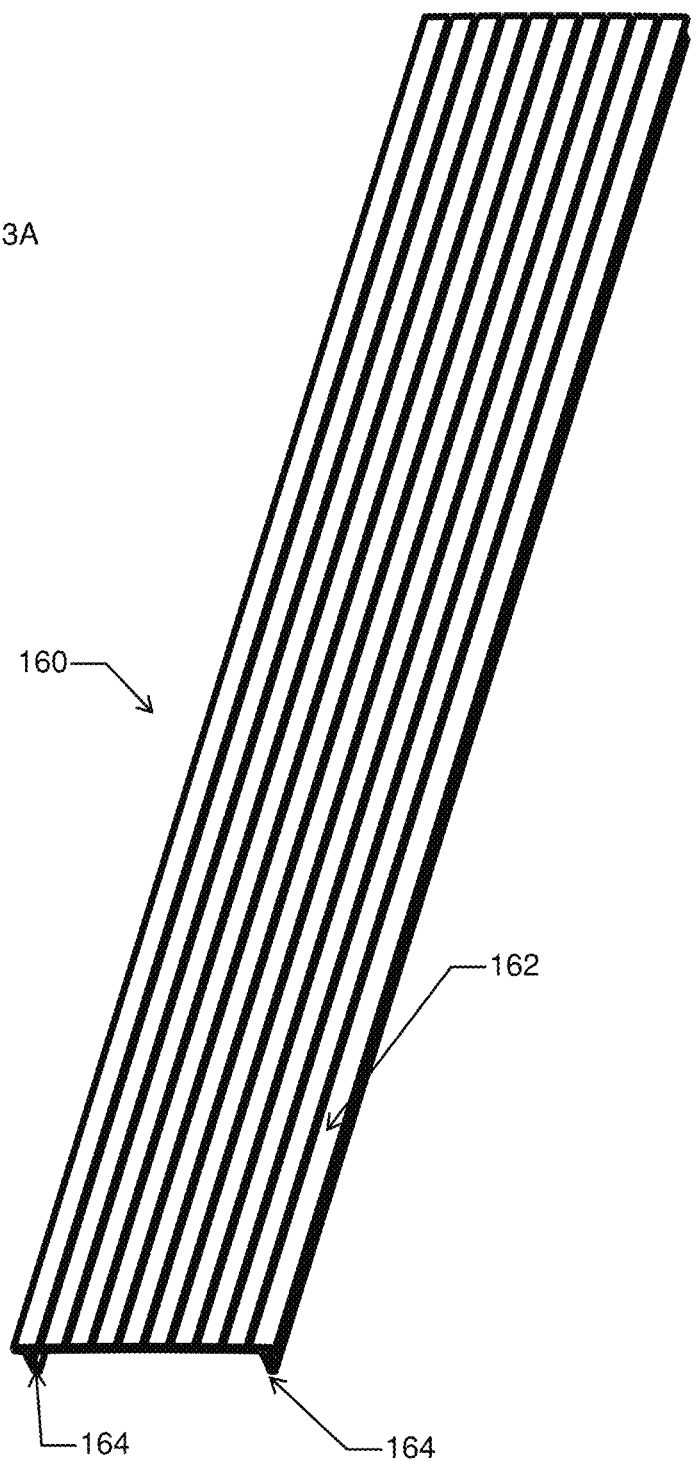
FIG. 3A illustrates a perspective view of an implementation of an example cover.
Figure 3B:
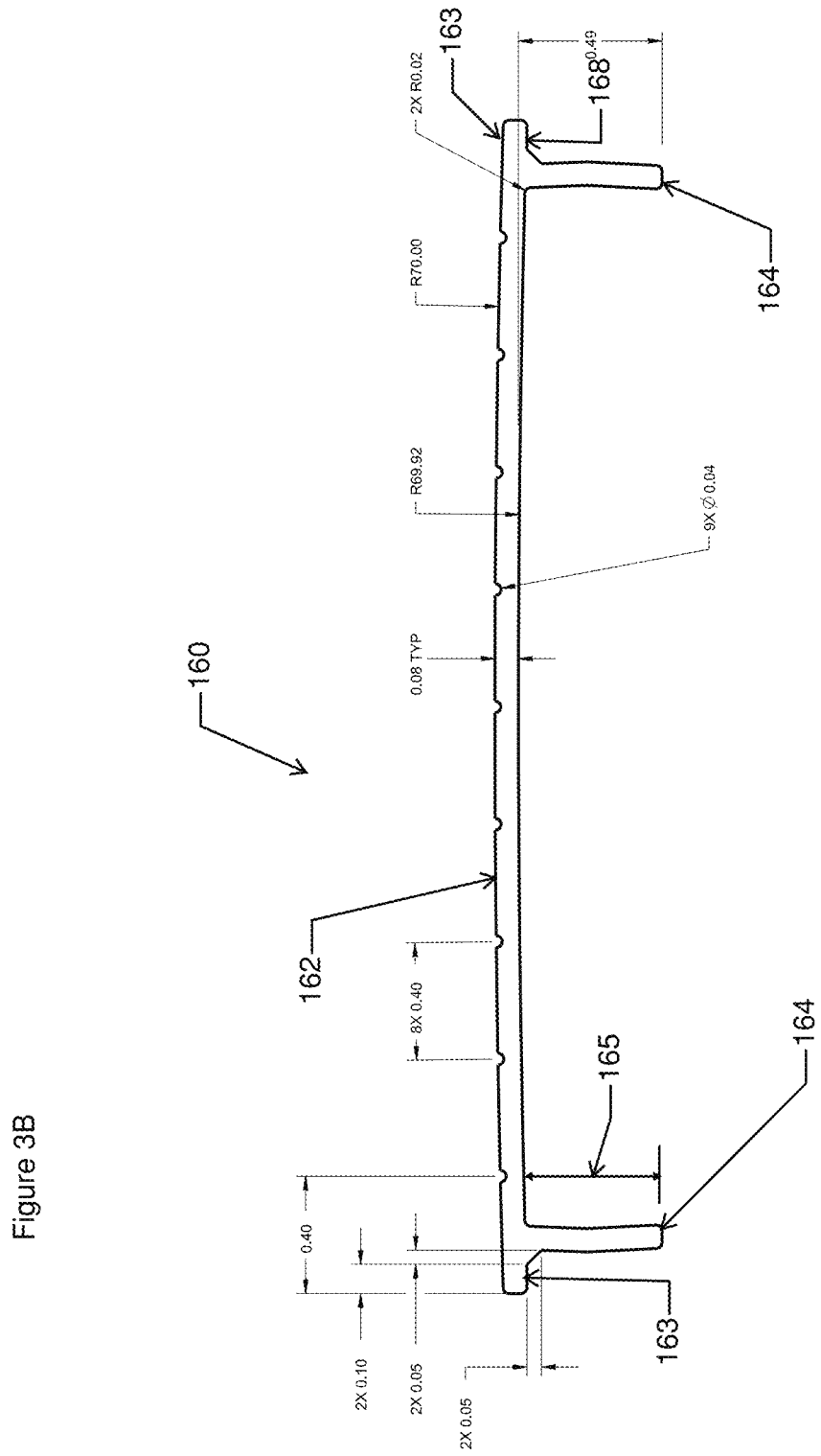
FIG. 3B illustrates a side view of an implementation of the example cover illustrated in FIG. 3A.
Figure 3C:
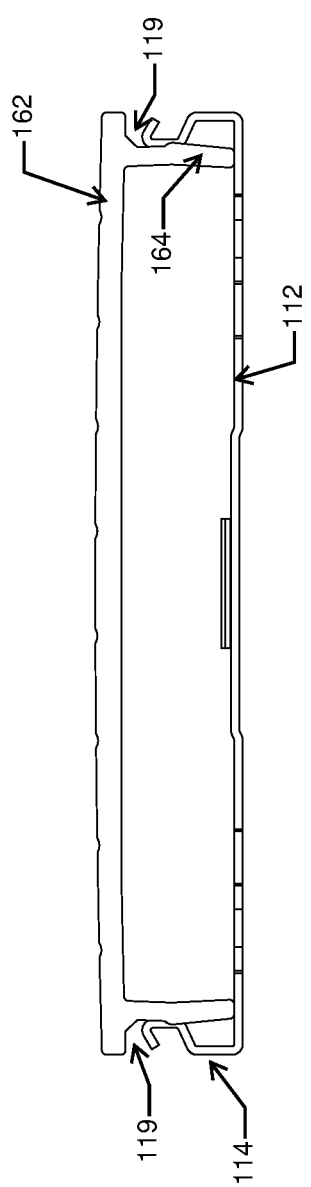
FIG. 3C illustrates a side view of an implementation of the example cover illustrated in FIG. 3A disposed in an example raceway housing of 17A.

In some implementations the fourth curved section 126 of a wall 114 of a housing 110 may facilitate removal of components coupled to the housing such as a cover. As illustrated in FIGS. 3A and 3B, a top cap 162 of a cover 164 may extend beyond the walls 164 of the cover. Extending the top cap 162 may inhibit fluids, dust, and/or other debris from entering the cavity of the housing and thus may inhibit damage to power and/or data cabling in the housing (e.g., due to fluids, dust, and/or other debris). A gap (e.g., gap 119 in FIG. 3C) may reside between the curvature of the fourth curved section 126 of the wall 114 of the housing 110 and the extended portion 163 of the top cap 164. The gap may allow contact with an underside 168 of the extended portion 163 of the top cap 164 to facilitate removal of the cover from the housing. For example, a tool such as a flat head screwdriver or a finger may be at least partially inserted into the gap and the cover 160 may be pried off the housing (e.g., by contacting the a portion of the screwdriver with the underside 168 of the extended portion 163 of the top cap 162).

Figure 2H:
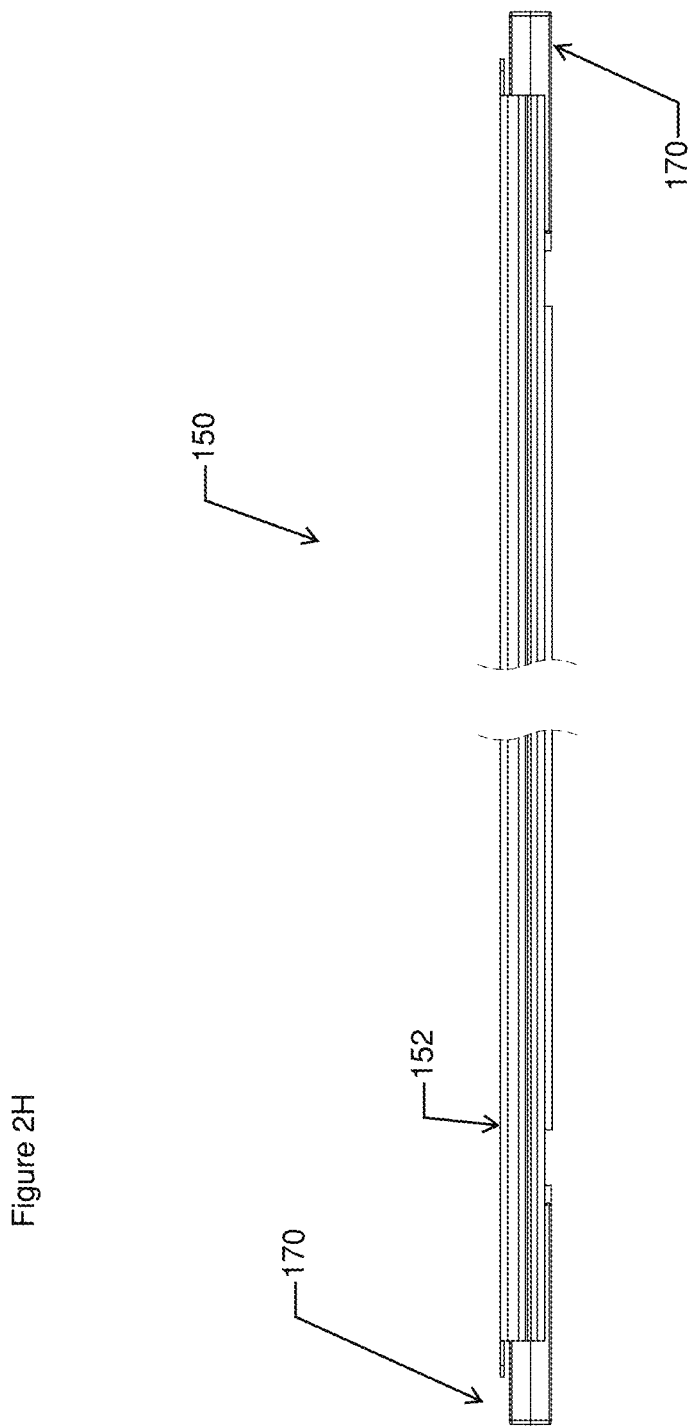
FIG. 2H illustrates a side view of an implementation of a portion of the example power track of a raceway.
Figure 21:
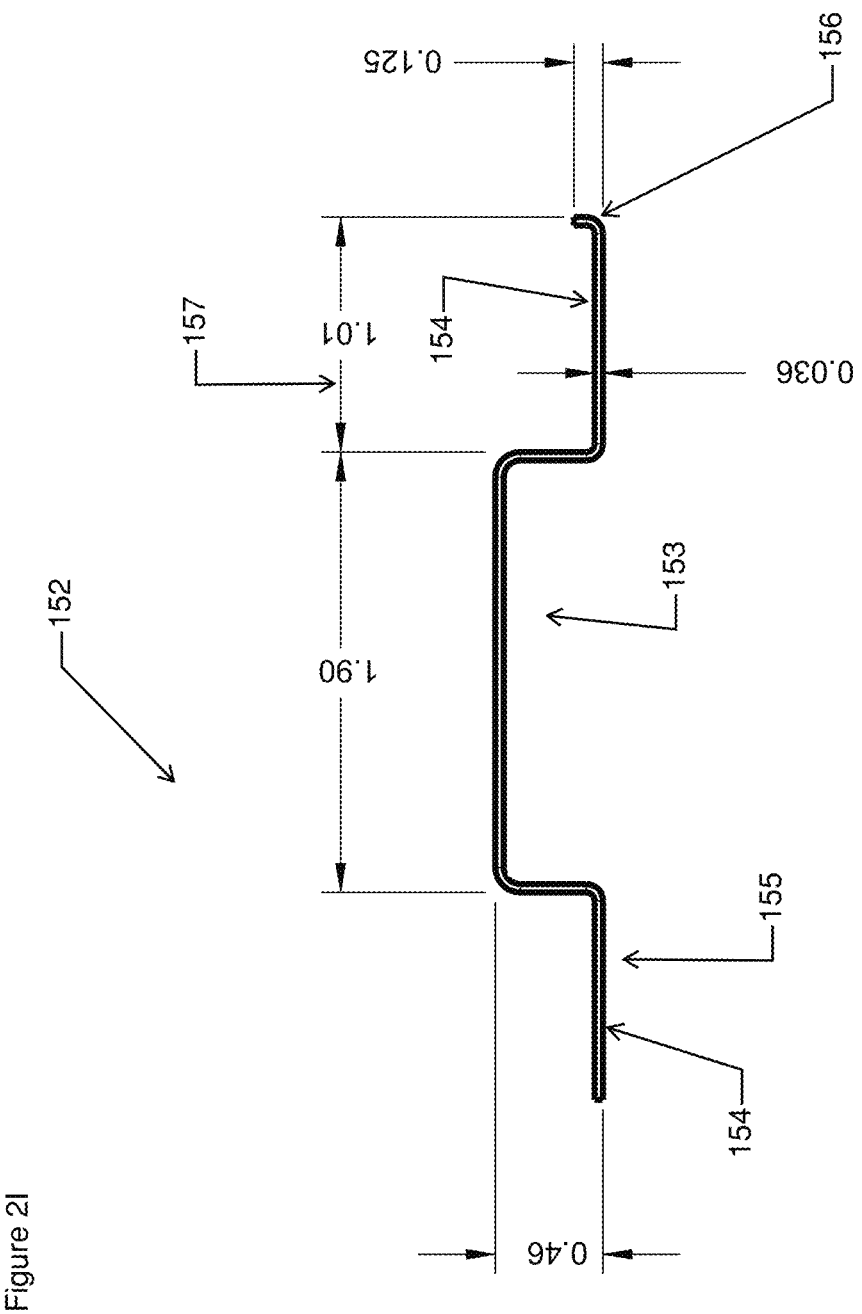
FIG. 21A illustrates top view of an implementation of an example receptacle.
FIG. 21B illustrates a bottom perspective view of an implementation of the example receptacle illustrated in FIG. 21A.

A power track 150 may be disposed at least partially in and/or may be coupled to the housing. The power track may include power cabling (e.g., bars, wires, etc.) to provide the power connectivity capability. FIG. 2G illustrates a side view of an example power track 150 in a housing 110 and FIG. 2H illustrates a different side view of the power track. As illustrated in FIGS. 2A and 2G, the power track may reside within the height of the housing and/or may extend beyond the length of the housing. The power track may include a case 152 (e.g., housing for power track, protective outer covering), cabling (not shown) disposed in the case, and connectors 170. FIG. 2I illustrates a cross-sectional view of the case 152. The case may include a top section and two walls that extend from the top section to create a cavity between the walls. As illustrated, the case 152 may include a cavity 153. In some implementations, the case 152 may include one or more recesses and one or more cavities 153 may be disposed in the recess of the case. The case 152 may include at least one flange 154 disposed about side of the case. The flange may extend beyond the cavity (e.g., from walls of the case). As illustrated in FIGS. 2G and 2I, a flange may be disposed on each side of the case 152. The underside 155 of a flange 154 may be disposed on an inner surface of the base of a housing. The flanges may have a length 157 such that the power track fits in the width of the cavity of the housing. The length 157 of the flange 154 may be selected such that the ends of the flange contact and/or are proximate the walls of the base of the housing. The case 152 may be frictionally fit in the housing. In some implementations, the flange(s) may be flexible to facilitate insertion into the housing. The flange may include a protrusion 156 (e.g., proximate an end of the flange) with a shape such that it is received in a portion 136 of the housing 110, illustrated in FIG. 2D. For example, the protrusion may have a curvature similar to the curvature of the portion 136 of the housing.

The power track may include power cabling (e.g., wires, bars, etc.) disposed in the case. The power cabling may be coupled to a connector 170 at each end of the power cabling. To inhibit the connectors 170 and/or the wires from releasing from being at least partially disposed in the cavity 153 of the case 152, the connectors may be coupled to the case. The case 152 and the connector 170 may be coupled via member 159, as illustrated in FIGS. 2B and 2G.

In some implementations, the power cabling may include wires that are coupled to bars within a connector. Electricity may be allowed to be transmitted from the wires to the bars of the connector and to another connector (e.g., for delivery of electricity to another component of the raceway).

Although FIGS. 2A-2G illustrate an implementation of a segment of a raceway, a raceway and/or segment of a raceway may or may not include one or more of the features illustrated. In some implementations, the raceway and/or segment of the raceway may include additional features. For example, a power track may be coupled to the housing via an appropriate coupling such as screws, bolts, snap-fit connection, glued, welded, etc. As another example, the housing may be utilized without the power track. Power cabling may be disposed in the housing (e.g., in the base of the housing). Wire clips may or may not be utilized to secure the power cabling in the housing.

Figure 2J:
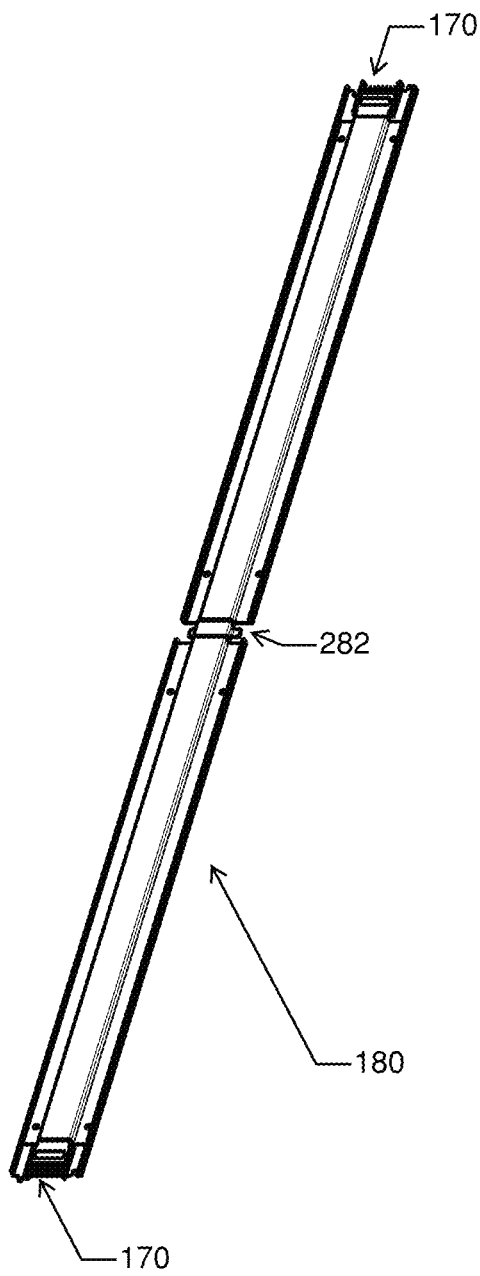
FIG. 2J illustrates a perspective view of an implementation of an example segment of a raceway that is capable of folding, in an unfolded position.
Figure 2K:
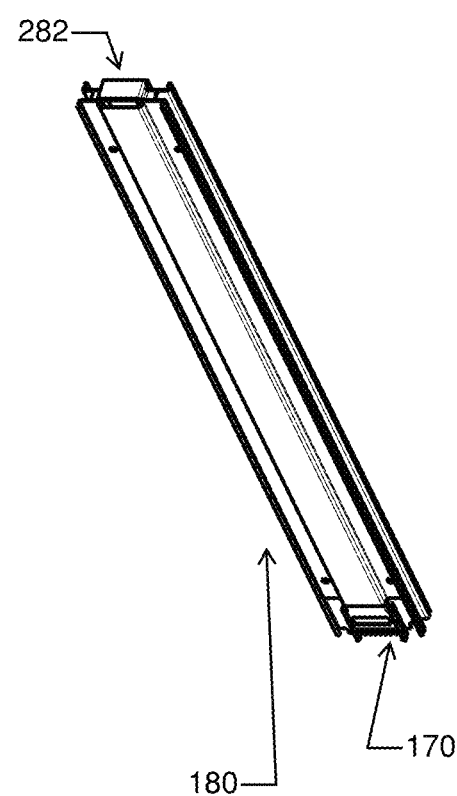
FIG. 2K illustrates a perspective view of an implementation of the example segment, illustrated in FIG. 2J, in a folding position.

In some implementations, the segment 100 may include a hinge. FIG. 2J illustrates an implementation of an example hinged segment 180 in an unfolded position and FIG. 2K illustrates the segment 180 in a folded position. As illustrated, the housing may include one or more hinges 182 that allow a length of the segment to be decreased by folding the length of the segment. As illustrated, the power track and/or other portion of the segment may include hinges or portions that are flexible to allow folding at the hinge(s). For example the power track may include accordion style folds that facilitate bending the power track. As another example, the power track may include corresponding hinges to the hinges in the housing of the segment.

In some implementations, walls may not be similar in cross-sectional shape and/or dimensions. Walls may include different cross-sectional shape to facilitate coupling when using receptacles and/or covers in which orientation relative to the housing is controlled. A cover, for example, may have an orientation for aesthetic purposes and the walls with different cross-sectional shapes and/or dimensions may allow the cover to be installed in one orientation and inhibit installation in other orientation. For example, a cover may have legs of different heights to accommodate providing a surface that is parallel to flooring surface when subfloors are not level (e.g. sloped, recessed, etc.).

As illustrated, the segment 100 may be approximately linear; however, segments of other configurations may be used in place of and/or in addition to linear segments. The availability of different configurations of segments may allow more customization of the raceway to a particular application while still using modular components (e.g., as opposed to customizing each piece may cutting and/or bending the pieces). For example, a segment of a raceway may include an angular segment 300 and/or branching segments 400.

Figure 4C:
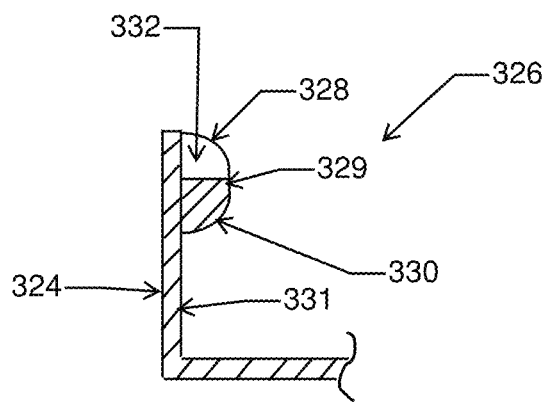
FIG. 4C illustrates cross-sectional side view of an implementation of a portion of the example angled segment illustrated in FIG. 4A.
Figure 4D:
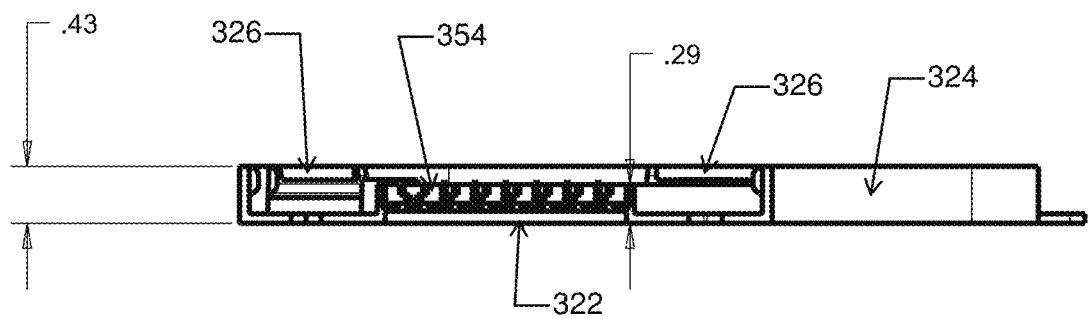
FIG. 4D illustrates a side view of an implementation of the example angled segment illustrated in FIG. 4A.

Angular segments may have any appropriate angle (e.g., such that the cabling within the angle is not damaged by for example kinking). For example, an angular segment 300 may have an angle of approximately 60 degrees, approximately 90 degrees, approximately 120 degrees, etc. The angle may facilitate bending the raceway for particular applications (e.g., to turn the raceway). The angle of the segment may be fixed and/or variable (e.g., the housing may have a rotatable connection that allows a user to adjust the angle. FIG. 4A illustrates an implementation of an angular segment 300 and FIG. 4B illustrates a cross-sectional view of the angular segment 300. FIGS. 4C and 4D illustrate side views of the angular segment. The angular segment 300 may have an angle 301. The angular segment 300 may include a first end 310 and a second end 312. The body of the angular segment 300 may bend in an angle 301 between the first end and the second end. As illustrated, the angle 301 may be approximately 90 degrees, in some implementations. The angular segment 300 may include a housing 320. The housing may include key(s) 302 (e.g., recess(es), protrusion(s), slot(s), bar(s), etc.) to facilitate connection of the angular segment in a proper orientation relative to another component of the raceway.

The housing 320 of the angular segment may include a base 322 and walls 324 extending from the base. As illustrated, a wall 324 may extend from an end of the base 322. The wall(s) 324 may include coupling part(s) 326 disposed separately (e.g., as illustrated in FIGS. 4A-E) and/or continuously along the length of the wall. A coupling part 326 may facilitate coupling cover(s) (e.g., cover 300) and/or receptacle(s) to the housing 320 of the angular segment 300. The coupling part 326 of the walls may include curved and straight sections similar to the segment 100 in some implementations. For example, the wall may include a first curved section 328, a first straight section 329, a second curved section 330, and a second straight section 331. The wall 324 may include a recess 332 disposed in the coupling part. The recess may allow a gap to be created between the housing of the angular section and a cover coupled to the housing. The gap may allow contact with an underside 168 of the extended portion 163 of the top cap 164 of a cover (see e.g., FIG. 3A-3C) to facilitate removal of the cover from the housing. For example, a tool such as a flat head screwdriver or a finger may be at least partially inserted into the gap and the cover 160 may be pried off the housing (e.g., by contacting the a portion of the screwdriver with the underside 168 of the extended portion 163 of the top cap 162).

In some implementations, a wall similar to the wall 324 with coupling portions 326 may be utilized rather than a wall similar to the wall of 114 of segment 100 due to the material from which the housing is formed. As a nonlimiting example, plastic based housings may include walls similar to wall 324 since recesses may be easier and/or cheaper to produce rather than fourth curved sections, as in wall 114. As another nonlimiting example, a metal (e.g., stainless steel, steel, aluminum, etc.) housing may include a wall similar to wall 114 since curved sections may be more easily and/or cheaply formed than recesses, such as the recess 332 of wall 324.

As illustrated, a power track 340 may be disposed in the housing 310 of the angular segment 300. Cabling (e.g., wires and/or bars) may be disposed in the power track 340. Connectors 350 may be coupled to each end of the cabling to allow the connectivity (e.g., power) to be transmitted along a length of the angular segment 300. As illustrated, the connectors 350 may be disposed at each end of the power track 340. In some implementations a connector 350 may include channels disposed at least partially through the connector. As illustrated, a connector 350 may include first channels 352 and second channels 352, which are more proximate a second end of the connector than the first channels 352. One or more of the channels 354 may form the male and/or female style connector, as illustrated, connector that couples with the connector of other components. Portions of the cabling (e.g., wires and/or bars) may reside in and/or proximate one or more of other channels 352. In some implementations, bus bars may extend through proximate channels (e.g., 352) and/or may be coupled to cabling in the power track 340. As illustrated, a bus bar may extend from a channel 354 to a channel 352, thus, when the connector 350 is coupled to another component, the bus bar may contact the connector of the other component and transmit the connectivity from the cabling in channel 352 to the other component via the bus bar.

The angular segment 300 may include one or more described features of the segment 100. In some implementations, a PCB (printed circuit board) may be used in place of wiring to allow angles in the angular segment that might be too tight (e.g., the wires may kink and/or have a loss of signal due to the radius) for wiring in a low height profile (e.g., less than 1 inch, less than ½ inch) and/or to facilitate inclusion of cabling in a low profile.

Figure 4F:
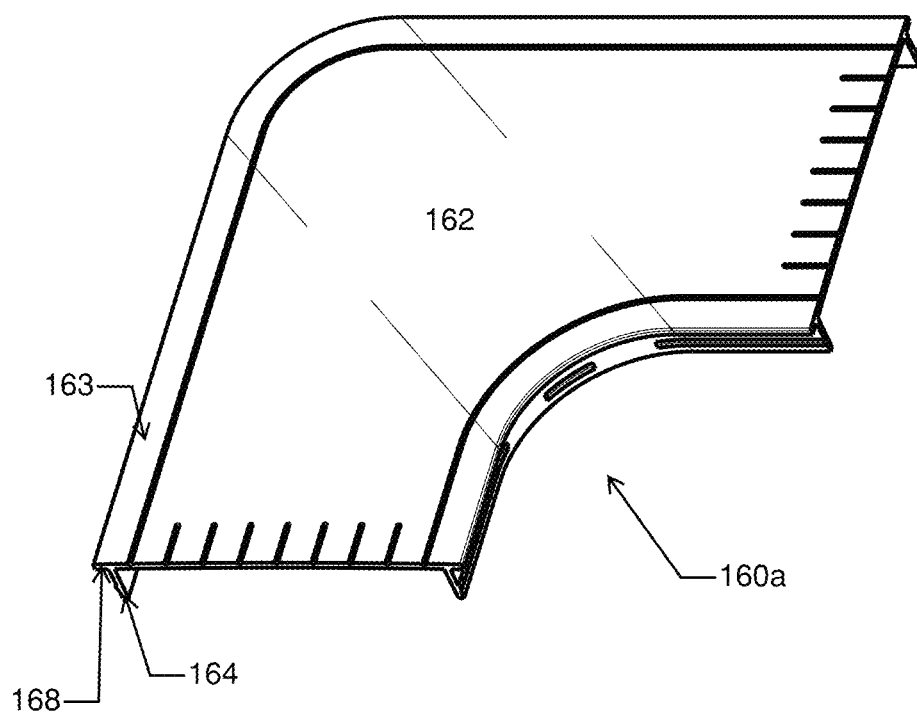
FIG. 4F illustrates an implementation of an example cover for the example angled segment illustrated in FIG. 4A.

Cover(s) 160 may be utilized to cover the housing and/or portions thereof (e.g., power track). The cover 160 may have a shape similar to the component. FIG. 4F illustrates an implementation of a cover 160a that may be utilized with an angling segment. The cover 160a may include one or more of the features of cover 160. As illustrated, the cover 160a may include a top cap 162 with an extending portion 163. The cover 160a may include wall(s) extending from the top cap 162.

In some implementations, a raceway may include a component such as branching segment 400. A branching segment may include one or more features of the segment 100 and/or the angled segment 300. A branching segment may include a body with more than 2 arms. The arms may or may not be equally disposed (e.g., disposed) about the body. As illustrated, the branching segment 400 includes three arms in a T-shaped orientation; however, three or more arms may be disposed in any other appropriate orientations, such as Y-shaped orientation, H-shaped orientation, equally spaced about a body, etc. The orientation of the branching segment may be selected based on the application in which the segment will be used. The branching segment 400 may include keys 302 to facilitate proper orientation and alignment when connecting the branching segment with other components of the raceway (e.g., segment 100, nodes, etc.).

As illustrated, the branching segment 400 may include features of the angled segment 300. For example, the branching segment may include a housing 420 with a base 322 and walls 324 extending from the base. The walls 324 may include coupling parts 326. The coupling sections may be similar to the coupling parts in wall 114 and/or the coupling parts of wall 324. The coupling part 326 of the walls may include curved and straight sections similar to the segment 100 in some implementations. For example, the wall may include a first curved section 328, a first straight section 329, a second curved section 330, and a second straight section 331. The wall 324 may include a recess 332 disposed in the coupling part. The recess 332 may allow a gap to be created between the housing of the angular section and a cover coupled to the housing.

As illustrated, a power track 340 may be disposed in the housing 420 of the branching segment 400. Cabling (e.g., wires and/or bars) may be disposed in the power track 340. Connectors 350 may be coupled to each end of the cabling to allow the connectivity (e.g., power) to be transmitted along a length of the angular segment 300. As illustrated, the connectors 350 may be disposed at each end of the power track 340 and may include bars and/or channels similar to the described channels 352, 354. A bus bar may extend from a channel 354 to a channel 352, thus, when the connector 350 is coupled to another component, the bus bar may contact the connector of the other component and transmit the connectivity from the cabling in channel 352 to the other component via the bus bar.

The branching segment 400 may include one or more described features of the segment 100 and/or 300. In some implementations, a PCB (printed circuit board) may be used in place of wiring to allow angles in the branching segment that might be too tight (e.g., the wires may kink and/or have a loss of signal due to the radius) for wiring in a low height profile (e.g., less than 1 inch, less than ½ inch) and/or to facilitate inclusion of cabling in a low profile.

Figure 5A:
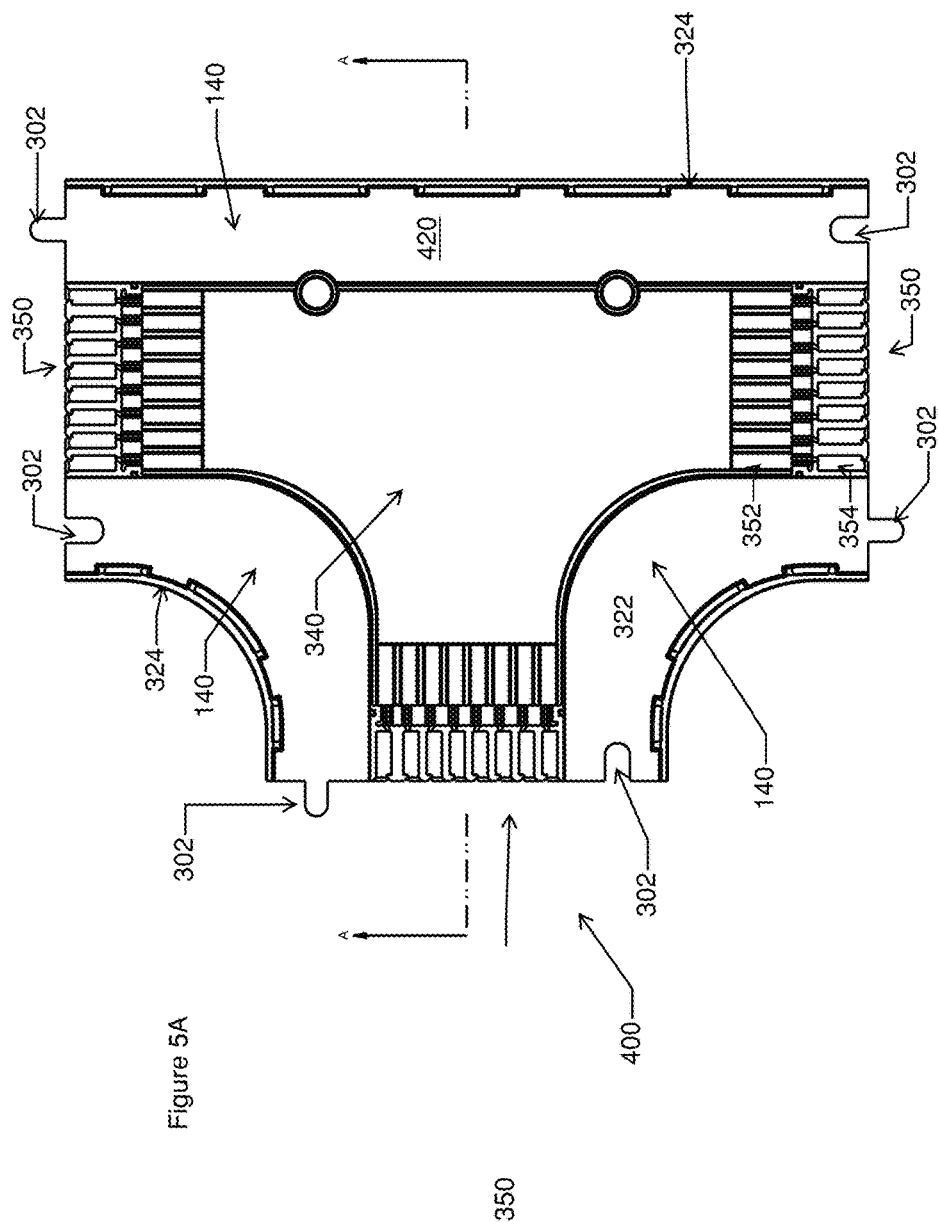
FIG. 5A illustrates top cross-sectional view of an implementation of an example branching segment.
Figure 5B:
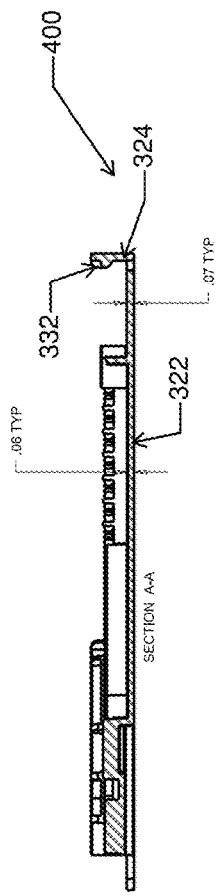
FIG. 5B illustrates side cross-sectional view of an implementation of the example branching segment illustrated in FIG. 5A.
Figure 5C:
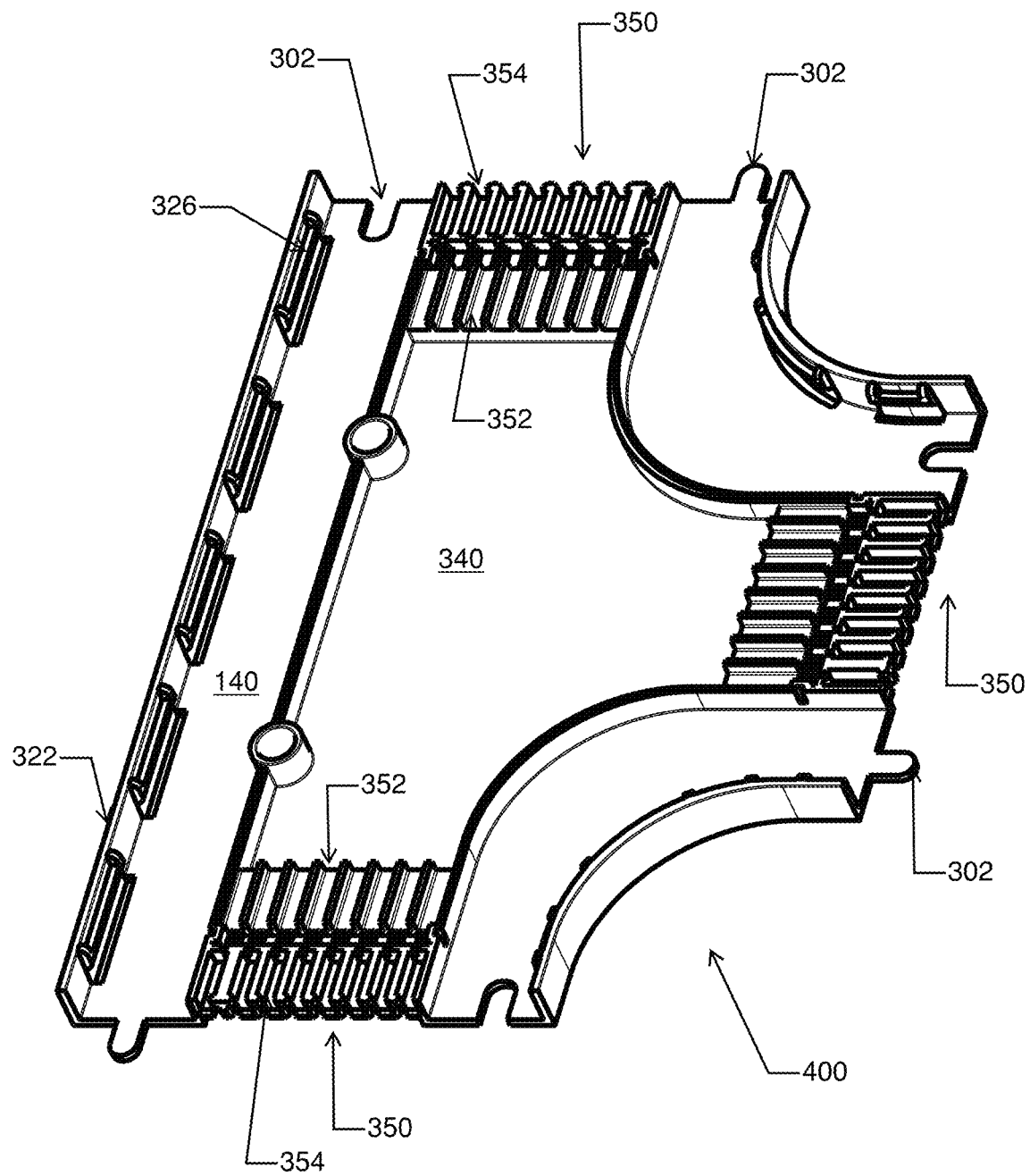
FIG. 5C illustrates top perspective view of an implementation of the example branching segment illustrated in FIG. 5A.
Figure 5E:
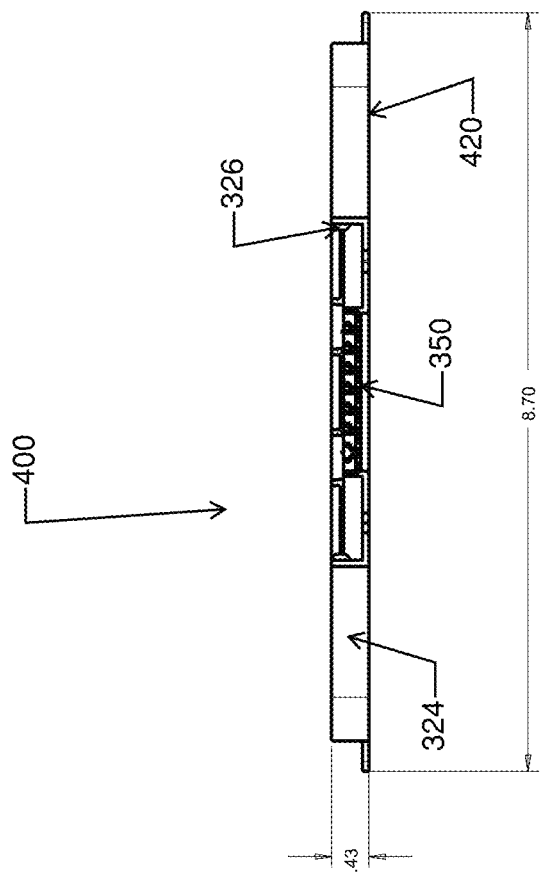
FIG. 5E illustrates another side view of an implementation of the example branching segment illustrated in FIG. 5A.
Figure 5D:
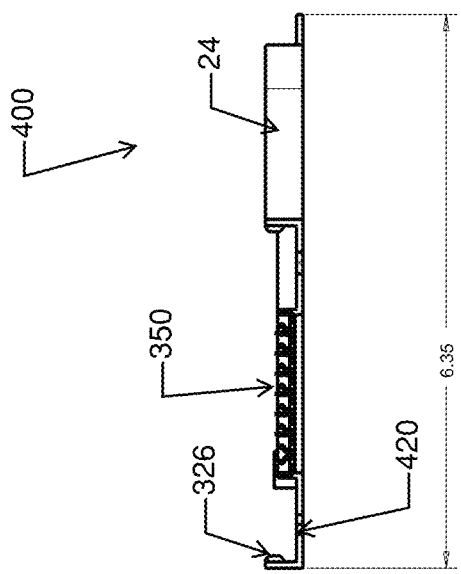
FIG. 5D illustrates a side view of an implementation of the example branching segment illustrated in FIG. 5A.
Figure 5F:
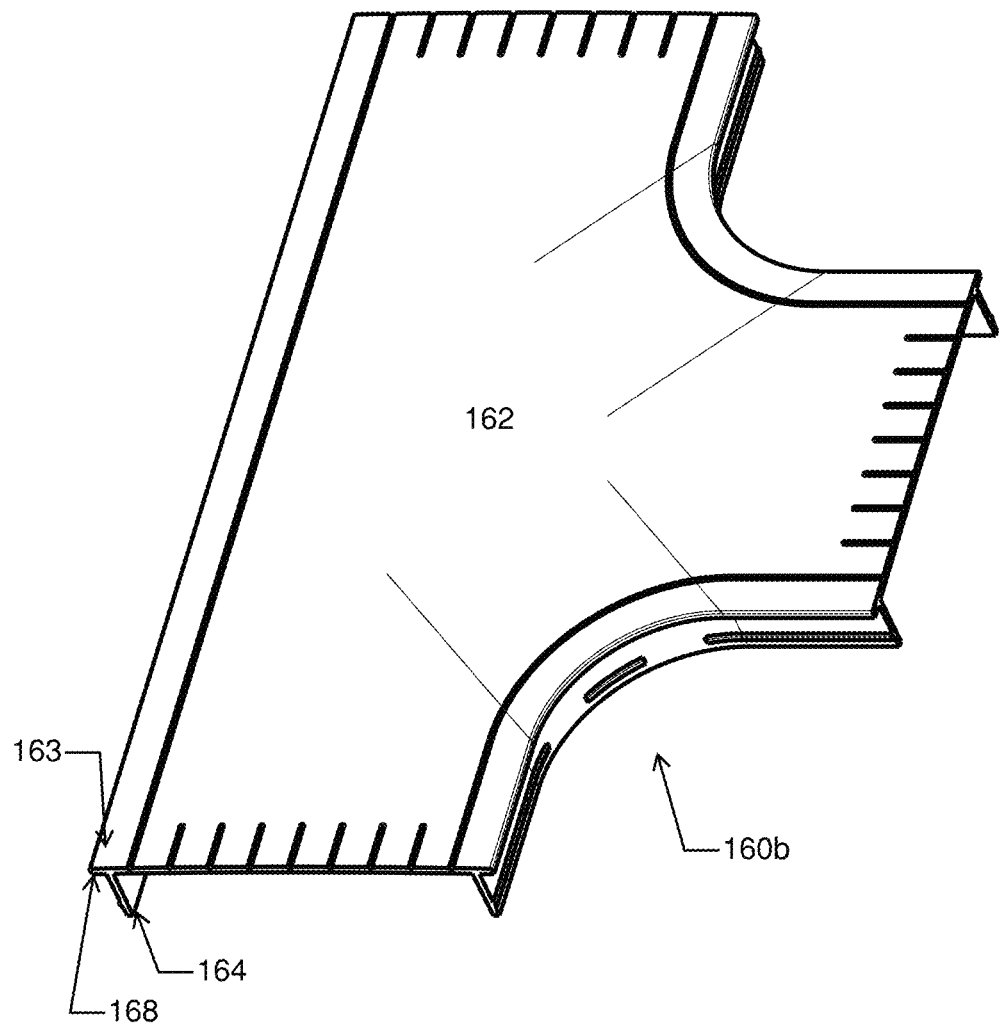
FIG. 5F illustrates an implementation of an example cover for the example branching segment illustrated in FIG. 5A.

Cover(s) 160 may be utilized to cover the housing and/or portions thereof (e.g., power track). The cover 160 may have a shape similar to the component. FIG. 5F illustrates an implementation of a cover 160b that may be utilized with an branching segment. The cover 160b may include one or more of the features of cover 160. As illustrated, the cover 160b may include a top cap 162 with an extending portion 163. The cover 160a may include wall(s) extending from the top cap 162.

In various implementations, the raceway 1 may include node(s) 300. The nodes may provide access to the connectivity provided by the raceway. For example, receptacle(s) (e.g., that include power and/or data sockets), furniture, and/or other objects may be coupled to the raceway via the nodes 300. The nodes may receive connectivity (e.g., from upstream), allow the connectivity to be utilized by objects (e.g., receptacles, furniture) coupled to the node, and/or allow the connectivity to be transmitted through the node to other portions of the raceway (e.g., downstream). In various implementations, the nodes may allow connectivity to an object (e.g., receptacle) independently of whether other receptacles are coupled to nodes upstream (e.g., electrically upstream). For example, one or more features of the raceway described in U.S. Pat. No. 9,960,554 (filed Mar. 13, 2014) and/or U.S. patent application Ser. No. 15/967,455 (filed Apr. 30, 2018) may be utilized in the described raceway. The raceway may be configured and/or reconfigured such that one or more node can be disposed along a length of a raceway, as needed for an application. A node and/or a node and another component(s) may replace a segment of the raceway, in some modification implementations. Thus, a raceway may be adaptable.

Figure 6A:
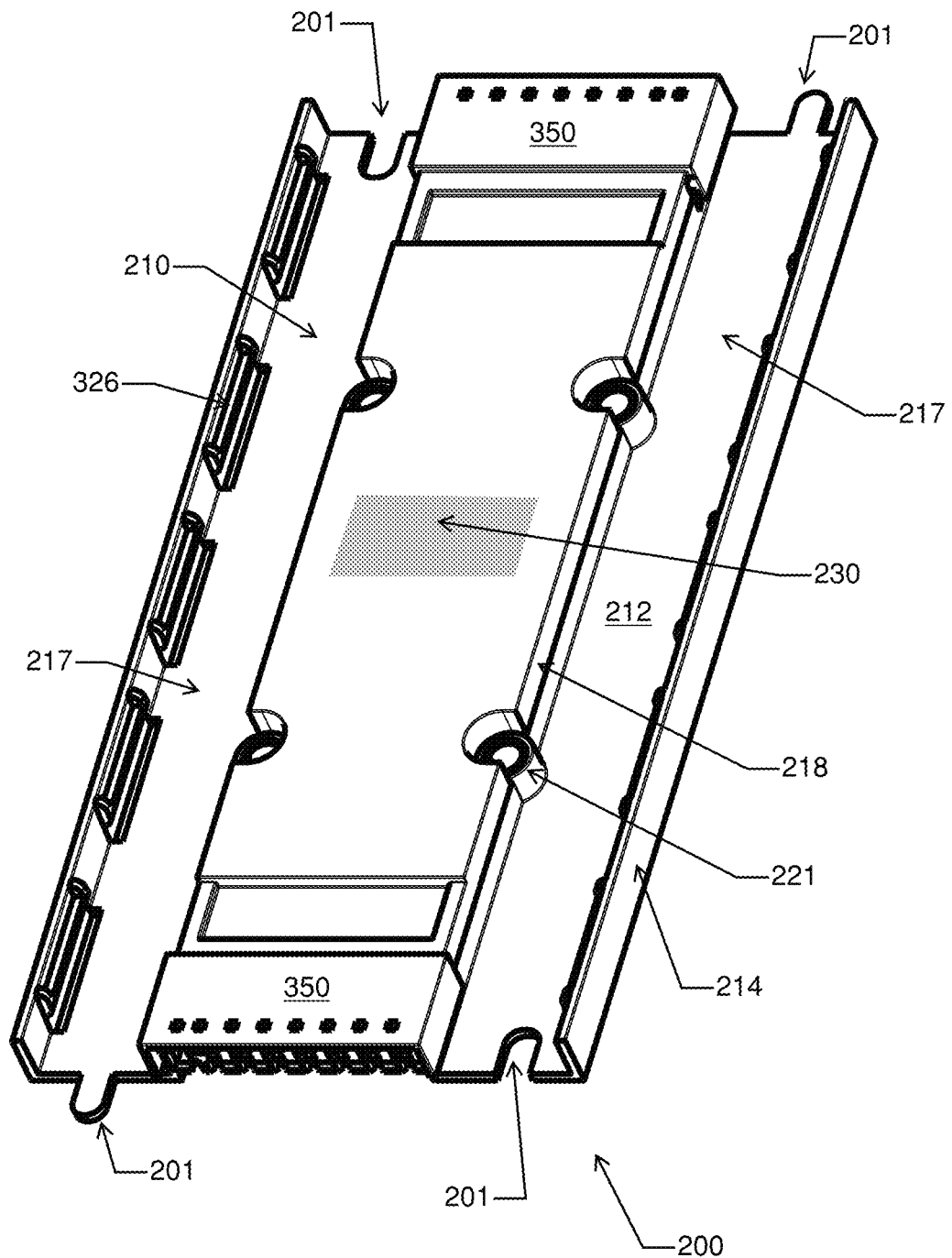
FIG. 6A illustrates top perspective view of an implementation of an example node.
Figure 6B:
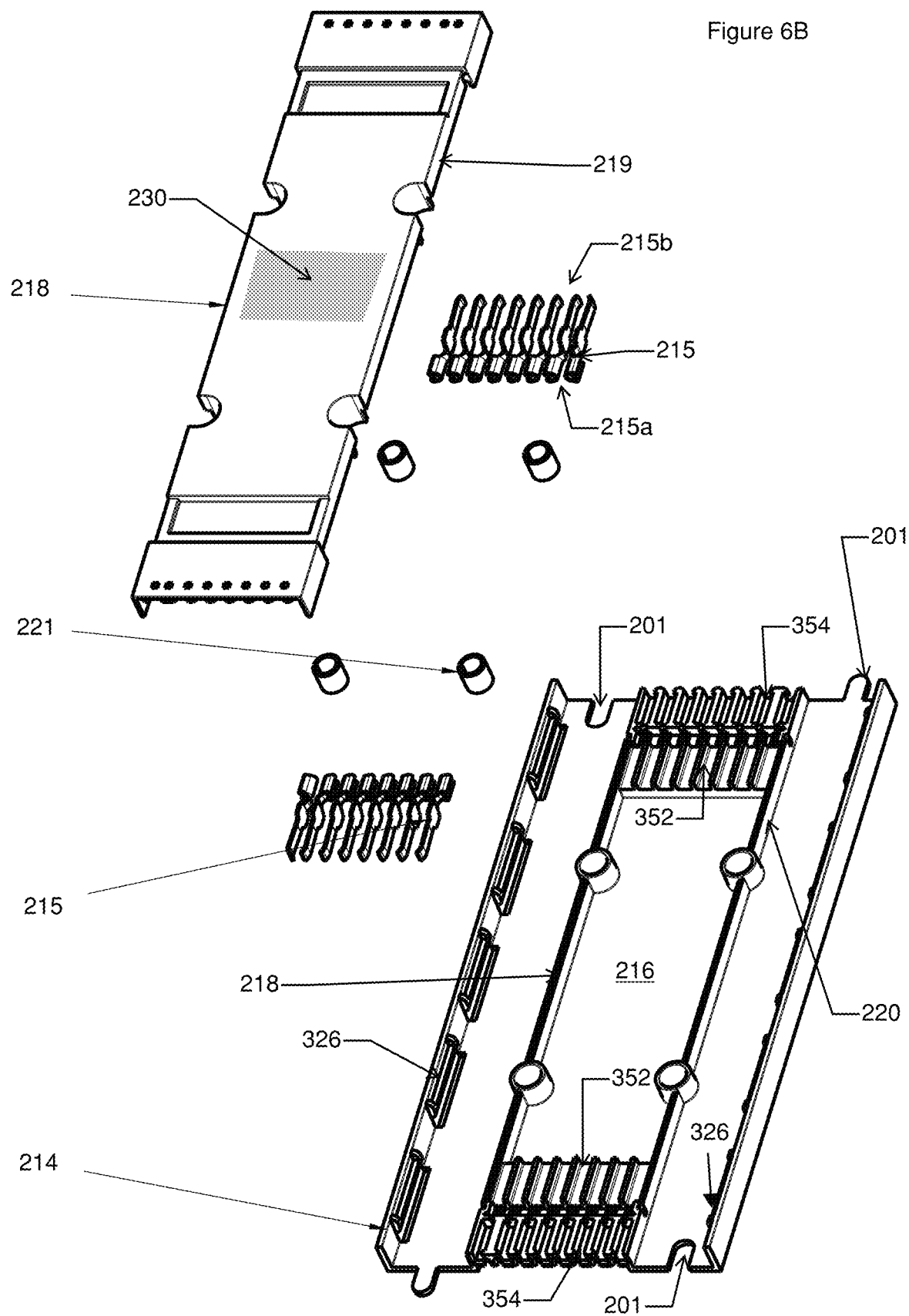
FIG. 6B illustrates exploded view of an implementation of the example node illustrated in FIG. 6A.
Figure 6C:
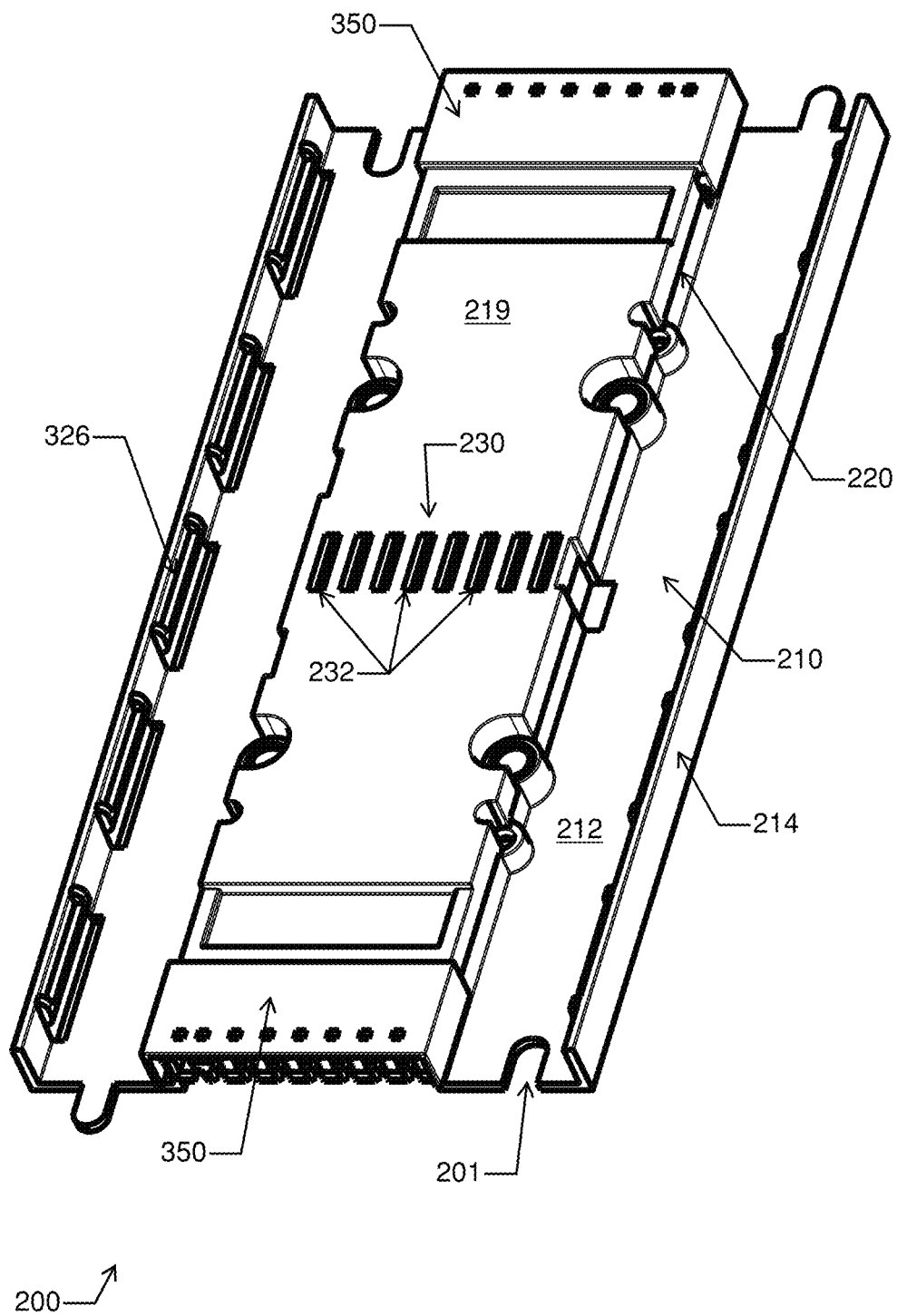
FIG. 6C illustrates exploded view of an implementation of an example node.

FIG. 6A illustrates an implementation of an example node 600 and FIG. 6B illustrates an exploded view of the node 600. A node 200 may include connectivity cabling (e.g., wires, bars, etc.) disposed in a housing 210. The node may have housing 210 similar to a housing of a segment of a raceway (e.g., housing 320) to facilitate the transition between segments and a node. The housing 210 may include key(s) 201 that facilitate alignment with other components. The node 200 may include node housing 218. The node housing 218 may include a cover 219 and a base 220. The cover 219 and the base 220 may be coupled via fasteners and spacer members 221. The spacer members may inhibit over tightening of the fasteners, which may cause damage to the cabling disposed in the node. Connectivity cabling may be disposed in the node housing 218. The connectivity cabling (e.g., power and/or data) may be coupled to connectors 330 (e.g., connectors 30). The connectors 330 may include any appropriate type of connector, such as but not limited to male and/or female connectors. Different types of connectivity cabling may be coupled together and utilized within a node 200. For example, a node may include bus bars 415 disposed at least partially in connectors 330. A bus bar 215 may be coupled at a first end 215a to cabling (e.g., wires) disposed in the cavity 216 of a node. A second opposing end 215b of the bus bar 215 may be couplable to other components or portions thereof (e.g., bus bars in connectors of other components). The node 200 may include an access point 230 through which the connectivity cabling may be coupled to and/or accessed. The access point may utilize quick connectors, such as the quick connectors disclosed in U.S. Pat. No. 9,960,554 and/or U.S. patent application Ser. No. 15/967,455. A receptacle may be coupled to the connectivity cabling and/or the raceway via the access point and/or the node to provide connectivity through the receptacle. Other objects, such as but not limited to, furniture, towers, lighting, and/or combinations thereof may be coupled to the node via the access point to provide connectivity to and/or through these objects.

Figure 6D:
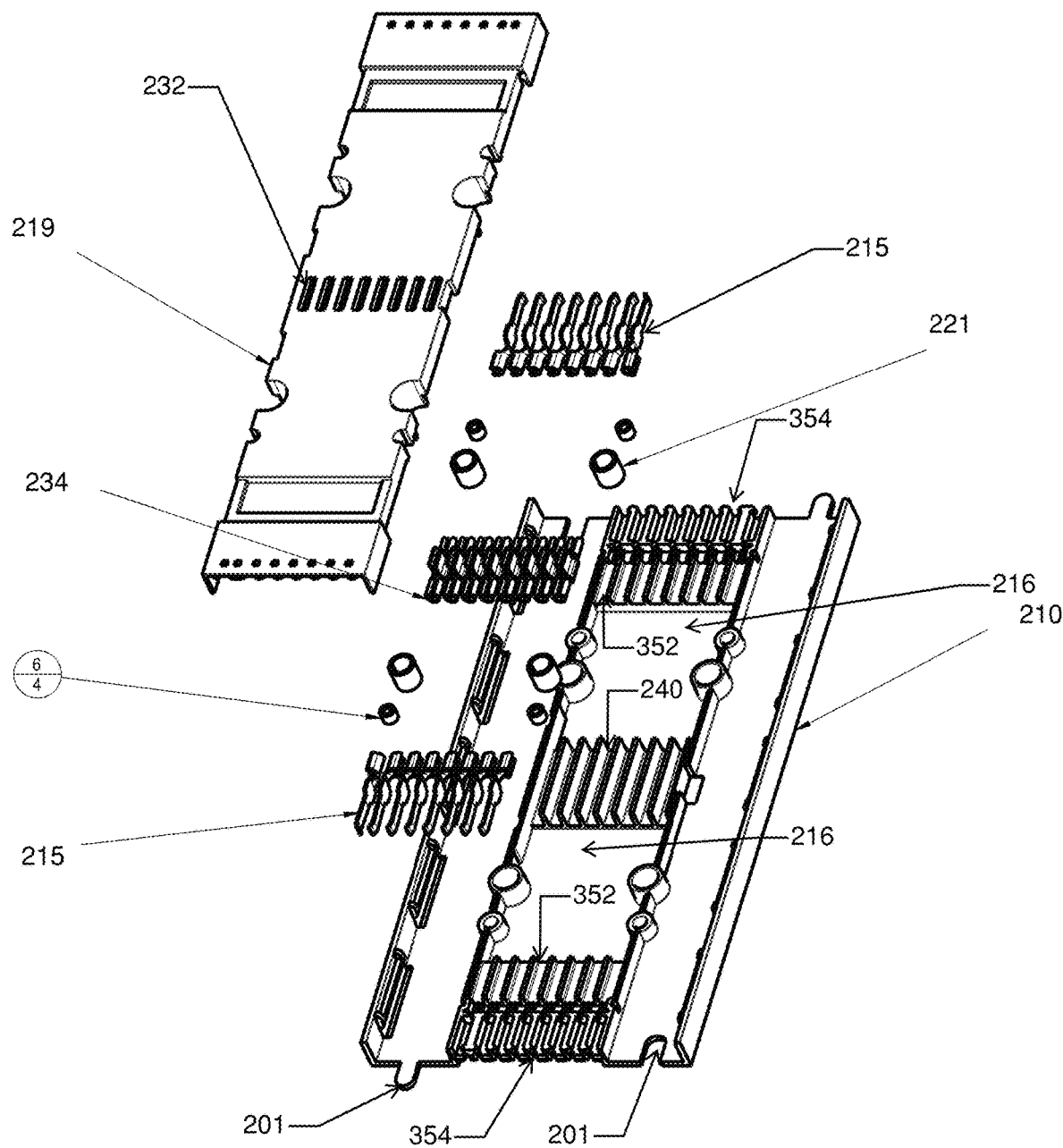
FIG. 6D illustrates exploded view of an implementation of the example node illustrated in FIG. 6B.
Figure 6E:
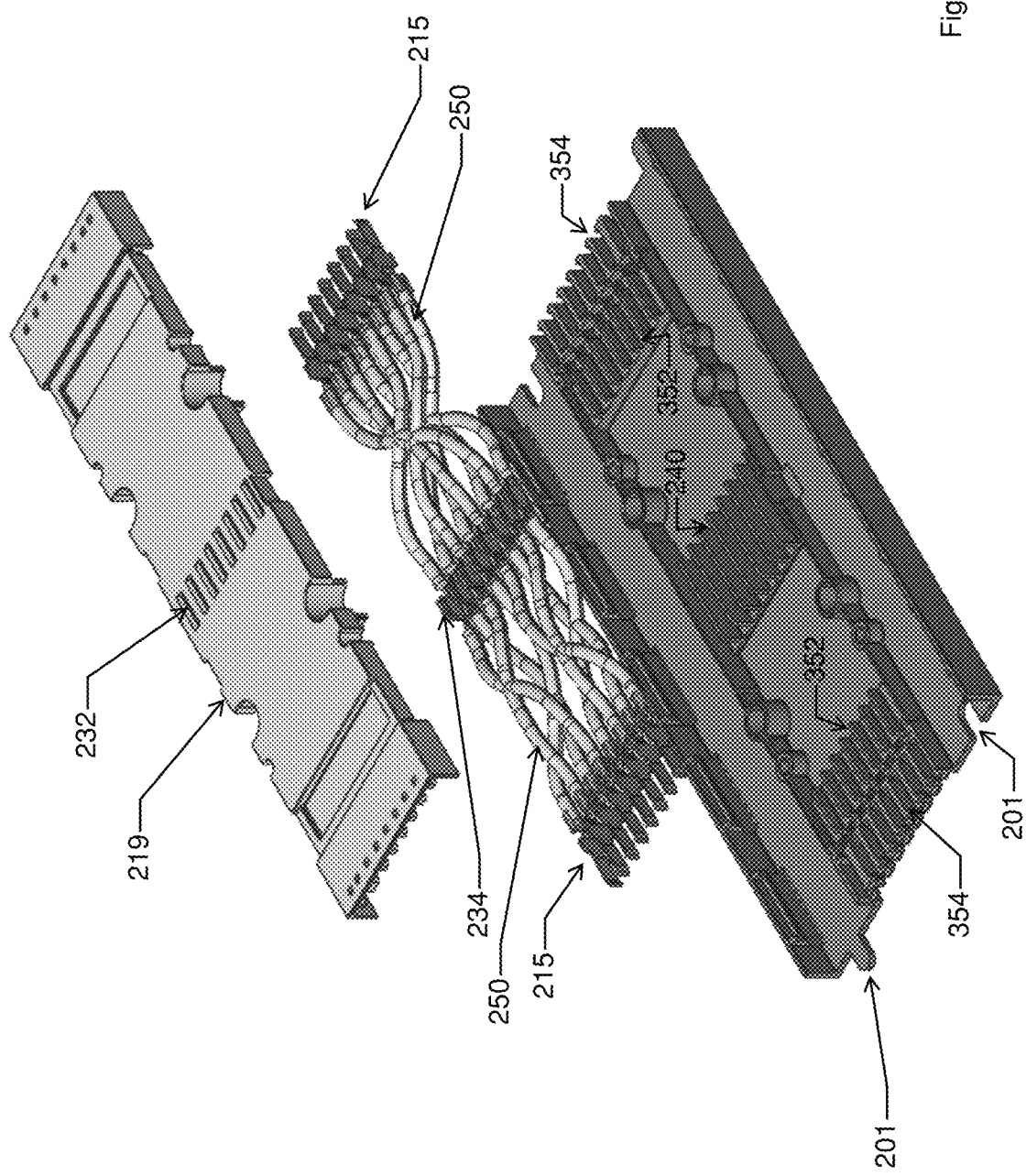
FIG. 6E illustrates exploded view of an implementation of the example node illustrated in FIG. 6D with cabling.
Figure 7M:
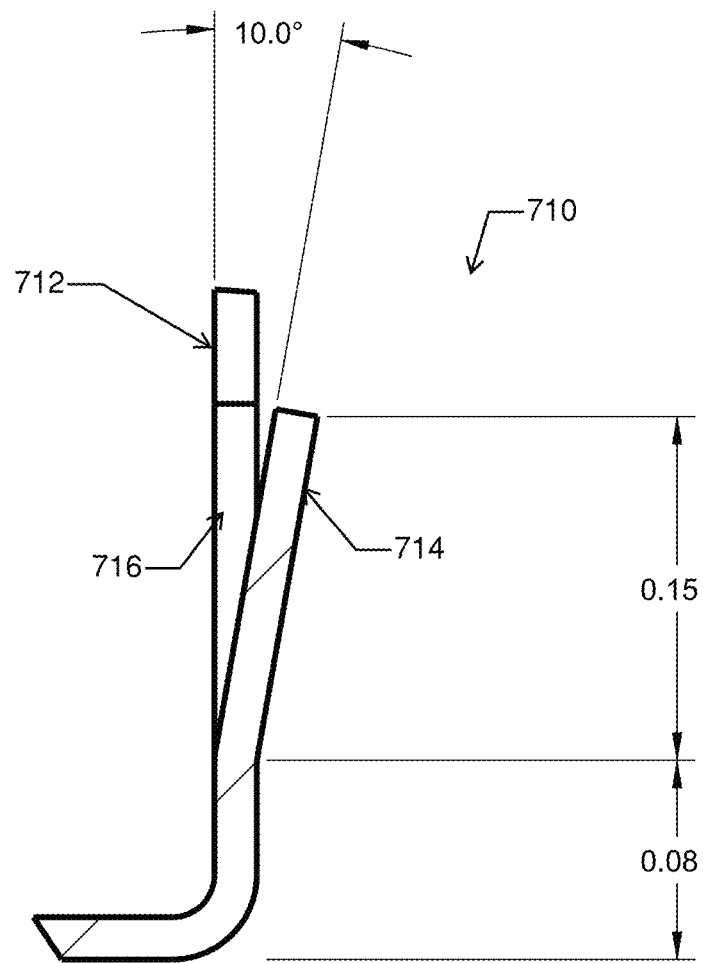
FIG. 7M illustrates a front view of an implementation of a portion of the example wire clip, illustrated in FIG. 7A.

FIGS. 6C and 6D illustrate an implementation of a node 300 with a slot access point. FIG. 6E illustrates an exploded view of the node 300. As illustrated, in FIG. 6C the node 300 may include a node housing 419 and/or housing 210 to facilitate alignment with other components of the raceway. For example, the node may be utilized with node housing 419 to approximately match the width of other segments. Matching the width between one or more components of the raceway may increase aesthetics and/or decrease trip hazards (e.g., that may arise from differently sized components being disposed proximate each other). The housing 210 may include key(s) 201 that facilitate alignment with other components. As illustrated, a key 201 on a side of a node housing (e.g., that is capable of coupling with other components) may include a protrusion that may be received by a recess of another component and/or a recess that may be receive a protrusion of another component.

The node housing 218 may include an access point that includes three or more slots 232. The slots may receive one or more prongs from an object, such as but not limited to a receptacle (not shown). The prongs may extend at least partially through the slots to couple with the connectivity cabling disposed in the node. An object, such as a receptacle, may or may not include the same number of prongs as the node has in an access point. The node may be capable of providing connectivity to objects, such as receptacles, coupled to the node independently of whether all of the slots are coupled to prongs of the object. As illustrated, the node housing 218 may include 8 slots. Eight slots may be utilized to allow multiple ports of a receptacle to be coupled to the node and/or to meet industry and government regulations.

The access point may include access point bars 234 that reside in channels 356 in the base 220 of the node housing 218. The access point bars 234 may couple with cabling 350 in the node on at least one side. As illustrated in FIG. 6E, the access point bars 234 may couple with cabling 350 on both sides of the access point bars to allow the node to provide connectivity received from a first component at one end of the node, through the node, and to a second component coupled to another end of the node. The cabling 350 (e.g., wires) may be coupled at a first end to an access point bar 234 and at a second end to bars 215. The cabling 350 may extend from and/or proximate channels 240 through a cavity 216 of the node housing 218 and into and/or proximate channel 354. Bars 215 may extend from channels 354 to channels 352 such that connectors of other components may be coupled to the bars 215 of the node (e.g., to provide connectivity to and/or receive connectivity from the other component). The access point bars 234 may extend upwards towards the slots 232 in the cover 219 of the node housing 218. Thus, when an object such as a receptacle is coupled to a node via the slots, an access point connector may extend at least partially through the slots to contact the access point bars. The contact with the access point bars may provide connectivity to the object (e.g., via the object access point connector).

Although raceways and/or portions thereof have been described in FIGS. 1A-6D, a raceway or portions thereof may or may not include the various described features. In addition, various features may be added, deleted, and/or modified. In some implementations, a portion may include features described with other portions. For example, a wall similar to segment 300 may be utilized with segment 200.

As another example, a raceway with a power track may also provide data connectivity via cabling such as data cabling (e.g., wires, fiber optic cables, etc.). The data cabling may be disposed in one or more of the cavities proximate the power track (e.g., cavities 140 in FIGS. 2A, 4A, 5A) and/or proximate a node (e.g., cavity 217 disposed between a housing 210 and a node housing 218). For example, a power track and/or node housing may be disposed in the cavity of the segment housing such that cavities reside on one or more sides of the power track and/or node housing (e.g., based on the position of the power track and/or node housing in the housing of the component there could be room on one or both sides). Thus, data cabling (e.g., one or more cables and/or bundles of cables) may be disposed at least partially in one or more of the cavities proximate the power track in the housing of a segment and/or node housing. A wire clip may be utilized to inhibit cabling from releasing from a cavity. A wire clip may retain and/or secure the cabling in the housing (e.g., of a segment) while inhibiting damage to the cabling. For example, the wire clip may not crimp, kink, and/or apply damaging pressure to the cabling disposed in the wire clip. The wire clip may facilitate placement of covers and/or receptacles (e.g., since cables may be inhibited from movement out of the cavity).

FIGS. 7A-7K illustrate an implementation of a wire clip 700 from various perspectives. FIG. 7L illustrates wire clip 700 disposed in a component 750 (e.g., node and/or segment) of a raceway. As illustrated, a wire clip 700 may include a base 710 and arm(s) 720 extending from the base. The base 710 may be bent to create a cavity 712 in which a portion 752 of a component 750, such as a power track and/or node housing, may be disposed. In some implementations, the base 712 of the wire clip 700 may include a coupling member configured to couple (e.g., frictionally fit, lock, etc.) with a portion of an outer surface of a power track housing and/or a portion of an outer surface of a node housing. For example, protrusion(s) 714 may contact and/or be received by a power track housing and/or node housing. As illustrated in FIG. 7M, an opening 716 may be created in a wall 713 of the cavity 712 (e.g., disposed proximate a side and/or top of the power track and/or node housing). The opening 716 may be created in a way such that the wall is not cut away but bent away from the wall towards the recess 712 of the base 710 to create a protrusion 714. This protrusion 714 of the wire clip 700 may contact the power track housing and/or the node housing and/or may couple the wire clip 700 to the power track and/or node housing. For example, the power track and/or node housing may include a recess into which at least a portion of the protrusion of the wire clip 700 may be received. In some implementations, the power track and/or the node housing may include a protrusion on an outer surface contacts the protrusion 714 of the wire clip 700 and/or inhibits the wire clip 700 from releasing from the housing of the component of the raceway.

The arms 720 of the wire clip 700 may extend from the base 710 at a first end 721 and may be free at a second opposing end 722. The arms 720 may be elongated members. The arms may include bending portion 724. The bending portion 724 of the arms 720 may include a hinge, a pre-made fold in the arm, a crease, a weak point in the arm, a score, etc. In some implementations, the arms may not include a bending portion but may include flexible material and an installer in the field may bend the arm to cover cabling in the wire clip. An arm 720 may bend proximate the bending portion 724 such that the free second end 722 is bend towards to the base, as illustrated in FIGS. 7G-7L. Bending the arm towards the base may create a lumen 730 (e.g., an at least partially closed lumen) through a length 701 of the wire clip 700. Cabling 755 may be disposed in and/or retained in the lumen 730 created by bending the arms 720 of the wire clip 700. Thus, the cabling may be inhibited from being released from the wire clip 700, when the wire clip is closed. The wire clip may be opened by bending the arm(s) away from the base. The cabling may then be removed, accessed, and/or replaced, for example.

As illustrated in FIGS. 7F and 7G, the wire clip 700 may be disposed in a cavity of a component 750 of a raceway. A wire clip 700 may have a length 702 less than a length of a component. Thus, more than one wire clip 700 may be utilized in a component, in some implementations. The wire clip 700 may be disposed in the component in an open and/or in a closed position. For example, an empty wire clip 700 may be disposed in the component of the raceway. The base and/or walls of the raceway may have a shaped such that the wire clip may be received by the housing of the component. As illustrated, at least a portion of the base may have a shape similar to at least a portion of the base of the housing of the component. The wire clip may have a size such that the wire clip snaps into and/or otherwise fits into the housing (e.g., approximately the same width as inner width of the housing of the component). The wire clip may be smaller than the width of the housing, in some implementations. The cavity of the base may receive the power track or node housing of the component as it is disposed on the base of the housing of the component (e.g., an inner floor of the housing of the component). The protrusion of the base of the wire clip may contact and retain the wire clip proximate the power track and/or node housing. In some implementations, the power track and/or node housing may include recess(es) (e.g., individually and/or continuously along an outer wall such that the wire clip may be disposed in more than one position relative to the length of the component). The cabling may then be disposed in the area between the arms and walls of the base, and the arms may be bent towards the base to close the wire clip. The arms may be bent away from the base to open the wire clip and provide access to the cabling. In some implementations, the cabling may be disposed in the wire clip and then disposed in the component.

Wire clips may be utilized with power cabling and/or other cabling disposed in a housing of a raceway with and/or without a power track. For example, power cabling may be disposed in a segment of a raceway and a wire clip may be utilized to inhibit release of the power cabling and/or data cabling from the housing of the segment. As another non-limiting example, data cabling may be disposed in a segment of a raceway and a wire clip may be utilized to inhibit release of data cabling from the housing of the segment. In some implementations, the cavity 712 of wire clip 700 may be utilized to retain, secure, and/or inhibit release of a first set of cabling and/or second set(s) of cabling may be retained, secured, and/or inhibited from release from a lumen of an arm of the wire clip. For example, a segment (e.g., linear such as linear segment 200, angular such as angular segment 300, and/or branched such as branched segment 400) may be utilized without a power track. Cabling may be disposed in a cavity of the housing of the segment of the raceway. A wire clip (e.g., wire clip 700 and/or other wire clips) may be utilized to inhibit release of the cabling from the cavity of the segment.

In some implementations, other wire clip configurations may be utilized to inhibit release of cabling from a component of a raceway without a power track. FIGS. 8A-8D and 8F-8G illustrate an implementation of a component of a raceway, segment 800, which may be utilized with the power track disposed in the segment, without the power track, and/or in combination with component with a power track (e.g., disposed in the segment and/or in a different segment proximate segment 800 and/or in the same raceway as segment 800). As a nonlimiting example, a component with a power track, such as the segment 200 illustrated in FIG. 2A, and data cabling may include enter a branching segment. The branching segment may couple to a segment 800 in which a power track is not disposed, in some implementations. As another nonlimiting example, a first raceway including one or more segments 800 may be disposed proximate (e.g., contacting and/or not contacting) a second raceway that includes segments with power tracks (e.g., segment 200).

Figure 8A:
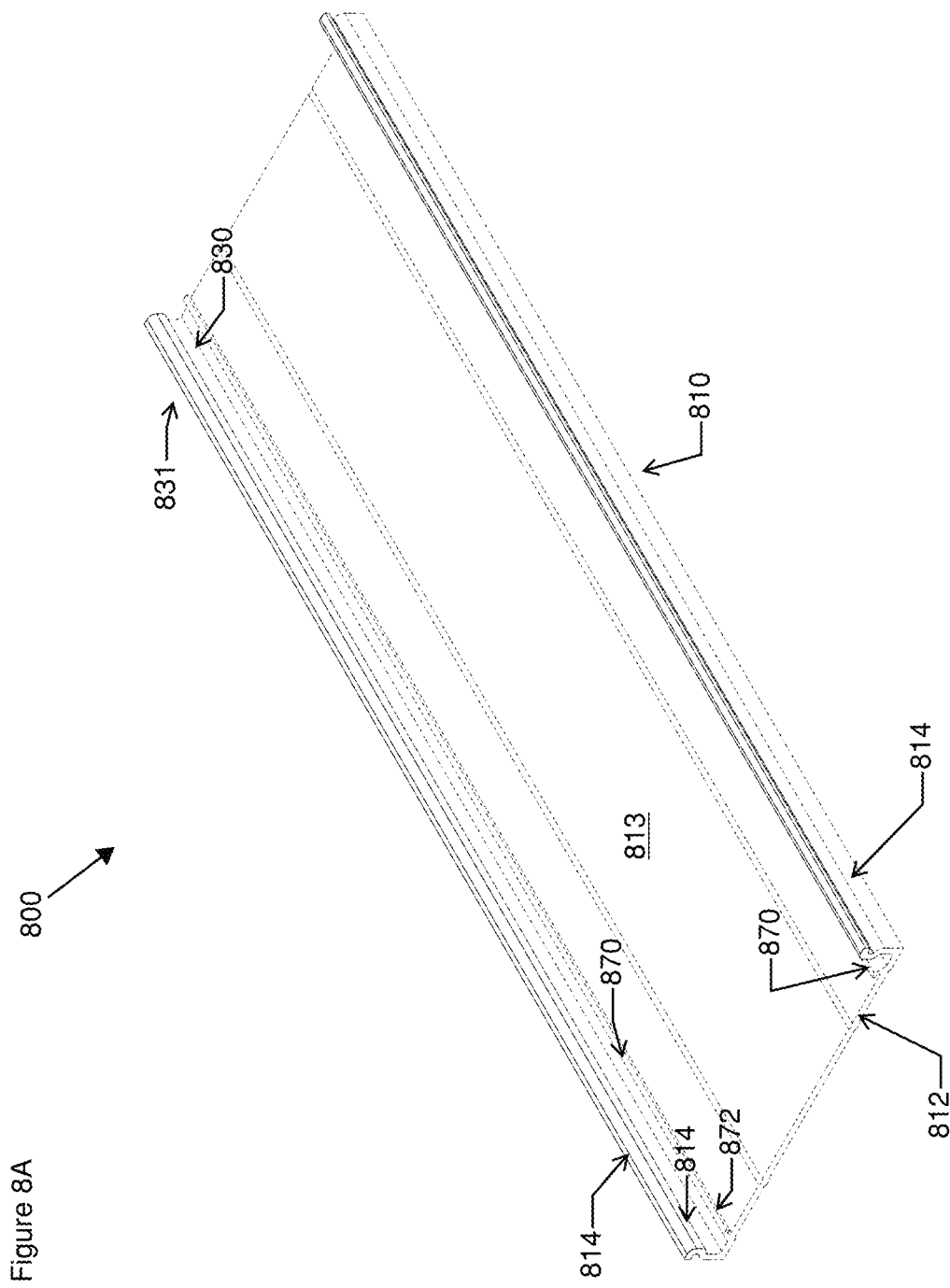
FIG. 8A illustrates side perspective view of an implementation of an example segment of a raceway.
Figure 8B:
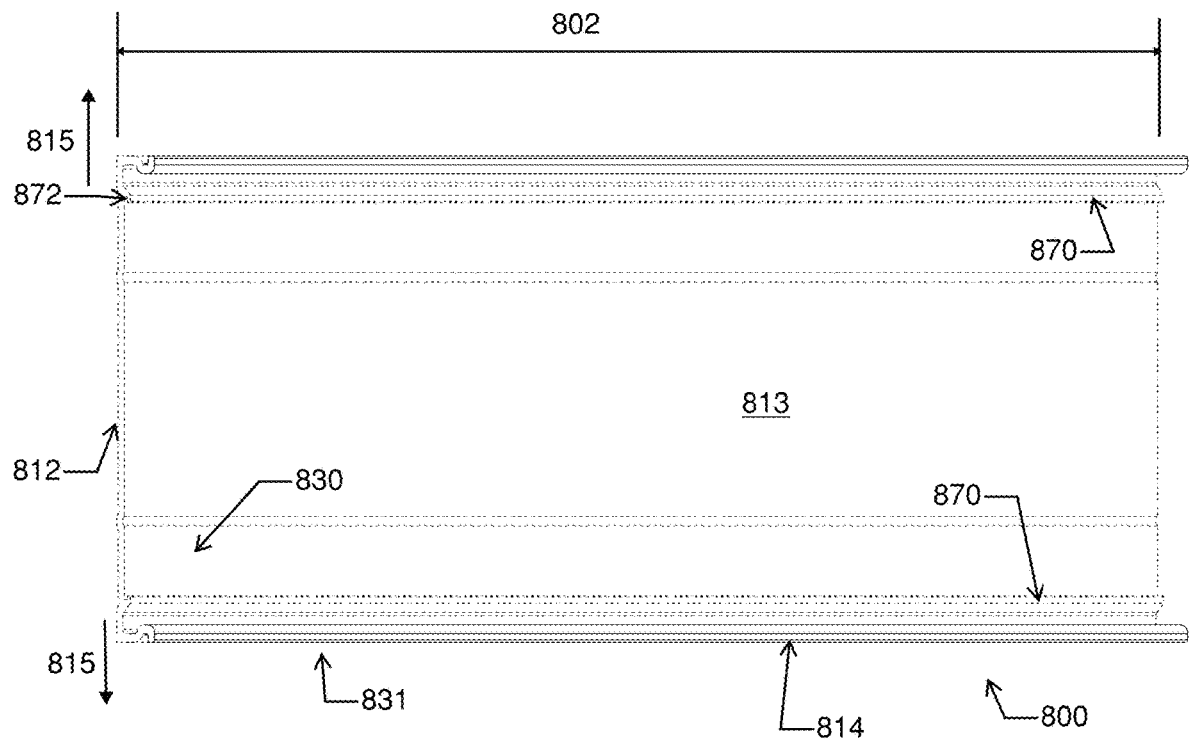
FIG. 8B illustrates top perspective view of an implementation of the example segment of a raceway illustrated in FIG. 8A.
Figure 8C:
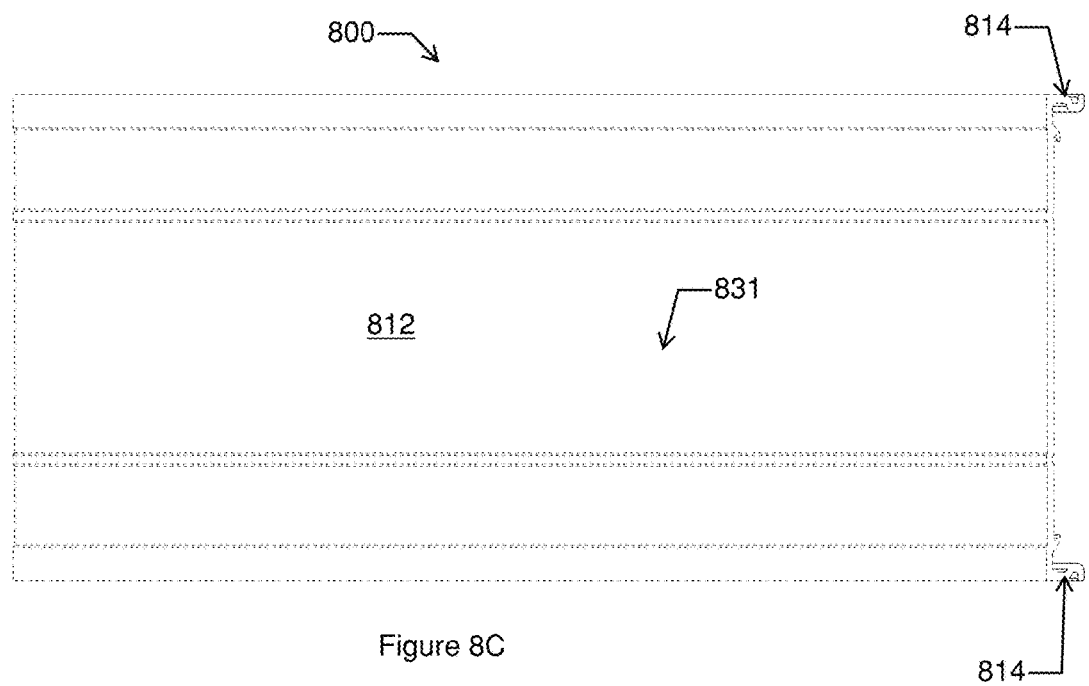
FIG. 8C illustrates bottom perspective view of an implementation of the example segment of a raceway illustrated in FIG. 8A.
Figure 8D:
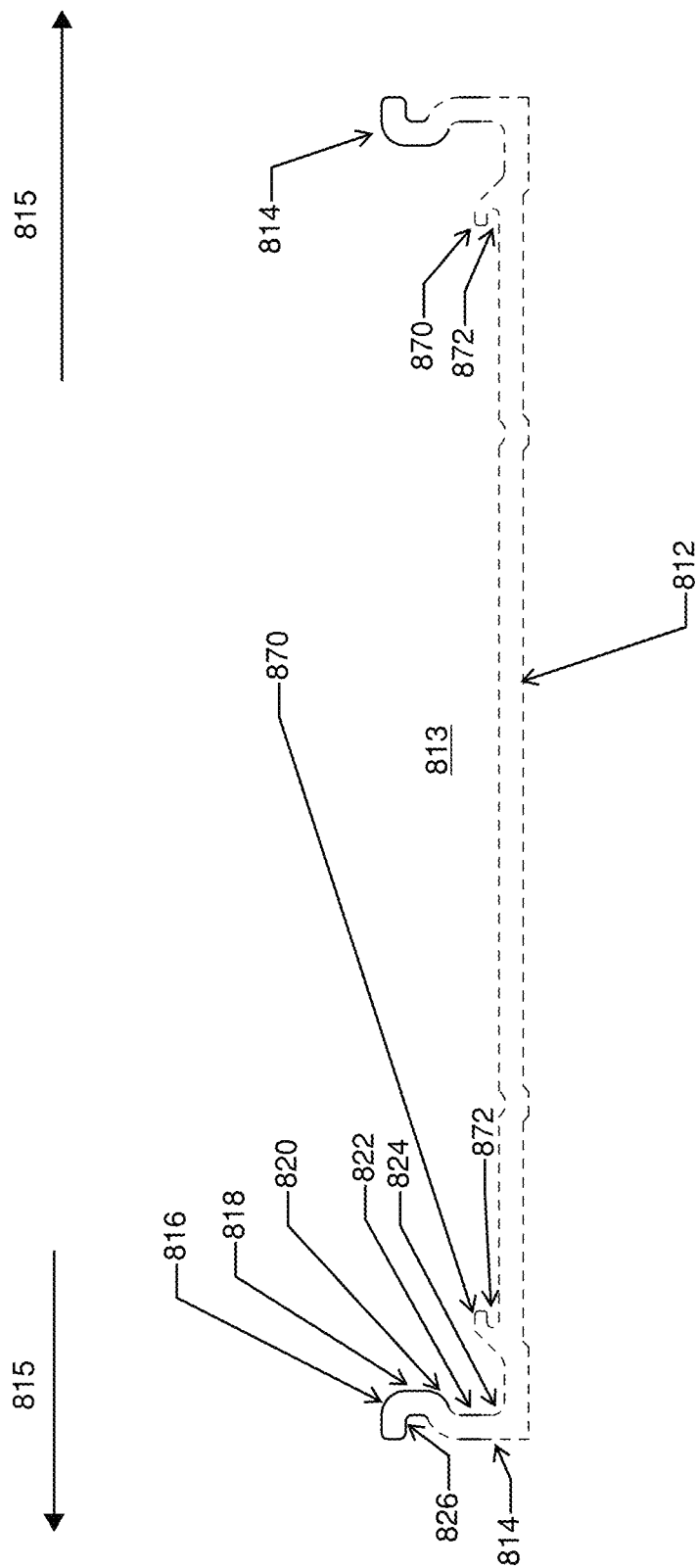
FIG. 8D illustrates cross-sectional view of an implementation of the example segment of a raceway illustrated in FIG. 8A.
Figure 8E:
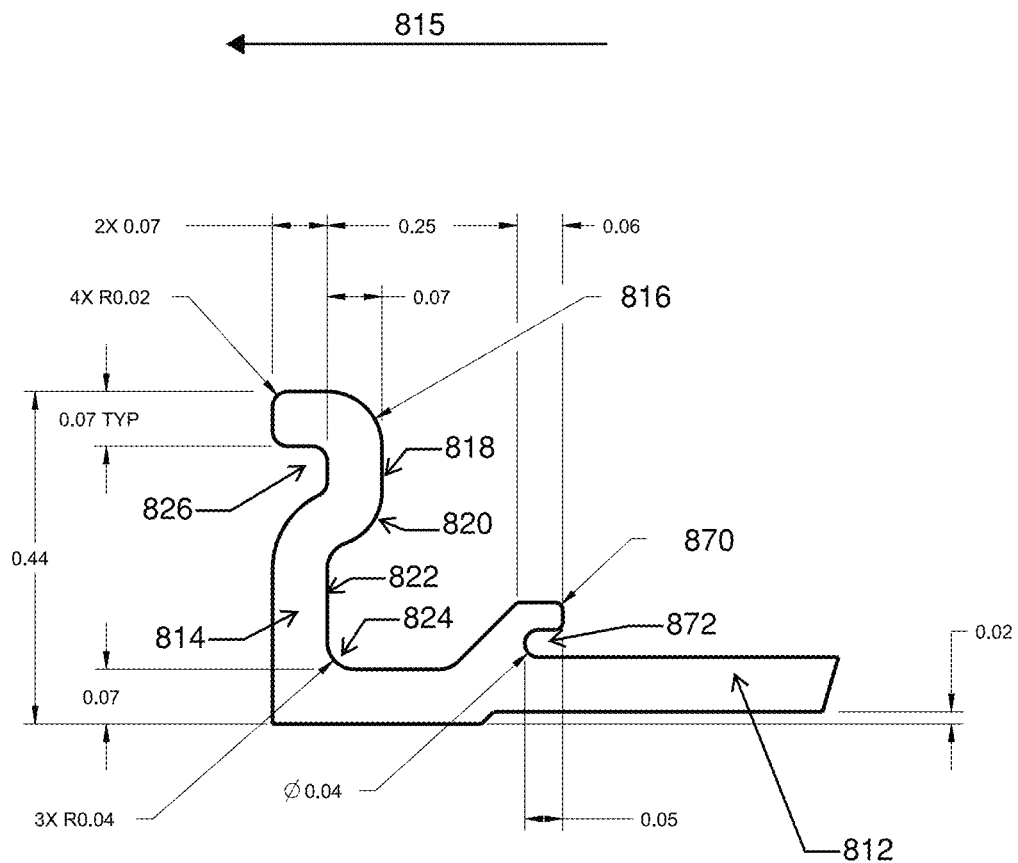
FIG. 8E illustrates a view of an implementation of the example portion of the segment of the raceway illustrated in FIG. 8D.
Figure 8F:
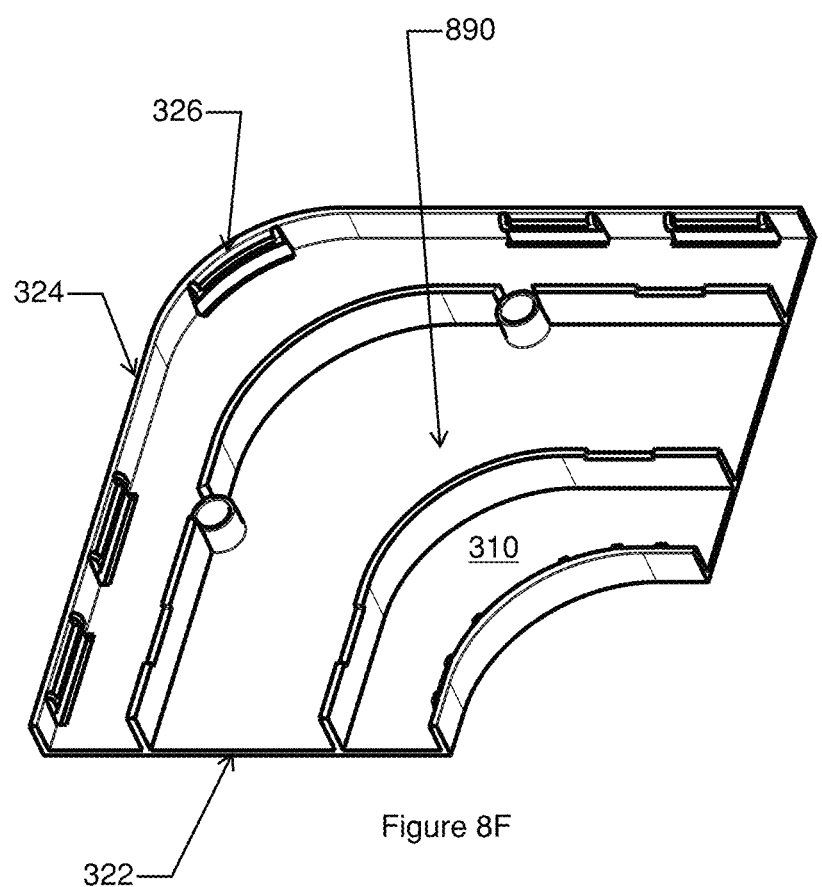
FIG. 8F illustrates a top perspective view of a portion of an example angled segment.
Figure 8G:
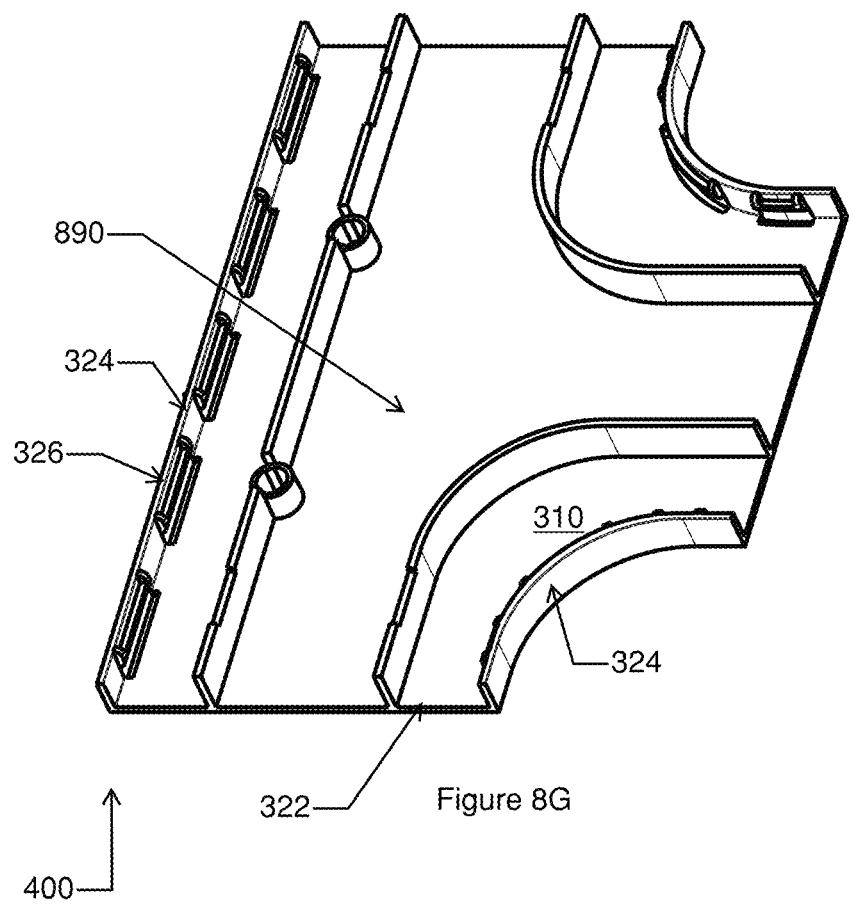
FIG. 8G illustrates a top perspective view of a portion of an example branching segment.

As illustrated in FIG. 8A, segment 800 may be linear. In some implementations, other shapes of segments may be utilized such as angling segment 300 and branching segment 400. FIG. 8F illustrates an implementation of an angling segment 300. As illustrated, a first end of an angling segment may be not be disposed 180 degrees in orientation from the second end of the angling segment. The first end of the angling segment may be disposed at an angle, such as approximately 60 degrees, approximately 90 degrees, approximately 120 degrees, and/or any other appropriate angle from the second end of the angling segment. The segment may have a cavity 890 in which cabling may be disposed. FIG. 8G illustrates an implementation of a branching segment 400. As illustrated, branching segment 400 may branch a line of a raceway into two or more lines and/or more than one line of a raceway may be joined. The raceway may have a cavity 890 in which cabling may be disposed.

As illustrated in FIGS. 8A-8D, segment 800 may include a housing 810. The housing 810 may include a base 812 and wall(s) 814 extending from the base (e.g., end(s) of the base, proximate end(s) of the base). A cavity 814 may be disposed between the base and the wall(s) of the housing, and cabling may be received in the cavity. The cabling may be any appropriate cabling including, but not limited to, single cables, twisted cables, bundled cables, etc. The cabling may be for any purpose such as, the transmission of power and/or data (e.g., to provide connectivity from a connectivity source coupled to the cabling).

The walls of segment 800 may be similar and/or different from wall(s) of segments 100, 300, 400, and/or other segments. The walls 814 of the housing 810 may couple cover(s) (e.g., cover 160 and/or other appropriate covers), receptacles, ramps, and/or other components of the raceway with the housing. The walls 814 or a portion thereof may be flexible. Thus, in a similar manner to walls of segment 100, cover(s) and/or receptacles are inserted at least partially into the housing 810, the walls 814 may flex outward 815 (e.g., in a direction away from the cavity 813) and/or may exert a force on inserted cover(s) and/or receptacle(s) to retain and/or inhibit release of the cover(s) and/or receptacle(s) from the housing 810.

The wall(s) may be similar and/or different on each side of the housing 810. As illustrated in FIGS. 8D and 8E, the walls 814 may include a first curved section 816 (e.g., a section in which at least a portion is curved), a first straight section 818 (e.g., a section in which at least a portion is straight), a second curved section 820, a second straight section 822, a third curved section 824, and/or a fourth curved section 826. The first curved section 816 may facilitate insertion of cover(s), receptacles, etc, since the curvature of the first curved section may make it easier for cover(s) and/or receptacles to gently deflect the wall while inhibiting damage to the wall. The first straight section 818 may guide the inserted object (e.g., cover, receptacle, etc.) into the cavity 813 of the housing. The second curved section 120 may extend (e.g., curve) outward 815 and may allow the first straight section 818 to be disposed closer to an inner side 830 of the housing than the second straight section 822. The second straight section 820 may be disposed closer to the outer side 831 than the first straight section 818. The wall 814 may include a third curved section 824 (e.g., at least a portion is curved). The third curved section may be capable of receiving and/or coupling with at least a portion of components disposed in the housing, such as at least a portion of a wire clip. The wall may include a fourth curved section 826 (e.g., at least a portion is curved). The fourth curved section 826 may be proximate an outer side 831 of the housing 810 and/or may be configured to receive components (e.g., ramps in a similar configuration as illustrated in FIG. 2F; couplings with other raceways, etc.) external to the cavity 813 of the housing. The fourth curved section 826 of a wall 814 of a housing 810 may facilitate removal of components coupled to the housing such as a cover. A gap (not shown) may reside between the curvature of the fourth curved section 826 of the wall 814 of the housing 810 and an extended portion of a top cap (e.g., 163 of the top cap 162). The gap may allow contact (e.g., by a tool and/or hand of a user) with an underside of the extended portion of the top cap to facilitate removal of the cover from the housing.

In some implementations, the segment 800 may include a clip retainer 870. As illustrated, a clip retainer may be disposed proximate each end of the housing and/or proximate a wall of the housing. The clip retainer may extend along a length 802 of the segment 800, as illustrated in FIGS. 8A-8C, and/or one or more discrete clip retainers may be disposed along a length of the segment. The clip retainer 870 may include protrusion extending from a base 812 of the housing 810. The protrusion of the clip retainer 870 may extend at an angle to the base (e.g., between approximately 80 degrees and approximately 10 degrees) such that a recess 872 is disposed between the protrusion and the base 810. In some implementations, the clip retainer 870 may include a recess 872 formed in the protrusion. The recess 872 may receive a portion of a wire clip (e.g., to couple the segment and the wire clip; to inhibit release of the wire clip from a cavity of the housing of the segment, etc.). FIGS. 9A-E illustrate an implementation of a wire clip 900 that may be received by a clip retainer and in an open position, from various perspectives. FIG. 9F illustrates an open wire clip 900 disposed in a segment, such as segment 800, of a raceway. FIGS. 9G-K illustrate wire clip 900 in a closed position, from various perspectives. FIG. 9L illustrates a closed wire clip 900 disposed in a segment, such as segment 800, of a raceway.

As illustrated, a wire clip 900 may have a width and a length 902. A wire clip 900 or portions thereof may be flexible. The wire clip may include a base 910 and arms 920 that extend from the base. The base 910 may include a first end 911 and a second opposing end 912. The base 910 may include a first bending portion 915. The first bending portion 915 may extend along a length 902 of the wire clip 900 and may be disposed between the first end 911 and the second end 912 of the base 910. The first bending portion may be disposed proximate a middle of the base, in some implementations. The first bending portion 915 may include, for example, a hinge, a bend, a crease, a score, etc. that facilitates bending the base 910. The first bending portion may facilitate insertion of the wire clip 900 in a component of the raceway (e.g., since it may be easier to insert a folded wire clip into a clip retainer and then straighten the wire clip in position than insert a straight wire clip directly into a clip retainer and still engage the clip retainer). The wire clip 900 may include a protrusion 918 that extends from the wire clip. The protrusion 918 may extend from the wire clip 900 at an angle and may be disposed in position on the wire clip such that the protrusion can engage with a clip retainer when disposed in a component of the raceway. For example, the protrusion may extend from the base, be disposed between the base and the arms, and/or extend from an arm. As illustrated, a protrusion 918 may be disposed proximate each end of the wire clip. The protrusion may be parallel to at least a portion of the base, as illustrated, or be disposed at an angle relative to the base. A protrusion may extend along a length 902 of the wire clip and/or one or more protrusions may be discrete and disposed along a length 902 of the wire clip.

As illustrated, the wire clip 900 may include one or more arms. The arms may be similar and/or different. The arms may be disposed opposing each other and/or adjacent each other (e.g., when the arms are bent they may or may not be offset). As illustrated, an arm 920 may include a first end 921, which is coupled to the base 910 and/or protrusion 918, and a second opposing end 922 that may be a free end. An arm may include a second bending portion 924. The second bending portion may include, but is not limited to, a hinge, a bend, a crease, a score, etc. that facilitates bending the arm. As illustrated in FIGS. 9G-9K, to close a wire clip 900, an arm 920 may be bent at the bending portion 924 such that the second end 922 may be disposed closer to the base than in the open position. A lumen 930 (e.g., at least partially closed lumen) may be created between the portions of the arm and the base. Cabling may be disposed in the lumen and/or retained in the lumen. In some implementations, an arm may not have a second bending portion and an installer may bend the arm to close the wire clip and/or create a lumen in which cables may be retained.

A wire clip 900 may be provided in an open position, as illustrated in FIGS. 9A-9F) in which the bending portion is in a bent orientation (e.g., the base is not approximately planar), in some implementations. The wire clip 900 may be inserted into the component 950 of the raceway in the bent orientation. A force 860 in the direction of the base 952 of the component 950 may be applied to the base 910 of the wire clip 900 (e.g., by a user pushing down) which may cause the foot print base to lengthen (e.g., from footprint 881 to foot print 882). This may cause the base 810 to be approximately planar, fit more securely in the component, and/or engage and/or further engage a clip retainer of the component (e.g., clip retainer 870 of the component 800 illustrated in FIG. 8E). As illustrated, the protrusion 918 may be received in the recess 872 of the retainer 870 of the component. The wire clip may or may not include a recess (e.g., formed in the wire clip and/or formed between the arm and the protrusion and/or base) into which a protrusion of the retainer 870 may be received. Cabling 955 may then be disposed in the lumen (e.g., a cavity) 930 of the wire clip 900. The arms may then be bent at the second bending portion to close the wire clip and inhibit the cabling 955 from releasing from the component.

To open a wire clip 900, the arms may be opened (e.g., bent away from the cavity of the wire clip). Cabling may then be accessed, replaced, and/or repaired. When the wire clip 900 is coupled with the retainer 870 of the component 950, the wire clip may be inhibited from releasing from the component. To release the wire clip from the component, the first bending portion may be bent (e.g., pulling up in a direction opposite 860) to facilitate release of the wire clip from the component 950.

In various implementations, one or more of the components of the raceway may utilize connector(s) 30. Connectors may be portions of the components (e.g., components may include a connector at least one end), in some implementations. The various components of a raceway may use compatible connectors and/or adapters that allow a component to be compatible. Use of compatible and/or adapters may increase the modularity of the raceway and increase user satisfaction (e.g., since configurations may be based on user designs rather than limited choices). The connectors 30 may include any appropriate type of connector such as quick connectors that may allow coupling and/or uncoupling without tools such as screwdrivers. The use of connectors (e.g., as opposed to hardwired connections and/or not using connectors) may allow a raceway to be assembled from a starter connection (e.g., at a wall and/or coupled to core connectivity source), reassembled, repaired, etc. by any user (e.g., a specialty technician such as an electrician may not need to be utilized to comply with government and/or industry regulations). For example, an office manager may rearrange the layout as needed.

The connectors may include any appropriate type of connection style, such as male/female connectors, unisex connectors, protrusion/recess, slot/key, push/pull, etc. As illustrated in FIG. 1B, male portions of connectors may couple with female portions of connectors and/or female portions of connectors may couple with male portions of connectors to couple two components together. In some implementations, a connector may include more than one connection style. As illustrated in FIG. 2A, a connector 170 may include first portion(s) that include male/female connector and second portion(s) that include arm(s) with protrusion(s) that grasp and/or contact portions of another connector (e.g., protrusions, edges, etc.) and/or are received in recesses of another connector. Connectors may include first portion(s) that include male and/or female style connectors and second portion(s) that include fastener and/or receiving member style connectors. For example, second portion(s) may include screw(s) may be disposed on side(s) of the connector and once a component is coupled to another component via a first portion, the screw(s) may be used to secure and/or inhibit separation of the components (e.g., when the connection between components is inadvertently pulled).

Figure 10:
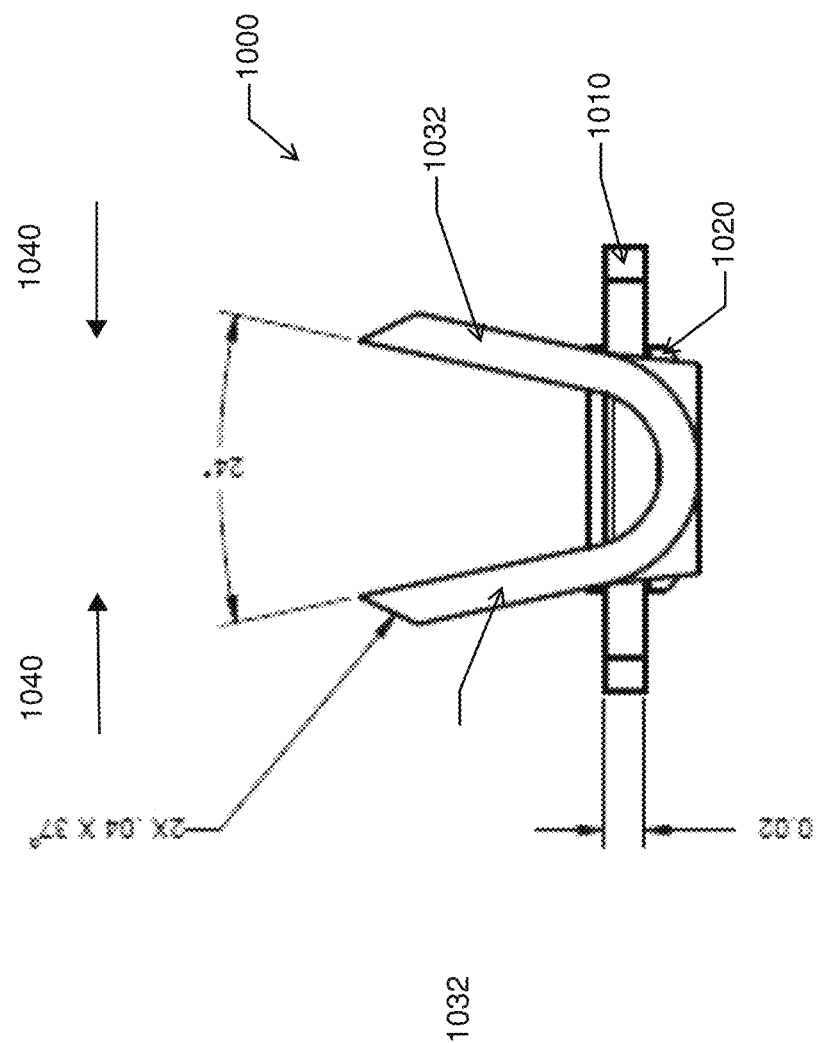
FIG. 10A illustrates a front perspective view of an implementation of an example bar in an open position.
FIG. 10B illustrates a front perspective view of an implementation of the example bar, illustrated in FIG. 10A, in a closed position.
FIG. 10C illustrates a side view of an implementation of the example bar, illustrated in FIG. 10A, in a closed position.
FIG. 10D illustrates a bottom view of an implementation of the example bar, illustrated in FIG. 10A.
FIG. 10E illustrates a back perspective view of an implementation of the example bar, illustrated in FIG. 10A, in a closed position.

The connectors may include member(s) that are capable of transferring the connectivity from the cabling of the component (e.g., of which the connector is a part) to second component (e.g., via the connector of the second component). In some implementations, this member may include one or more bars capable of transferring connectivity, such as power, from the component to second component (e.g., via contact with the bar(s)). As illustrated in FIGS. 6B, 6D, and 6E, the node may be include bars in channels disposed in the connectors of components (see also channels in which bars can be disposed such as channel 254 in FIG. 2G, channels 352, 354 in FIGS. 4A, 5A, and 6A). A bar may be utilized in male connector(s) and/or female connector(s). The bar in the male connector may be similar to the bar in the female connector except that the orientation may be rotated approximately 180 degrees (e.g., such that they are mirror images). FIG. 10A illustrates an implementation of a bar 1000 in an open position and FIG. 10B illustrates the bar 1000 in a closed position. FIG. 11B illustrates a side view of the bar 1000 in a closed position and FIG. 11C illustrates the bar 1000 in from a bottom perspective. FIG. 10D illustrates a back view of the bar 1000 in an open position. As illustrated, a bar 1000 may include a first end 1002 and a second opposing end 1004. The body 1010 of the bar 1000 may include a first arm 1020 and a second arm 1030 extending from the body in opposing directions. The first arm 1020 may include a straight portion 1022 (e.g., a portion with an approximately straight section) and curved portion 1024 (e.g., a portion with a curved section). The curved portion 1024 may be disposed more proximate the second end 1004 of the bar than the straight section 1022 and the straight section may be disposed between the body 1010 and the curved section. The bar may include other straight and/or curved sections. In some implementations, the first arm may be curved and may not include a straight section.

The first arm 1020 may be positionable in a first channel (e.g., channel 254, 354) of a connector. The first arm 1020 may contact the first arm of second bar in second connector to transmit connectivity (e.g., power from the first arm to the first arm of the second bar). The curved section 1022 may facilitate contact between the first arm and other first arms in other bars to transmit connectivity. For example, the curved section of a first bar may extend such that it may contact a straight section of a second bar of a different connector that is disposed proximate such that connectivity (e.g., power) may be transmitted between the first bar and the second bar. The first and the second bars may be disposed, when their connectors are coupled, such that the curved sections of the bars face each other. This second bar of a different connector may also have a curved section that contacts a straight section of the first bar. In some implementations, the curved sections of the two bars may contact each other to couple. Thus, in some implementations, one or more contact points may be achieved between two bars when their respective connectors are coupled (e.g., mated).

The second arm 1030 of the body 1000 may extend towards the first end 1002 of the body. The second arm 1030 may include one or more flanges 1032. In some implementations, as illustrated, a flange 1032 may extend approximately perpendicularly from the second arm (e.g., normal to the body 1010). The flange may allow cabling (e.g., a wire) to be coupled to the bar. The cabling may provide and/or receive connectivity; and when the bar is coupled to the cabling, the bar may provide and/or receive connectivity. The flange(s) may have a length such that the flange(s) may be bent inwards (e.g., in direction 1040) at least partially around cabling. Thus, the flange may contact (e.g., to allow connectivity transmission between the two) and couple with the cabling. Bending the flange(s) inward may inhibit release of the cabling from the bar (e.g., when connections are made and/or broken between connectors the bars may shift slightly and the coupling between the flange(s) and the cabling may inhibit release of the cabling from the flange of the bar). The flange and/or a portion of the cabling may be received in channels of the connector such as channels 252, 352.

In some implementations, other types of members may be utilized when providing connectors for other connectivity sources such data. For example, data cabling may terminate in ports and/or plugs that allow connectivity to be received and/or transmitted between the connectors. Any appropriate type of connection members may be utilized.

One or more members capable of providing connectivity, such as bars may be utilized in a connector to transmit and/or receive connectivity (e.g., capable of power transmission). For example, one or more bars may be disposed in male and/or female portions that are capable of coupling with female and/or male portions of another connector (e.g., that also include bars). The bars, or other members to provide connectivity, of the coupled connectors may contact (e.g., curved sections may contact straight sections of other bars) to provide connectivity between the connectors.

Figure 11A:
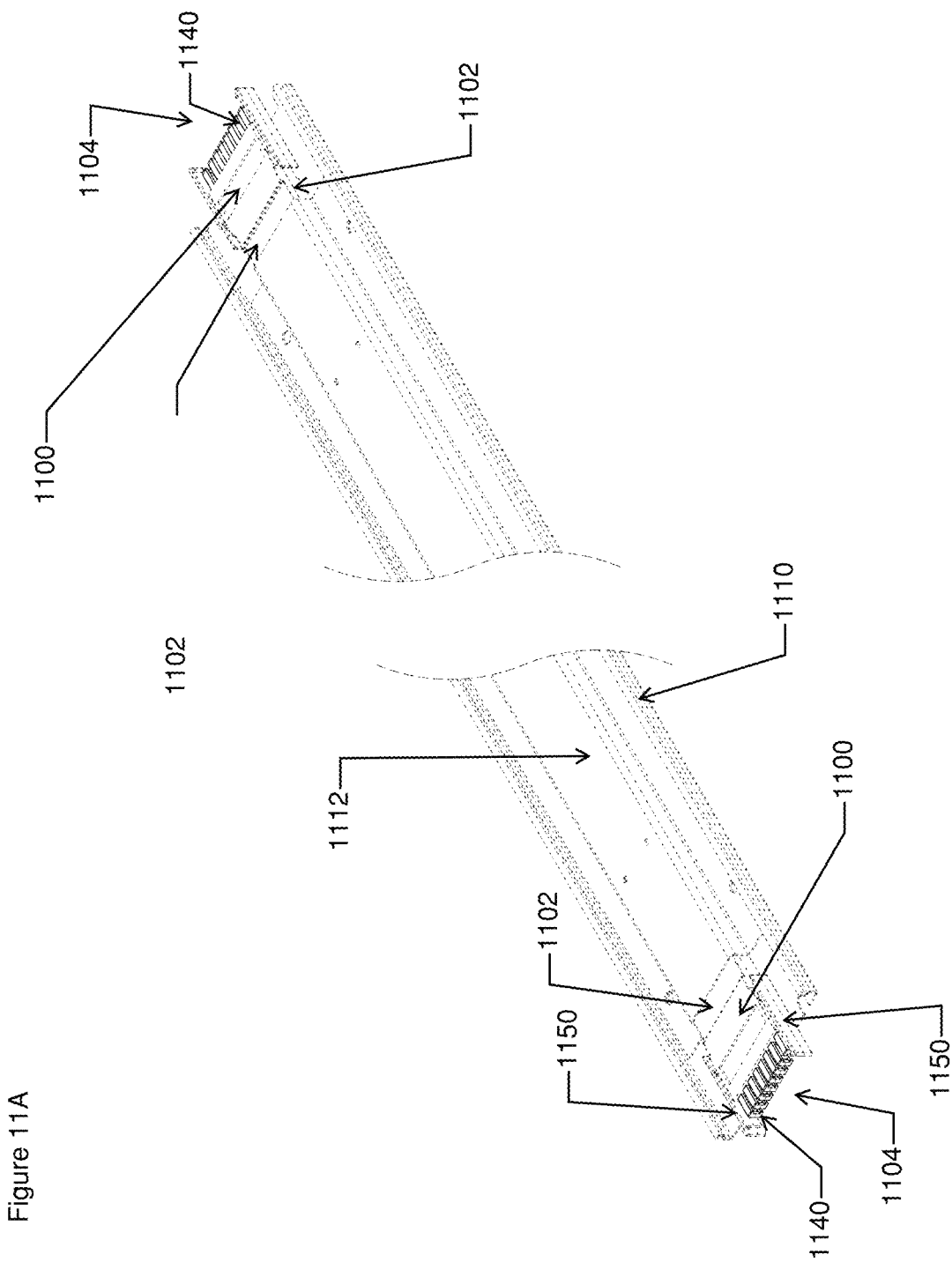
FIG. 11A illustrates a front perspective view of an implementation of an example connector in an example segment.
Figure 11B:
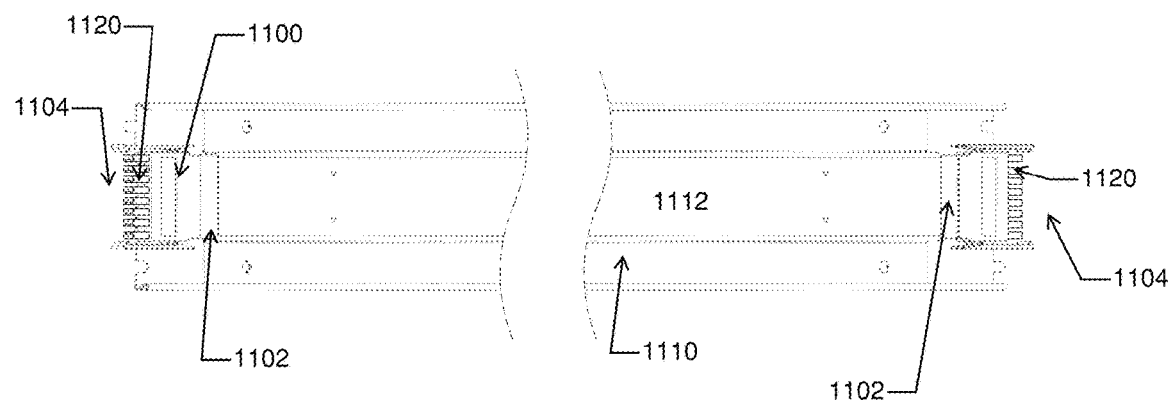
FIG. 11B illustrates a top view of an implementation of the example connector in the example segment illustrated in FIG. 11A.
Figure 11C:
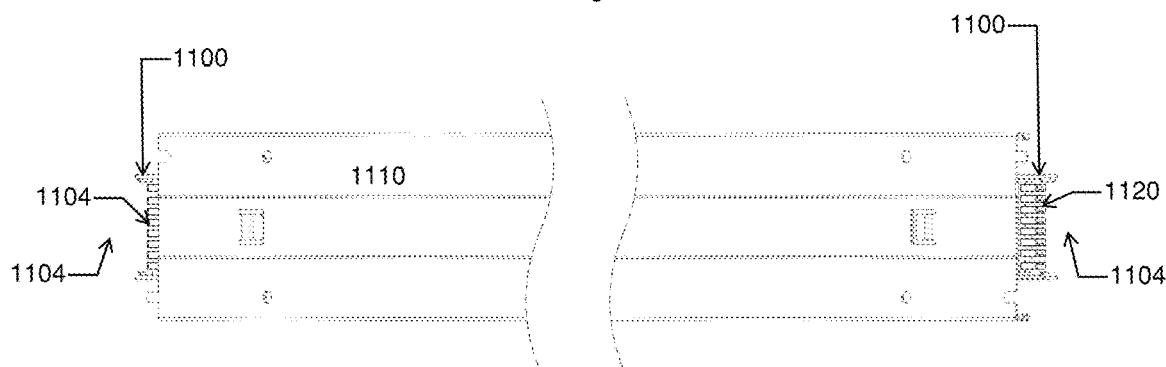
FIG. 11C illustrates a bottom view of an implementation of the example connector in the example segment illustrated in FIG. 11A.
Figure 11D:
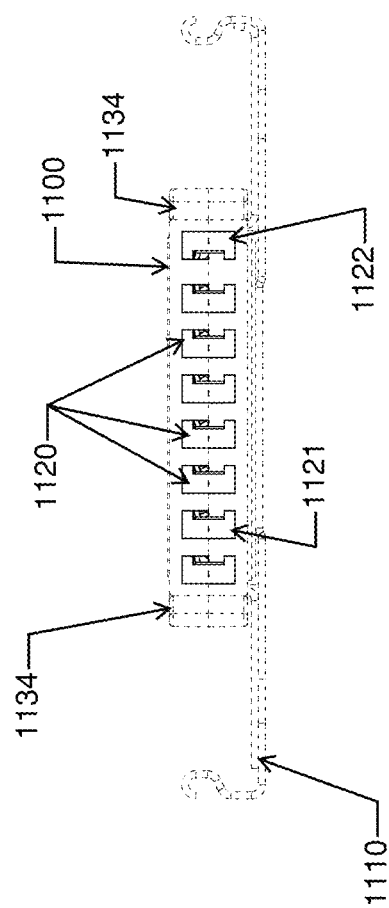
FIG. 11D illustrates a front view of an implementation of the example connector in the example segment illustrated in FIG. 11A.

FIGS. 11A-11D illustrate an implementation of a first connector 1100 in an example segment 1110 of a raceway. The connector 1100 may be formed of one or more pieces, in some implementations. FIG. 11A illustrates a front perspective view of the first connector 1100 in the segment 1110. FIG. 11B illustrates a top view, FIG. 11C illustrates a bottom view, and FIG. 11D illustrates a front view of the first connector in the segment 1110. Although the segment of the raceway illustrated is similar to segment 100, the first connector may be utilized with other components of the raceway (e.g., 200, 300, 400, 500, and/or other appropriate components). As illustrated, the segment 1110 may include connector(s) at each end such that the segment of the raceway may be coupled to other components of the raceway at one or more of the raceway ends.

Figure 12A:
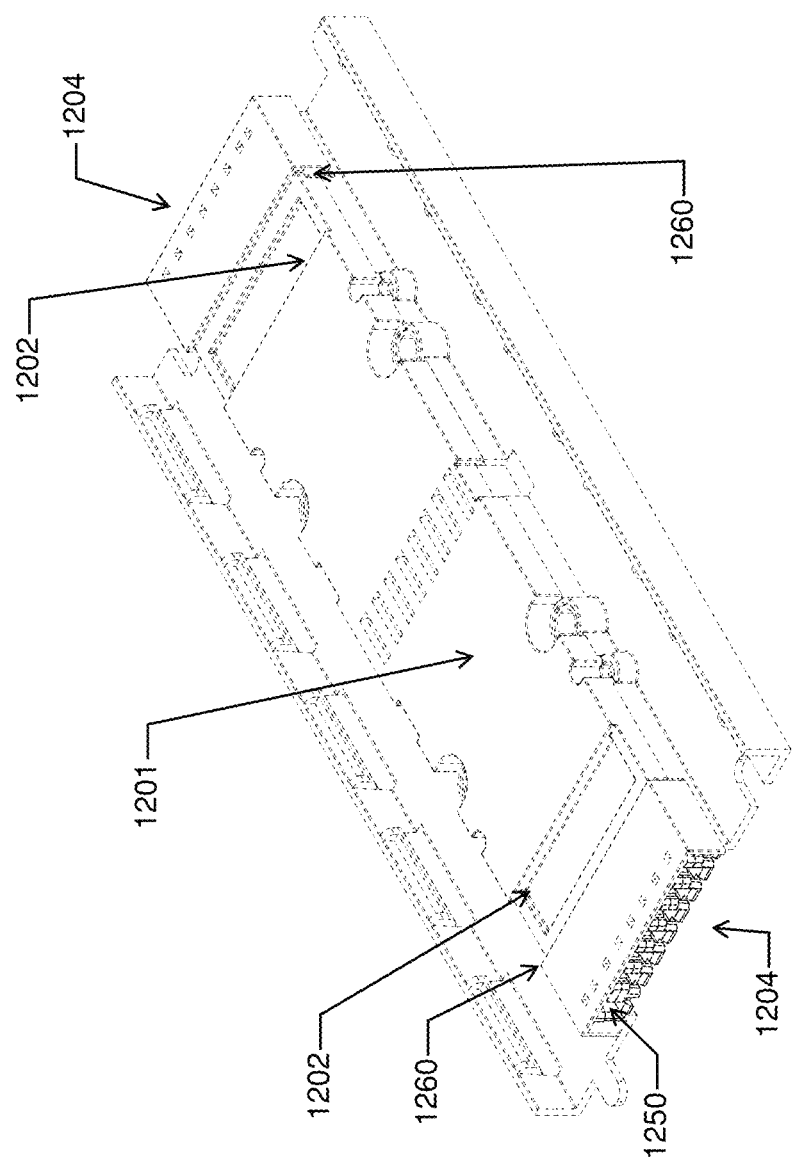
FIG. 12A illustrates a top perspective view of an example connector in an example segment of a raceway.
Figure 12B:
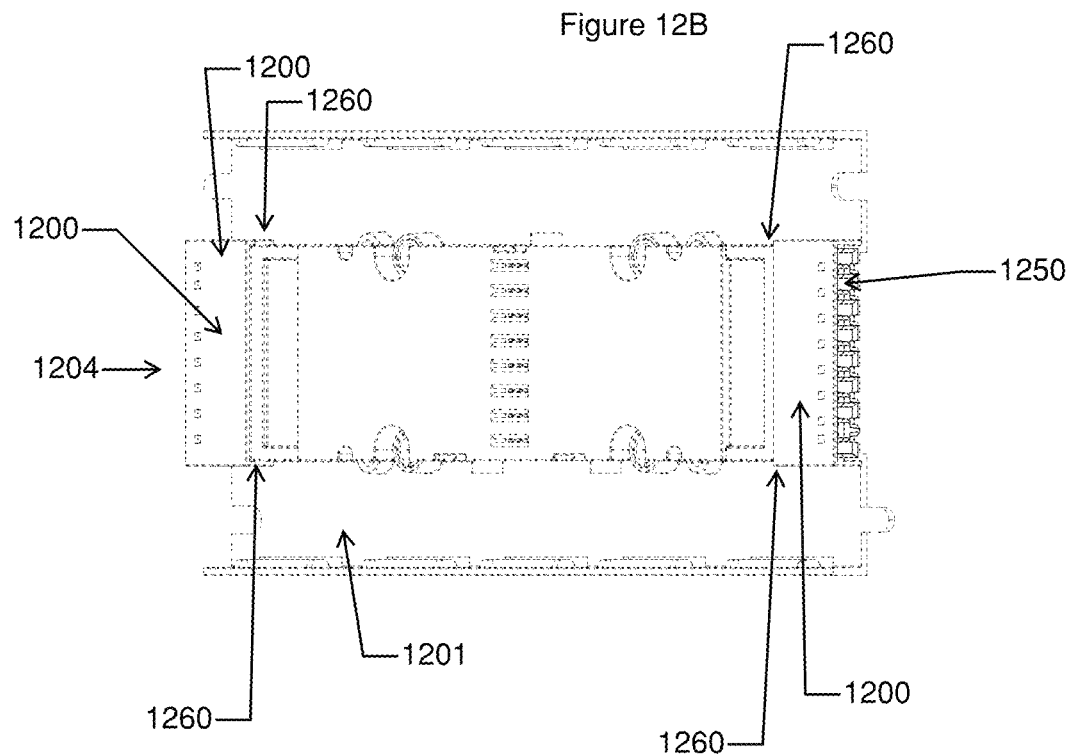
FIG. 12B illustrates a top view of the example connector in the example segment illustrated in FIG. 12A.
Figure 12C:
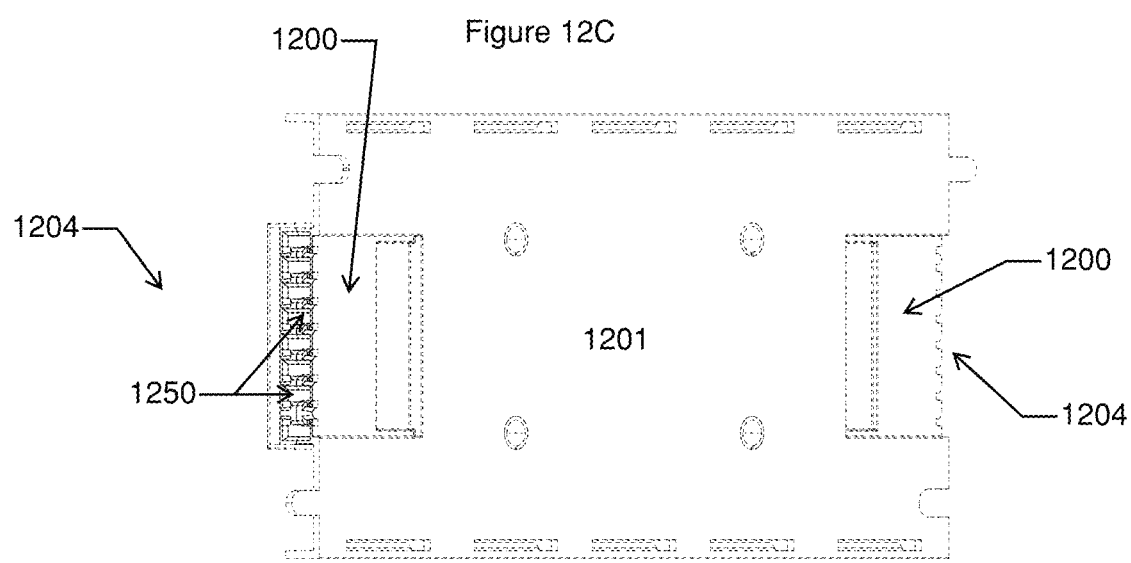
FIG. 12C illustrates a bottom view of the example connector in the example segment illustrated in FIG. 12A.

The body of the connector may include a first end 1102 and a second opposing end 1104. The first end 1102 of the connector may be coupled with a portion of the segment of the raceway. Since the connector is capable of transmitting the connectivity source of the segment 1110 to another segment of the raceway, the first end 1102 of the first connector 1100 may be coupled to the power track 1112 and/or cabling (e.g., power and/or data) of the segment 1110. The second end 1104 of the connector may be coupleable with other connectors (e.g., a mating connector). As illustrated, connector 1100 may include a male connector with prongs 1120 that may couple with a mating connector such as the connector illustrated in FIG. 12A, that includes female connectors. As illustrated to facilitate orientation, a first set of prongs 1121 (e.g., one or more prongs) may have a first shape (e.g., approximately C-shaped) in a first orientation and at least one second prong 1122 may be the first shape in a second orientation (e.g., flipped 180 degrees). Thus, the connectors may couple in a first direction and be inhibited from coupling in other directions.

Figure 11E:
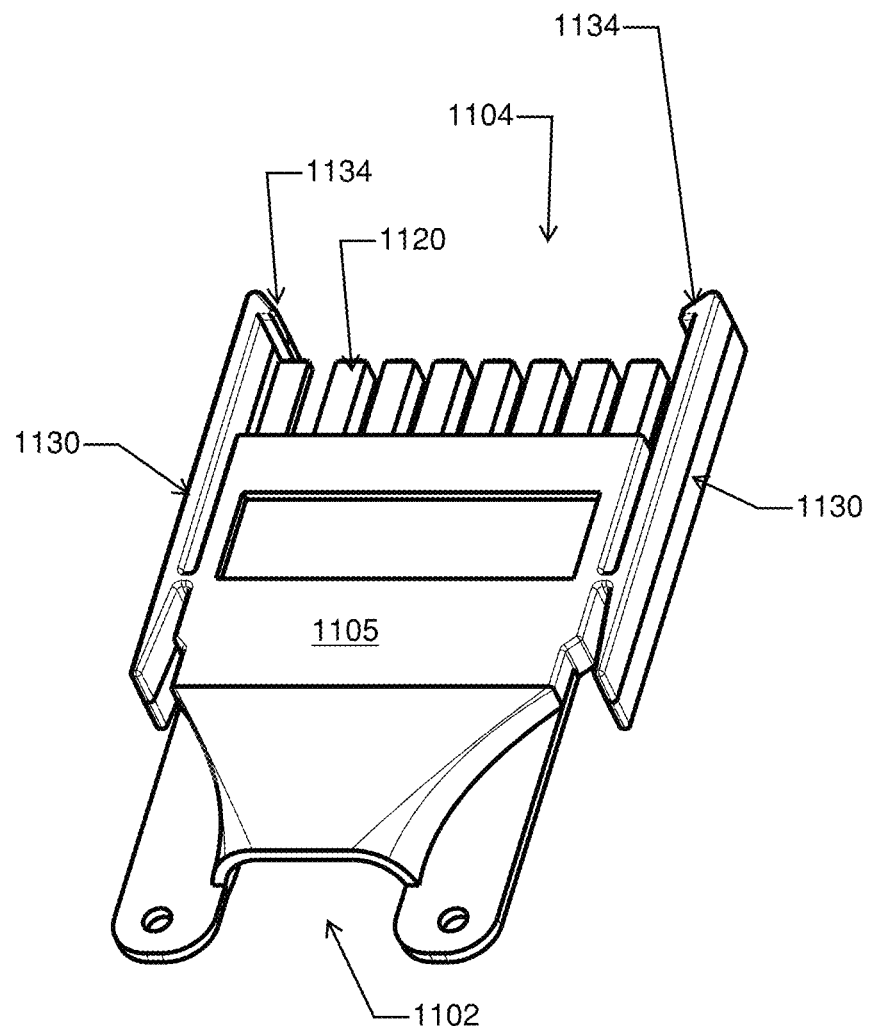
FIG. 11E illustrates a top perspective view of a portion of an example connector.
Figure 11F:
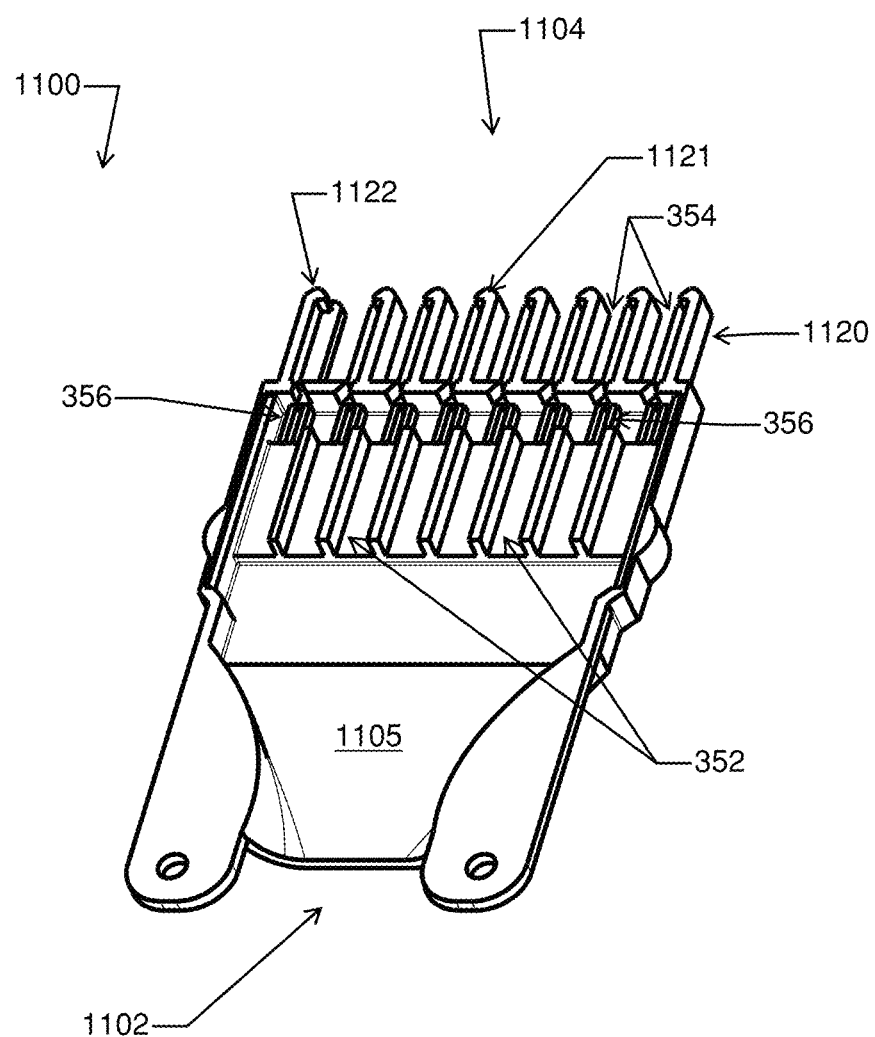
FIG. 11F illustrates a top perspective view of another portion of the example connector, illustrated in FIG. 11E.

FIG. 11E illustrates a first part and FIG. 11F illustrates a second part that may be joined to form a connector 1100 as illustrated in FIG. 11A. As illustrated, the connector 1100 may have a first end 1002 (e.g., that is capable of coupling with a power track and/or cabling) and a second end may include a first coupling. The first coupling may include one or more prongs 1120. The prongs 1120 may be received by and/or couple with recesses in a mating component. The connector may include a second coupling proximate the second end 1104. The second coupling 1130 may include arm(s) 1132 that extend from a body 1105 of the connector 1100 towards the second end. The arm(s) 1132 or a portion thereof may be flexible. An arm 1132 may include one or more protrusions 1134 extending from the arm. The second coupling 1130 may be capable of coupling with a recess and/or a portion of a body of a mating connector. For example, when a first connector 1100 couples with a mating connector the prongs may be received by recesses in the mating connector. The arms may extend at least partially over a side of the housing of the mating member that includes the recesses (e.g., the arms may be deflected outwards to be disposed at least partially about the housing of the mating connector). The protrusion(s) of the arm may be received in a recess on the housing of the mating component and/or the protrusion may be disposed about the housing to inhibit uncoupling (e.g., inadvertent uncoupling). For example, the housing of the mating component may include a ridge and/or edge onto which the protrusion may couple and/or that inhibit uncoupling (e.g., inadvertent uncoupling) by contacting the protrusion during uncoupling. To uncouple the component 1100 and the mating component, a force may be applied such that the arms are deflected outwards and the protrusion is allowed to pass and/or uncouple from the housing of the mating connector. In some implementations, one or more of the arms may be deflected outwards (e.g., such that the protrusion is clear of the recess, edge, ridge, etc. of the mating housing) by a user to uncouple the connectors. In some implementations, arms may be utilized in connectors to inhibit inadvertent uncoupling, for example, when the raceway is jarred, bumped, or otherwise inadvertently moved.

As illustrated in FIG. 11F, the connector may include channels to receive and/or couple with members to provide connectivity, such as bars. The connector 1100 may include first channels 352 and second channels 354. Recess(es) 356 may or may not be disposed between the first channels 352 and the second channels 354. At least a portion of the first end of a bar (e.g., first end 1002 of bar 1000) may be disposed in the first channel and at least a portion of the second end of the bar (e.g., second end 1004 of bar 1000) may be disposed in the second channels 354. At least a portion of the body of the bar (e.g., body 1010) may be received by recess 356. Thus, the bar may extend from a first channel 352 of the connector to the second channel of the connector 354. In some implementations, the recess 356 may help stabilize and/or reduce movement of the bar in the connector. The recess 356 may help facilitate assembly of the connectors since a bar may be coupled to wiring and then the body of the bar may be disposed in a recess of the connector, which may align the bar with the first and second channels of the connector. As illustrated, the channels may form walls and may separate bars disposed in the connector from each other. The separation of the bars may facilitate compliance with government and/or industry regulations and/or may inhibit arcing between bars.

FIGS. 12A-12D illustrate an example connector 1200 in a segment 1201 of a raceway, from various perspectives. As illustrated, the connector 1200 may include a first end 1202 coupled to a portion of the segment of the raceway and a second opposing end 1204. The second opposing end may include recesses 1250. The recesses may be configured to receive one or more prong of a mating connector (e.g., prongs 1220 of connector 1100). In some implementations, the connector may be coupled to a mating connector with fewer prongs than the connector 1200 has recesses. The connector 1200 may include protrusion and/or an edge 1260 that is capable of coupling with protrusions of a mating connector, such as arms 1130. For example, the body 1205 of the connector 1205 may vary in width and/or height. The change in width and/or height may create an edge and/or a protrusion onto which the arm of a mating connector may couple. In some implementations, the change in width and/or height may create a recess into which protrusion(s) of the arm(s) of mating connectors may be received.

The connector 1200 may include members to receive and/or transmit connectivity, such as bars 1000. The bars may be disposed in the connector 1200 similarly to the bars in connector 1100. The bars may be disposed in the connector 1200 and couple with a power track and/or cabling in a portion of the segment of the raceway proximate a first end of the connector. The bars may extend at least partially into the recesses 1250. At least a portion of the bars may be disposed within the recesses 1250 such that when prongs of a mating connector are coupled with (e.g. inserted into) recesses 1250 the bars in the recesses contact bars in the prongs to establish a connection between the bars and/or provide connectivity between the bars. Thus, power and/or other connectivity may be received and/or transmitted between the coupled connectors.

Figure 12D:
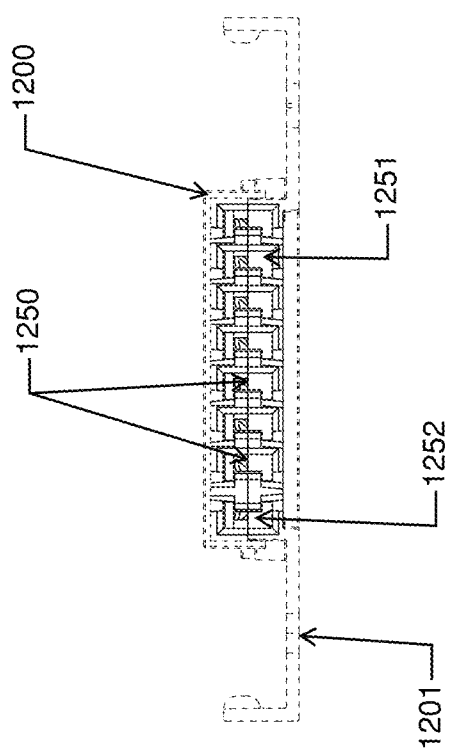
FIG. 12D illustrates a front view of the example connector in the example segment illustrated in FIG. 12A.
Figure 12E:
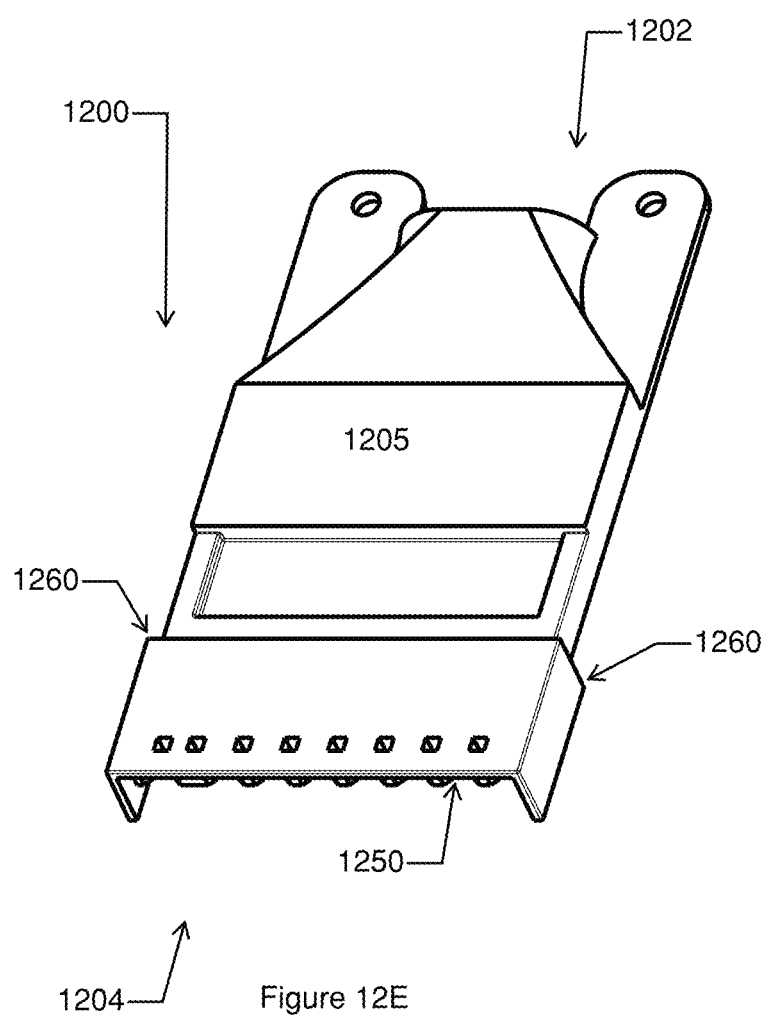
FIG. 12E illustrates a top perspective view of an implementation of a portion of an example connector.
Figure 12F:
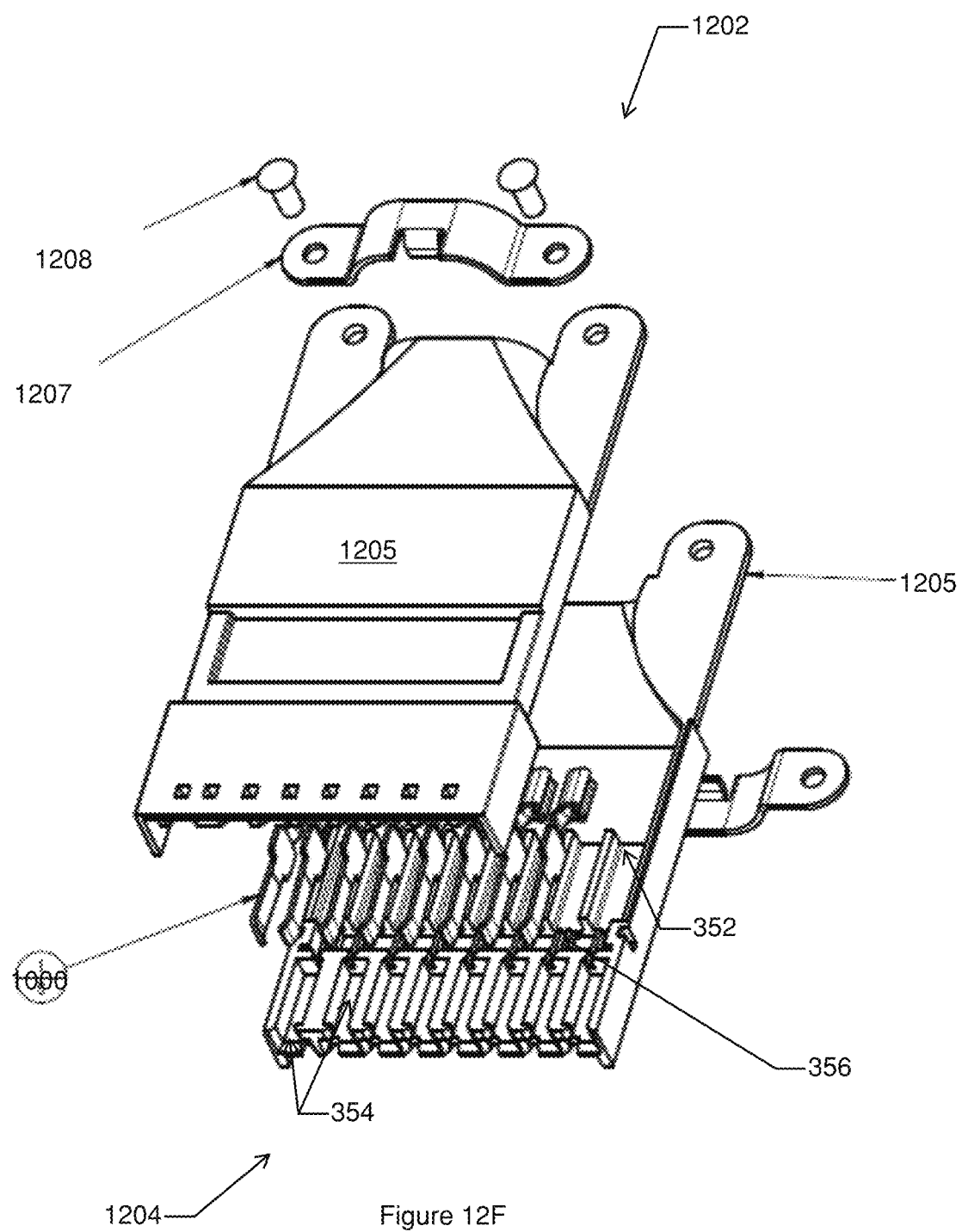
FIG. 12F illustrates an exploded view of an implementation of the example connector illustrated in FIG. 12E.

FIG. 12E illustrates a portion of the connector 1200 and FIG. 12F illustrates an exploded view of the connector. As illustrated, the connector may include first channels 352 and second channels 354. Recesses 356 may be disposed between the first channels 352 and second channels 354 and may receive the bodies of bars (e.g., body 1010 of bar 1000) disposed in the connector. A first end of a bar (e.g., 1002 of bar 1000) may couple with cabling (e.g., in a power track or other portion of a segment) and may extend from the first channel into the second channel 354 such that the second end of the bar (e.g., 1004 of bar 1000) may extending into channel 354. The channels 354 may create the recesses 1250 of the connector 1200. Thus, the second end of a bar (e.g., 1004 of bar 1000) may extend into the recess 1250 to connectivity coupling between bars of mating connectors. As illustrated, the channels 352 and/or 354 may create walls to comply with government and/or industry regulations regarding separation of electrical and/or data pathways and/or to inhibit transfer between adjacent bars of the same connector (e.g., arcing)

In some implementations, connectors may be formed of more than one part and the parts may be coupled together via clamp(s) 1207 and fasteners 1208. Disassembleable connectors may reduce costs, facilitate repairs, and/or maintenance.

In various implementations, the connector may be an extendable connector. For example, a first end of the connector may include an extendable portion. The extendable portion may allow the length of a segment to vary to facilitate connecting components of the raceway and/or to increase modularity of the raceway. For example, a segment may be positioned proximate another component in a layout of a raceway and at least one of the connectors may be extended and/or retracted to couple with the connectors of the segment and component. As another example, to remove a component from an existing raceway, a connector may be retracted to decrease the length and facilitate removal of the component (e.g., for replacement and/or repair). As another example, when replacing components in existing raceways, a connector may be extended to increase the length of the component to match and couple with other components in the existing raceway.

In some implementations, the recesses may have a shape capable of receiving a prong. For example, prongs of a male connector may have a first set of prongs and a second set of prongs, in which the second set of prongs is different that the first set of prongs (e.g., shape and/or relative orientation). The recesses in the mating (e.g., female) connector may have shapes to receive the prongs. For example the mating connector 1200 may have a first set of prongs 1251 in a first shape and/or first orientation and a second set of prongs in a second shape and/or second orientation. As illustrated in FIG. 12D, the shape (e.g., approximately C-shaped) of the prongs 1250 may be similar and an orientation of a second set of prongs 1252 may be different from an orientation of a first set of prongs 1251.

In various implementations, the raceway may include components such as extenders. The extenders may be capable of receiving and/or transmitting any appropriate connectivity for a raceway implementations. For example, an extender may include a power track and/or cabling (e.g., power and/or data). An extender may be shorter in length than a segment of the raceway in some implementations. Thus, the extender(s) (e.g., individually and/or in series) may allow disposition of nodes at lengths that may not be achievable using set length segments of raceways, in some implementations. The extender may be an adapter in some implementations. One side of the extender may include a first type of connector and the opposing side may include a second type of connector. For example, an extender may include first connector style, such as a male connector on one side and a mating connector style, such as a female connector on the other side.

Figure 13A:
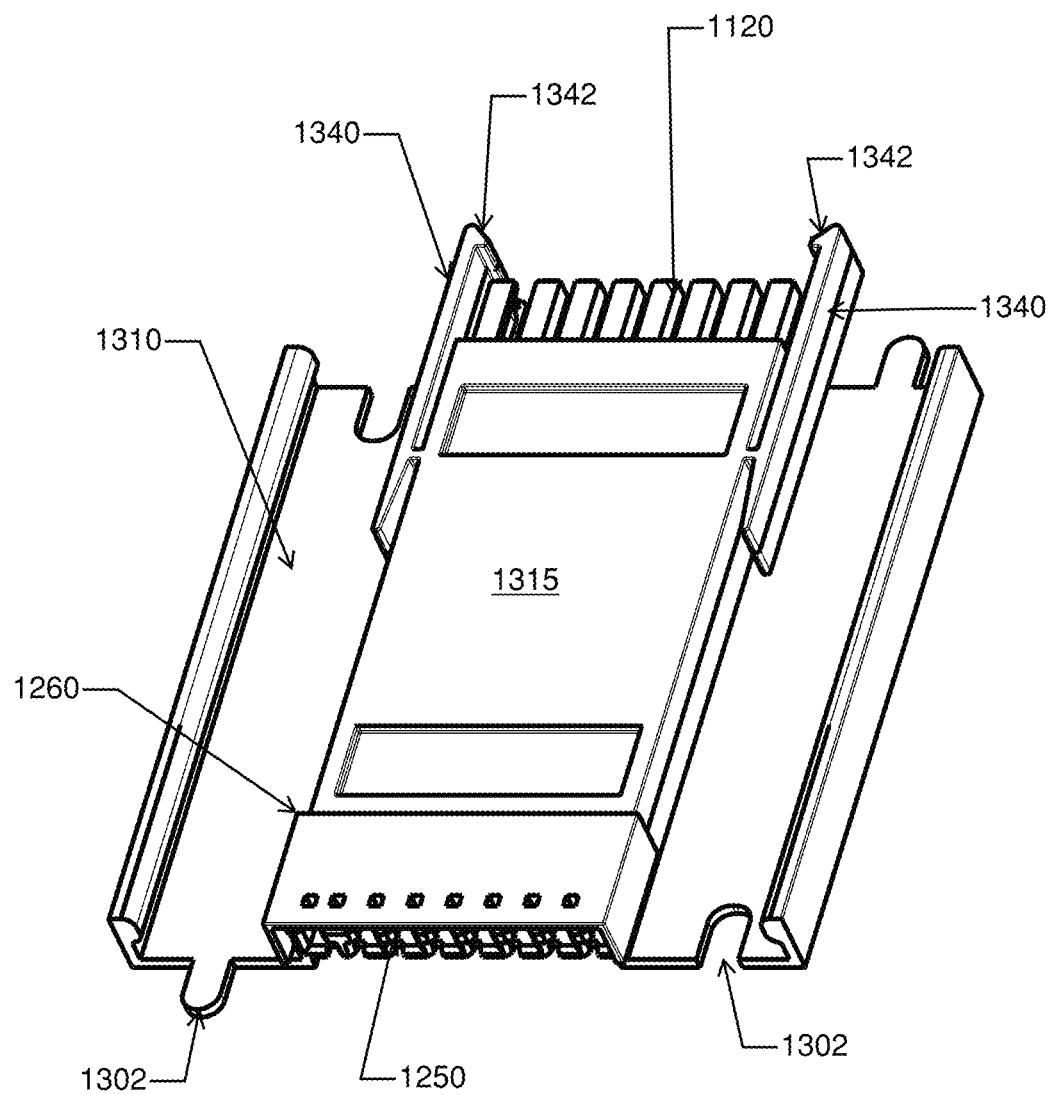
FIG. 13A illustrates a perspective view of an implementation of an example extender.
Figure 13B:
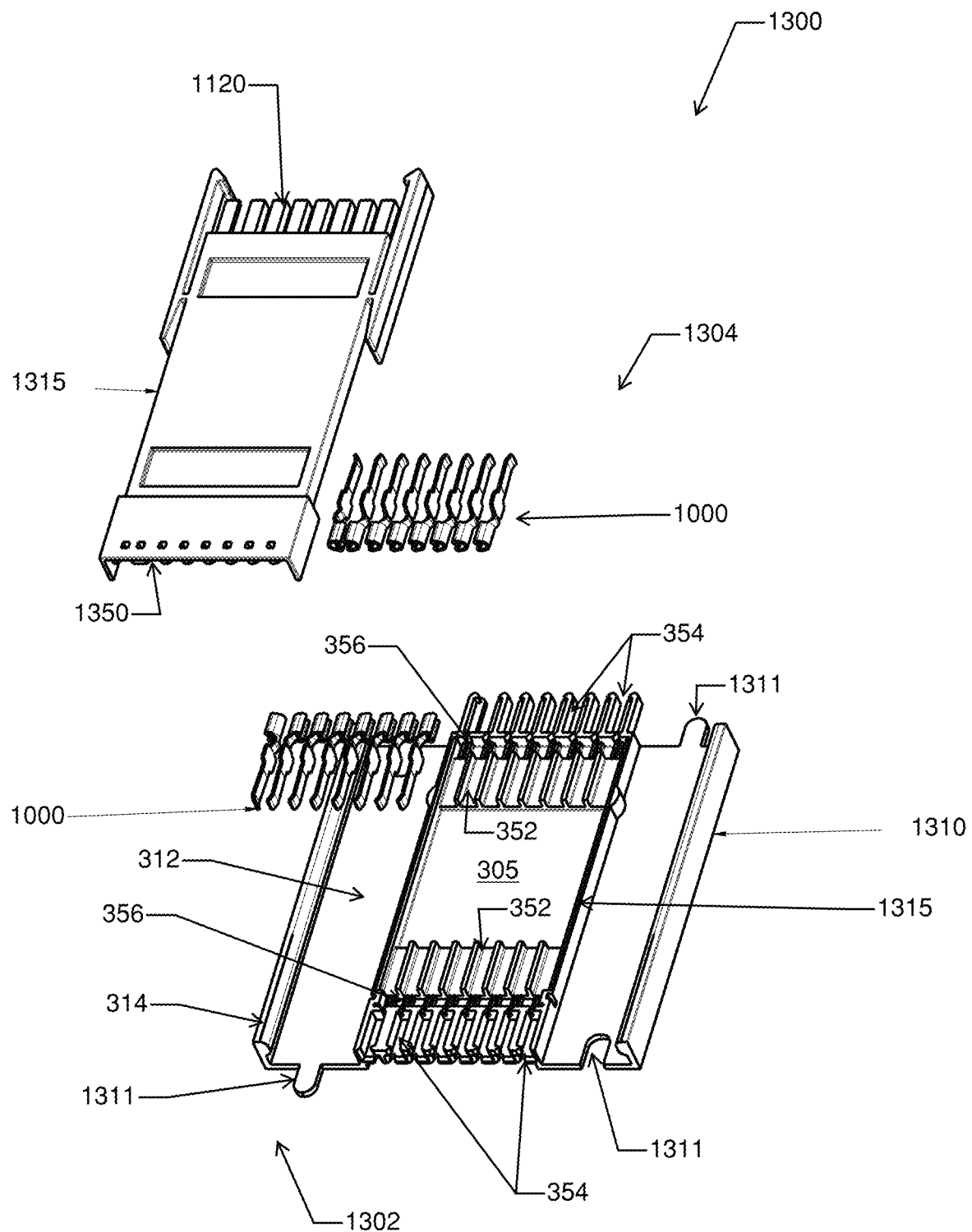
FIG. 13B illustrates an exploded view of an implementation of the example extender.

FIGS. 13A and 13B illustrate an implementation of an extender 1300. The extender may include a first side 1302 and a second side 1304. The extender may include a housing 1310 and an extender housing 1315. The housing 1310 may include key(s) 201 that facilitate alignment of the extender with other components of the raceway. For example key(s) may be include protrusion(s) and/or recess(es) capable of receiving the protrusion(s). The housing may include a base 3112 and wall(s) 314. The wall(s) 314 may have any appropriate shape, such as the walls or portions there of, illustrated in FIGS. 2A-2G, 4A-4E, 5A-5E, 6A-6E, and/or 8A-8E. For example, a wall may include first and second curved sections, first and second straight sections, and a third curved section. A wall 314 may or may not include a fourth curved section on an outer side of the wall. The extender housing 315 may cover or at least partially cover the cabling disposed in a cavity of the extender 305 and/or connection members, such as bars 1000.

As illustrated, the extender 1300 may include a first connector 1330 and a second connector 1335. The first connector 1330 and the second connector 1335 may be different types of connectors and/or connectors that are two of a mating set of connectors (e.g., male and female connectors). The first connector 1335 may be disposed on a first end 1302 of the extender 1300. The first connector may include housing of the extender may include channels 352 and 354 and recess(es) 356 may be disposed between the channels to receive bar(s). Channel(s) 354 may create recess(es) 1250 of the connector. A bar 1000 may be disposed in a recess 356 and extend at least partially into the cavity 352. The first end of the bar may be coupled to cabling proximate cavity 352. A second end 1004 of bar 1000 may also extend at least partially into cavity 354. The second end of the bars 1000 may be capable of contacting and/or coupling with another bar in a mated connector (e.g., the mated connector may include prongs that are received by recess 1250 and bar(s) may be disposed in the prongs).

The second connector 1335 may be disposed on a second opposing end 1304 of the connector 1300. The second connector may include prongs 1250. The prongs 1250 may be receivable in recesses of a connector similar to the first connector. The second connector may include channels 352, 354 and recess(es) 356 may be disposed between the channels to receive bar(s). A bar 1000 may be disposed in a recess 356 and extend at least partially into the cavity 352. The first end of the bar may be coupled to cabling proximate cavity 352. A second end 1004 of bar 1000 may also extend at least partially into cavity 354. The second end of the bars 1000 may be capable of contacting and/or coupling with another bar in a mated connector (e.g., the mated connector may include recesses that are capable of receiving the prongs, and in which bar(s) may be disposed).

In some implementations, arms 1340 (e.g., similar to arms 1130 may be disposed proximate the first and/or second connector). An arms 1340 may include prong(s) 1342 proximate an end of the arm. The arms may be flexible and deflect outwards when connectors are coupled (e.g., pushed together). A mating connector may include a recess, protrusion, and/or edge and, when coupled, the arm of a first connector may extend around and/or over the recess, protrusion and/or edge to couple the first connector and the mating connector. The protrusion 1342 may inhibit (e.g., inadvertent) uncoupling of the connector and a mating connector.

Thus, the extender may be capable of coupling with mated connectors and receiving and/or transmitting connectivity through the extender via the mated connectors.

Figure 14A:
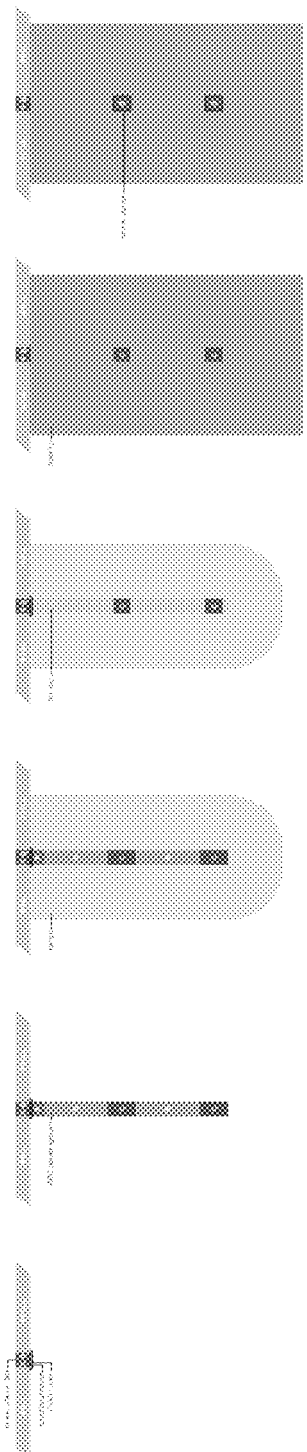
FIG. 14A illustrates implementations of example raceway assemblies.
Figure 14B:
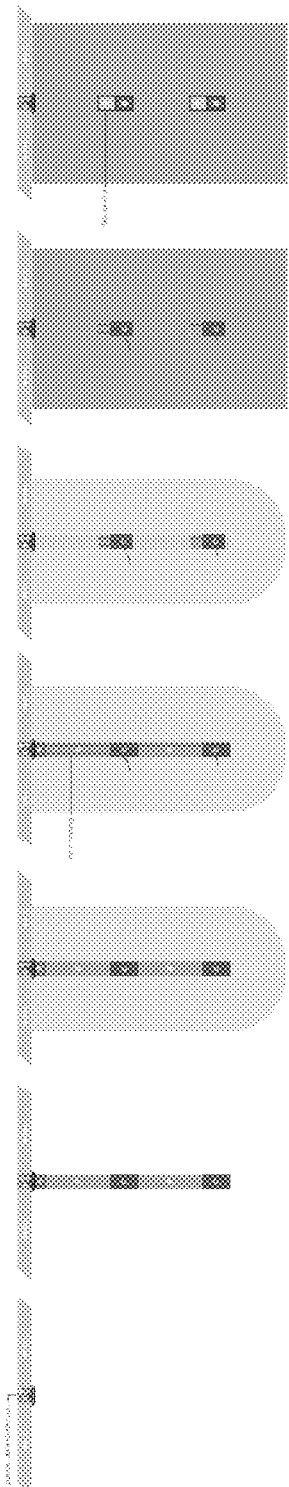
FIG. 14B illustrates an implementation of an example raceway assembly.
Figure 14C:
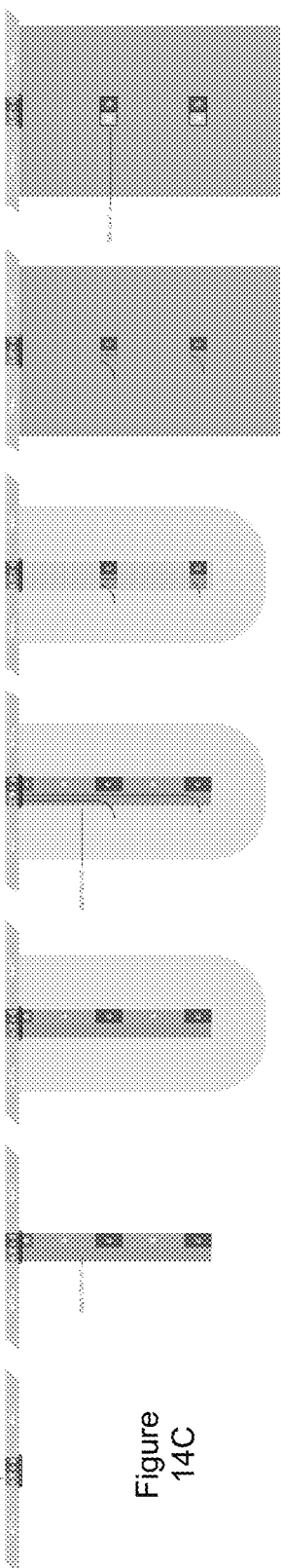
FIG. 14C illustrates an implementation of an example raceway assembly.

In various implementations, the components of the raceway may be coupled together to form the raceway. For example, a user may select components, such as one or more segments 100, one or more nodes 200, one or more segments 300, one or more segments 400, and/or one or more extender(s). Other components may be utilized with the raceway in addition to described components and/or in place of described components. A raceway arrangement may be determined and components for the raceway may be selected based on the determined raceway arrangement. FIGS. 14A-C illustrates several simplified raceway arrangements. As illustrated, the components may be selected based on where the raceway will be disposed (e.g., in, on and/or under flooring), where nodes will be positioned, etc. Ramps of one or more heights may be offered as part of a raceway kit to facilitate trip hazard reduction with raceway installations.

Raceways when assembled can provide connectivity to nodes, into which objects such as receptacles and/or furniture may be coupled to receive (e.g., use) the connectivity provided. For example, receptacles may provide users with access to power and/or data connectivity. As another non-limiting example, lamps, desks, and/or bookcases may be coupled to the raceway to obtain access to connectivity (e.g., to power objects and/or allow users to access the connectivity via the object, such as a desk).

FIGS. 15A-15D illustrate an example receptacle and portions thereof. Although the receptacle is illustrated for power connectivity, similar receptacles and/or housings of receptacles may be utilized for data and/or combined power and/or data receptacles. FIG. 15E illustrates a bottom perspective view of the receptacle 1500. FIG. 15F illustrates a side view and FIG. 15G illustrates a bottom view of the receptacle 1500. As illustrated, a receptacle may include a trim piece 1520, a socket assembly 1540, a skirt 1560, and a housing 1580. The housing 1580 may couple with a component of a racetrack. The housing 1580 may include coupling members 1582 proximate an end of the housing. The coupling members 1582 may couple with the wall(s) of a component of a raceway, such as a segment and/or node. The coupling members 1582 may include plates 1584 (e.g., planar and/or nonplanar) that deflect and/or plates that cause the walls of a component to deflect as the housing 1580 is inserted into the component of the raceway. The plates 1584 of the coupling members 1582 may include protrusions 1586. A protrusion 1586 may have a shape such that the protrusion is received by the third curved section of a wall of a component (e.g., third curved section 134 in FIG. 2E). In some implementations, the plate 1584 may contact a first straight section of a wall of the component and the protrusion may be disposed proximate the second straight section of the component (e.g. since the second straight section may be disposed at a distance from the first straight section as illustrated in FIG. 2E). In some implementations, a top portion 1588 may be offset from a bottom portion. As illustrated, a ridge 1590 may be disposed proximate the offset of the top section.

The skirt 1560 may be disposed at least partially about the housing 1580. A height of the skirt 1560 relative to the bottom section of the housing may be adjustable. The skirt may include tabs 1562. The tabs 1562 may or may not have the same height as the skirt. The tab may include a wall 1564 (e.g., planar and/or nonplanar) that may be coupled to the skirt (e.g., proximate one end) and may include a free end 1564. The tab 1562 may include protrusion(s) 1566 and/or the protrusions may be disposed on the tab proximate the free end 1564. The skirt may have an adjustable position utilizing the protrusions on the tab and the ridge(s) and/or edges of the housing. For example, a housing may include at least one ridge 1590. The housing may include other ridges disposed along a height of the housing. The protrusions of the tab may contact the ridge and retain the skirt in the position relative to the housing. As another example, the protrusions of the tab may contact an edge 1592 of the housing and retain the skirt in the position relative to the housing. As illustrated, since the top portion of the housing is offset, side wall(s) 1568 of the skirt and side wall(s) 1594 of the housing may approximately align.

The socket assembly 1540 may be disposed in the skirt and the housing. As illustrated in FIGS. 15E-15G, connectivity members 1541, such as bars, may extend from the socket assembly through openings 1596 in the housing such that the connectivity members may couple with the node underneath the housing. Any appropriate number of connectivity members 1541 (e.g., bars) may be utilized. Thus, the node may provide connectivity by allowing the connectivity members to extend through an access point and couple with, for example, access bars in the node. FIGS. 15C and 15D illustrate the socket assembly and an exploded view of the socket assembly, respectively. As illustrated, the socket assembly 1540 may include socket(s) 1542. A socket may include recesses 1542 to inhibit liquid from passing through to connectivity member(s). The socket, in some implementations, may be slidably activated. For example, inserting a plug into the socket may move the face plate 1543 of the socket in a direction along axis 1546 such that the openings in the socket approximately align with openings in the socket bars 1548 (e.g., electrical bars 1548 that transmit power via the socket). Utilizing a slidably activated socket may increase safety and inhibit fluids from contacting socket bars (e.g., when not coupled to a plug). As illustrated, the socket assembly may include columns 1550 in which the socket bars are disposed. The socket bars may thus be electrically isolated from each other and/or fluid isolated from each other (e.g., fluids entering one column may not enter another proximate column). Path bars 152 (e.g., electrical bars) may couple socket bars 1548 and/or connectivity members such that connectivity can be provided to plugs (e.g., associated with objects and/or electrical devices such as computers). The sockets 1542 may be disposed in a face plate 1554 and/or the parts of the socket assembly may be coupled to a socket plate 1556.

Figure 15A:
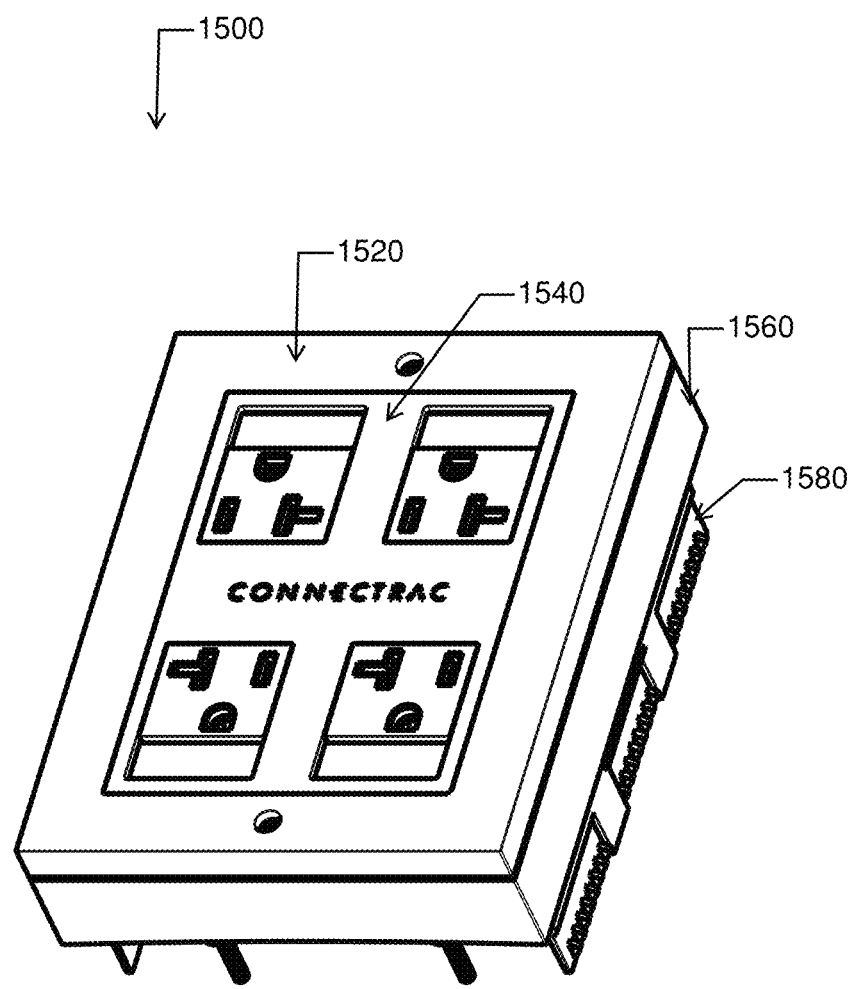
Figure 15B:
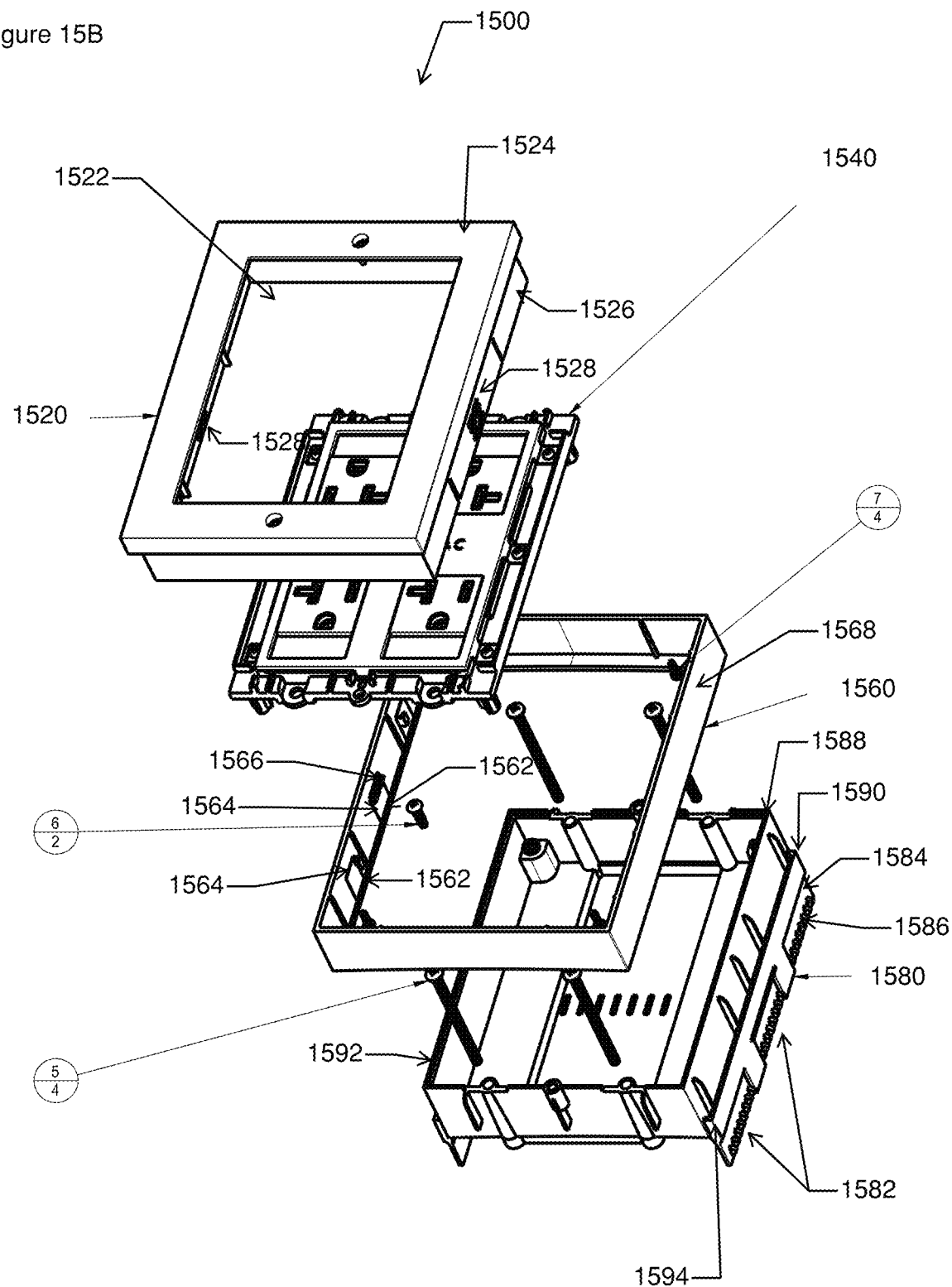
FIG. 15B illustrates an exploded view of an implementation of the example receptacle illustrated in FIG. 15A.
Figure 15C:
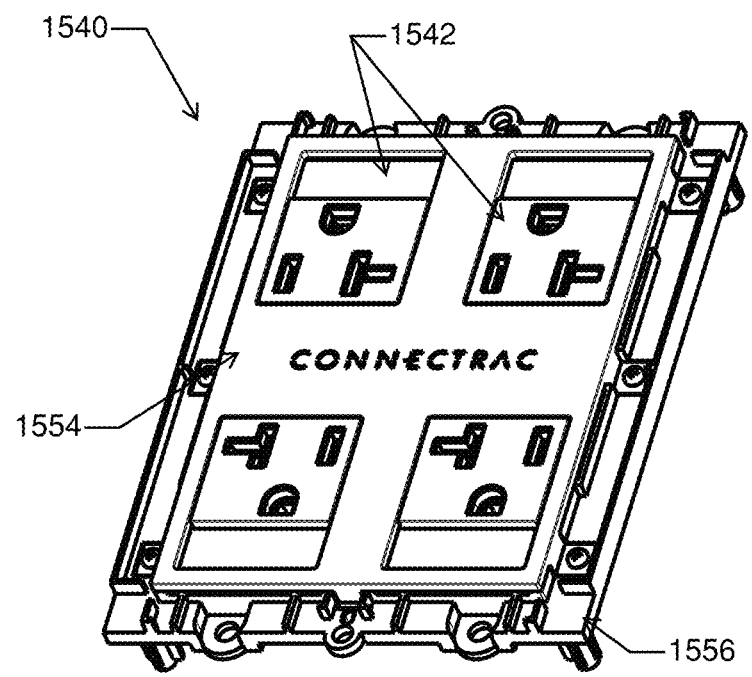
Figure 15D:
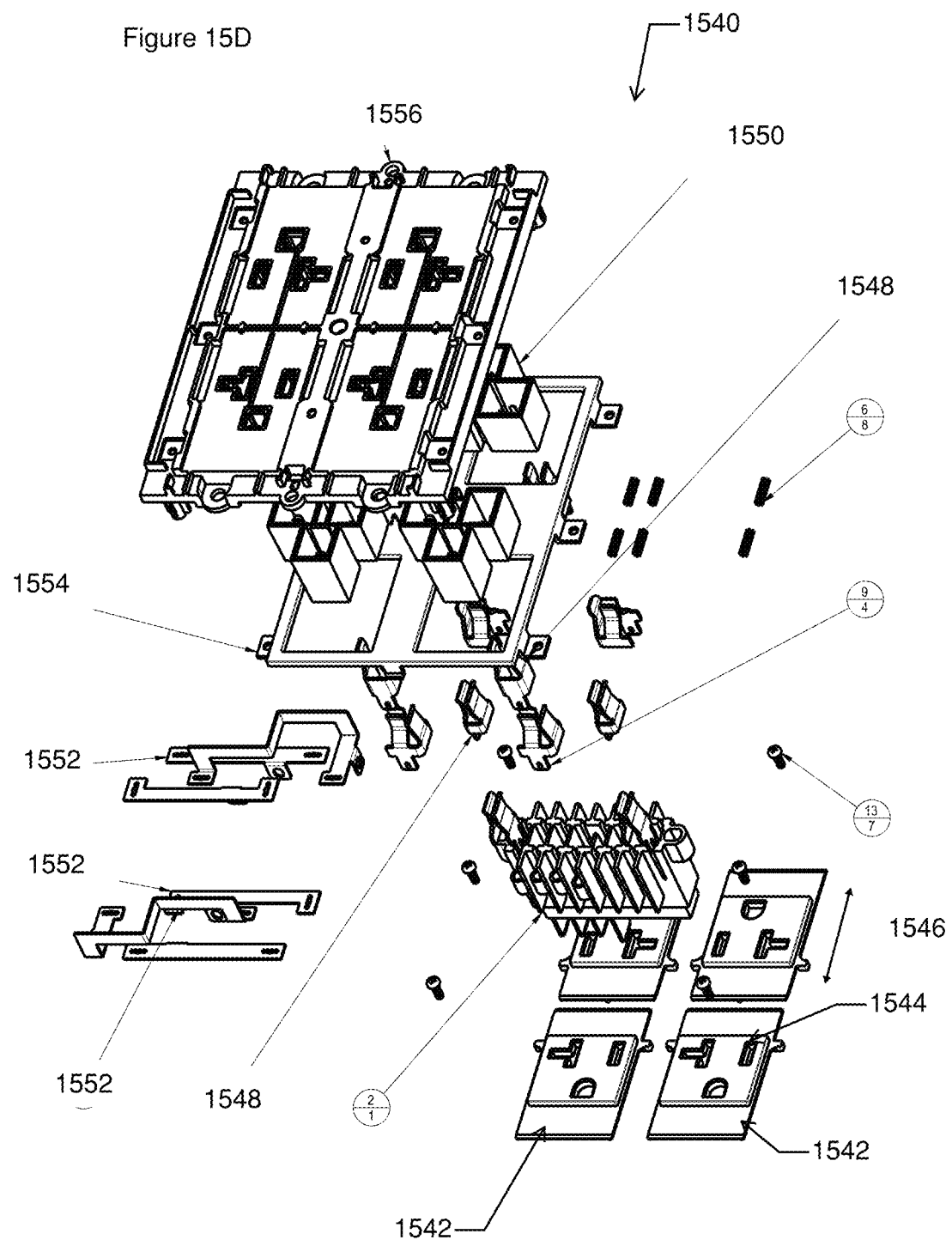
FIG. 15D illustrates an exploded view of an implementation of the portion of the example receptacle illustrated in FIG. 15D.
Figure 15E:
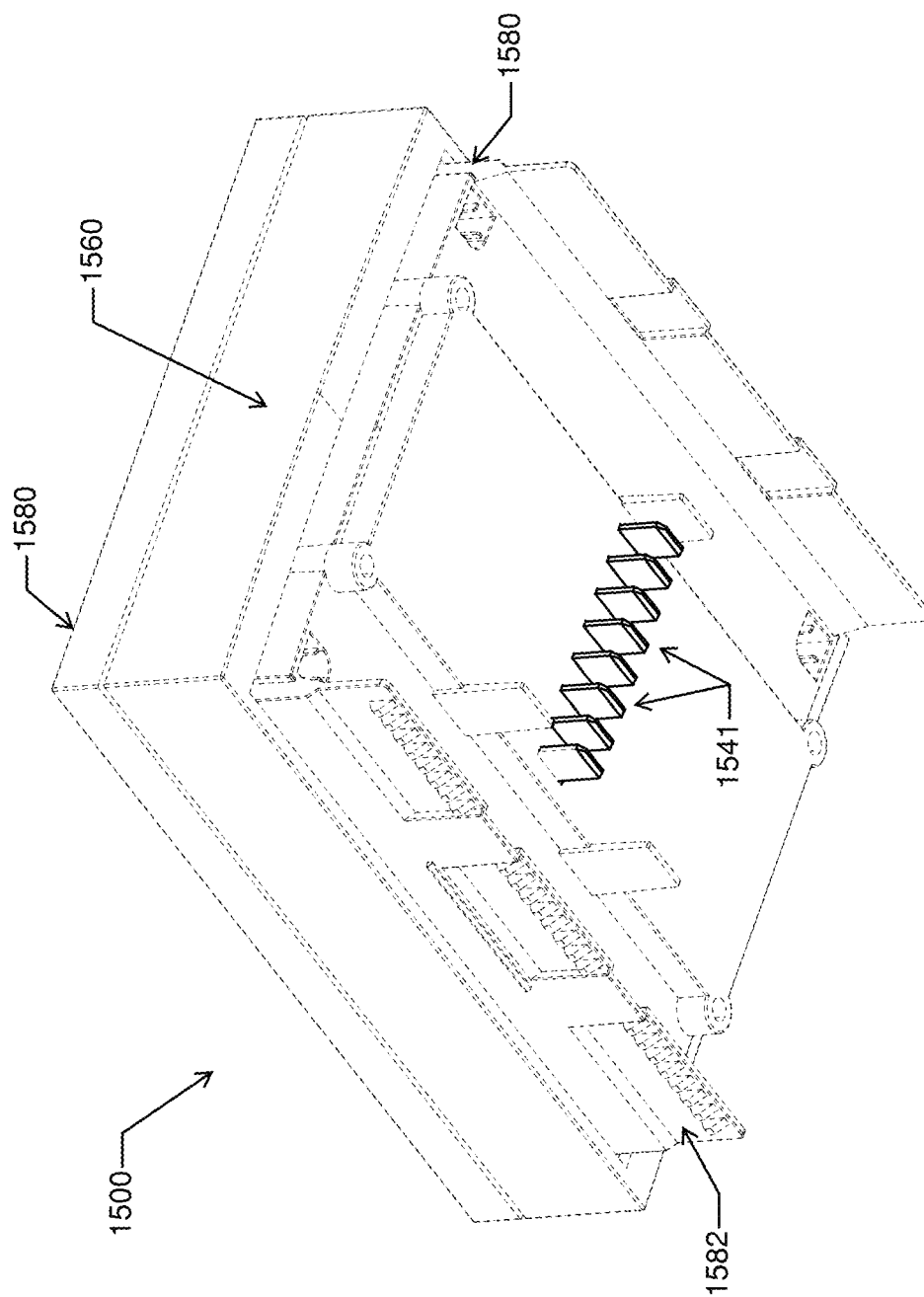
FIG. 15E illustrates a bottom perspective view of an implementation of the example receptacle illustrated in FIG. 15A.
Figure 15G:
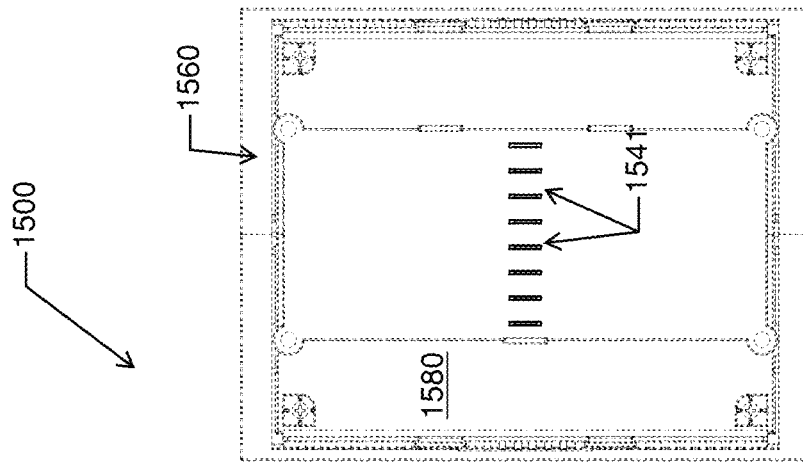
FIG. 15G illustrates a bottom view of an implementation of the example receptacle illustrated in FIG. 15A.
Figure 15F:
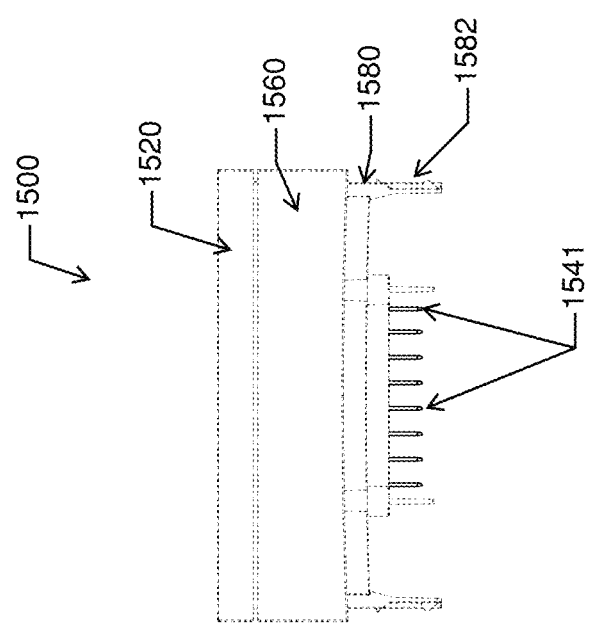
FIG. 15F illustrates a side view of an implementation of the example receptacle illustrated in FIG. 15A.

As illustrated in FIG. 15B, a trim plate 1520 may be disposed above the socket plate 1540. The trim plate 1520 may have an opening 1522 disposed through a top plate 1524 of the trim plate. The trim plate 1520 may include wall(s) 1526. The walls 1526 may extend from the top plate 1524 such that they may reside in the skirt. The walls 1526 may include tabs 1528 to couple with and/or retain the trim plate in a predetermined position relative to the skirt. When the skirt is disposed in a low position (e.g., when the protrusions of the tabs of the skirt contact the ridge 1584), the trim plate 1520 may also be in a low position. When the skirt is disposed in a higher position (e.g., relative to the low position in which the protrusions of the tabs of the skirt contact the edge 1588 of the housing), the trim plate may also be in a high position. Additional ridges may be disposed along a height of the housing so that the skirt may be disposed in other higher positions that the low position and lower than the high position. Thus, the height of the receptacle may be adjusted between one or more positions.

Figure 15H:
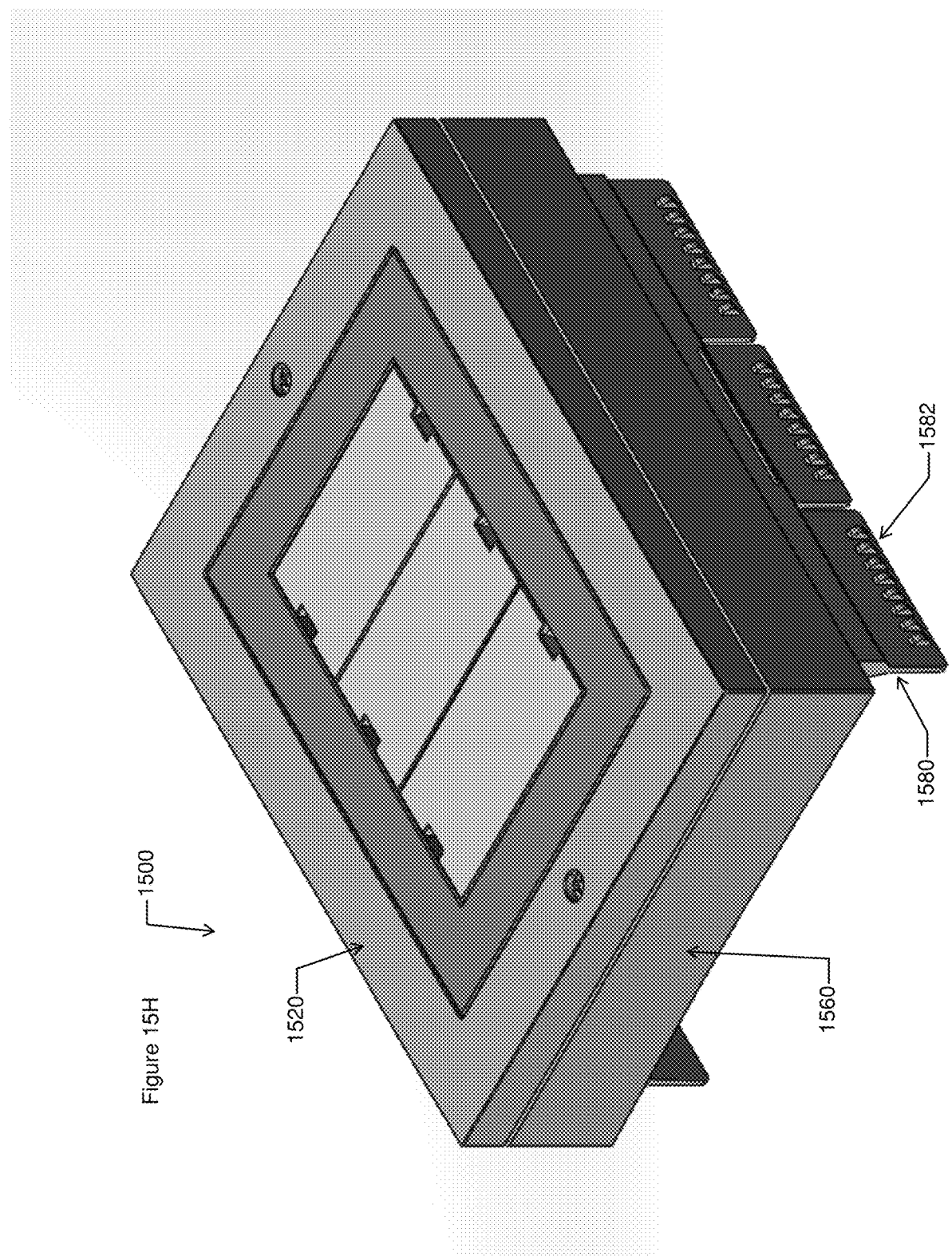
FIG. 15H illustrates a perspective view of an implementation of an example receptacle.
Figure 15I:
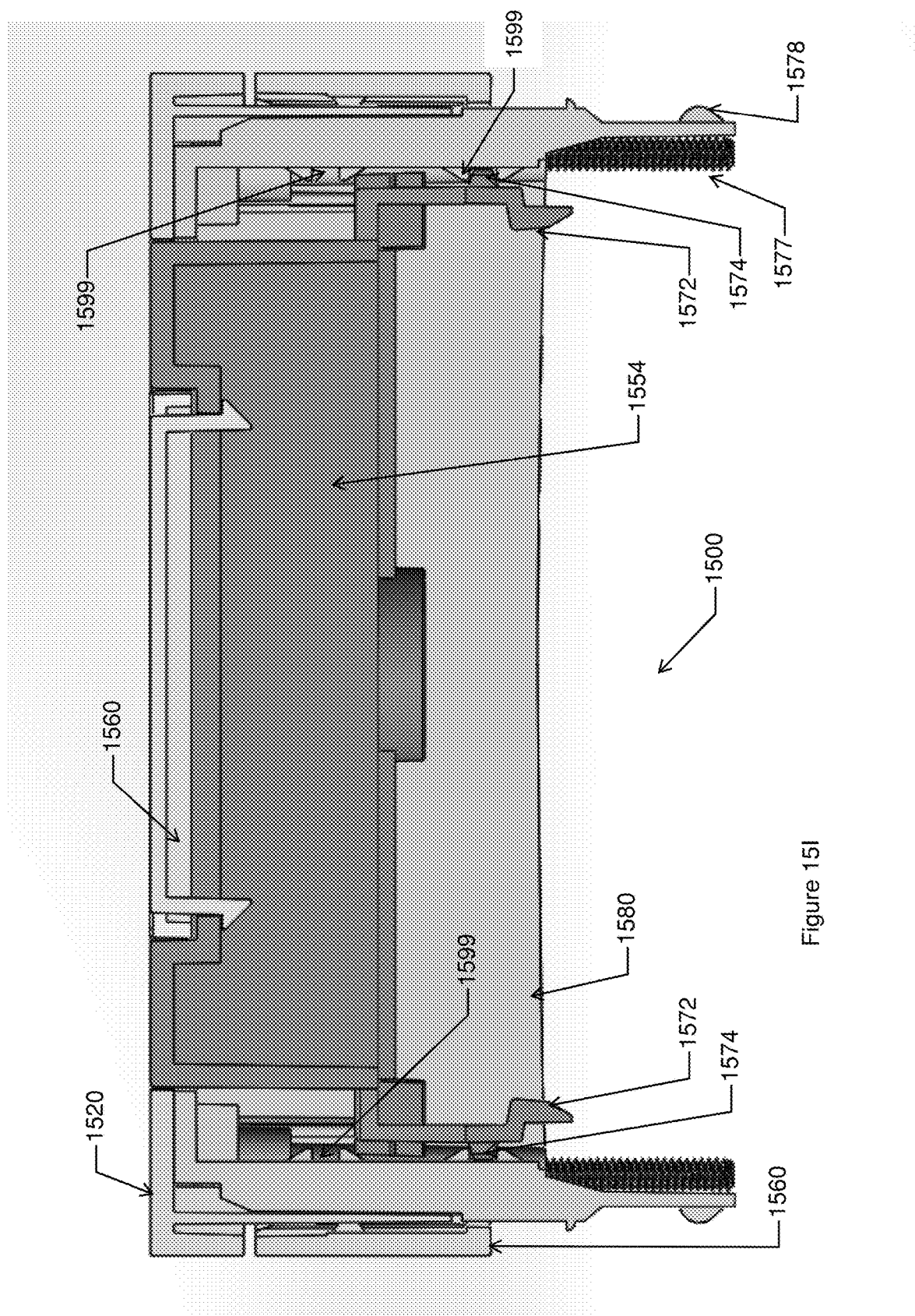
FIG. 15I illustrates a cross-sectional view of an implementation of the example receptacle illustrated in FIG. 15H.
Figure 16C:
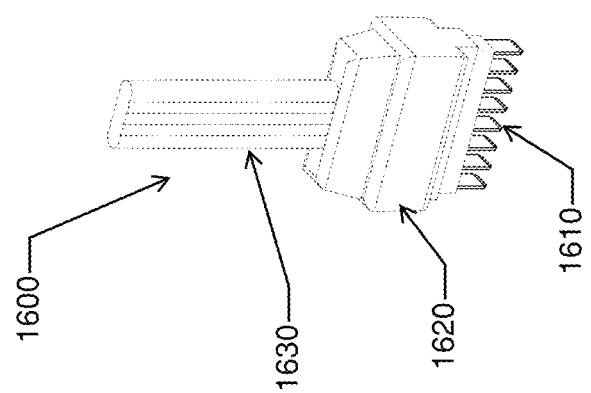
FIG. 16C illustrates a side perspective view of an implementation of the example node plug illustrated in FIG. 16A.
Figure 16B:
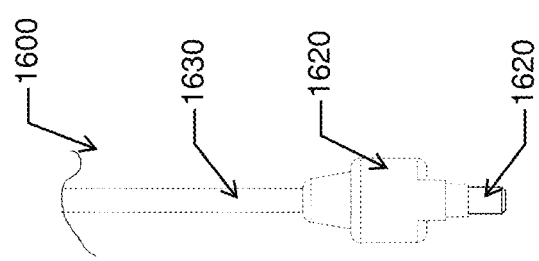
FIG. 16B illustrates a side view of an implementation of the example node plug illustrated in FIG. 16A.
Figure 16A:
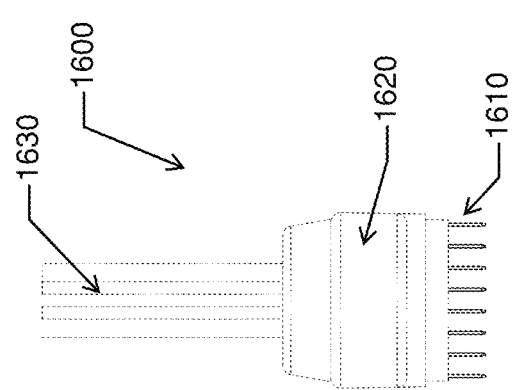
FIG. 16A illustrates a front view of an implementation of an example node plug.

As illustrated in FIGS. 15H and 15I, a receptacle may also include data sockets in addition to and/or instead of power sockets. A trim plate 1520 may receive a socket assembly 1540 with data sockets. A skirt 1560 may be coupled to the housing 1580. As illustrated, the receptacle may include a face plate 1554 that can be extended. The face plate 1554 may include a body 1570 with side walls 1572 and legs 1574, extending from the side walls. The legs 1574 may include protrusion(s) 1575. The protrusions 1575 of the legs 1574 may be received by recesses 1599 (e.g., disposed between protrusions). The recesses 1599 may be disposed along a height of the housing such that the coupling between the legs and the recesses via the protrusion may be used extend or retract the face plate 1554 of the socket assembly 1540.

In some implementations, the receptacle 1500 may be coupled to the raceway via fastener(s) 1577. The fasteners may contact a top surface of the base and/or couple with the base of the raceway. In some implementations, the face plate of the socket assembly and/or the trim plate may include openings to guide the position of the fastener(s). The fastener(s) may be positioned in the raceway such that the fastener(s) exert an outward force on the legs of the housing and the protrusion 1578 is pushed outward to contact a wall of the housing (e.g., the second straight section of a wall of a housing of a segment).

In some implementations, the height of a receptacle may be fixed.

In some implementations, objects (e.g., furniture, lighting, etc.) may be coupled to the raceway via a node plug. Since a standard 2 or 3 prong electrical plug and/or a standard Ethernet plug may not be couplable to a node, a node plug may be utilized to couple objects directly to the raceway (e.g., as opposed to via a receptacle). The node plug may be integrated into the object and/or an adapter may be utilized to couple the plug of the object to the node plug (e.g., one end of an adapter may be a socket to receive the plug of the object, and the socket and the node plug may be connectivity coupled). The node plug 1600 may include prongs 1610, a plug housing 1620, and/or a cord 1630. The prongs 1610 may be bars (e.g., electrical bars) capable of coupling with a node such as node 200 and/or a plug capable of coupling with other nodes, such as a data node. The prongs 1610 may extend from the plug housing and into the slots of the access point of the node, when coupled to the node. The bars of the prongs 1610 may contact access bars via the access point to provide connectivity (e.g., power) to the object coupled via the node plug. The node 1600 may or may not include the same number of prongs 1610 as the access point has slots. The node housing 1620 may be any appropriate size and/or shape. At one end of the node housing 1620, prongs may extend from the node housing and from another end of the node housing, a cord may extend. The cord may include any appropriate cables and/or wires to provide connectivity as appropriate. For example, the cord may be flexible, extendable, and/or self adjusting in length. For example, a cord may be a spiral and/or coiled cable (e.g., helically wound cable that is capable of extending and shortening in length when a force is applied and/or removed from the cable).

In some implementations, the node plug may couple with the raceway. For example, the node plug may include legs that couple with the raceway, plates and/or flanges through which fasteners may be disposed, etc. In some implementations, the node plug may have an additional housing, similar to the housing of the receptacle illustrate in FIG. 15I. Fasteners may be disposed proximate legs of the housing which may cause the legs to be exerted against walls of the housing of the segment of the raceway.

Figure 17A:
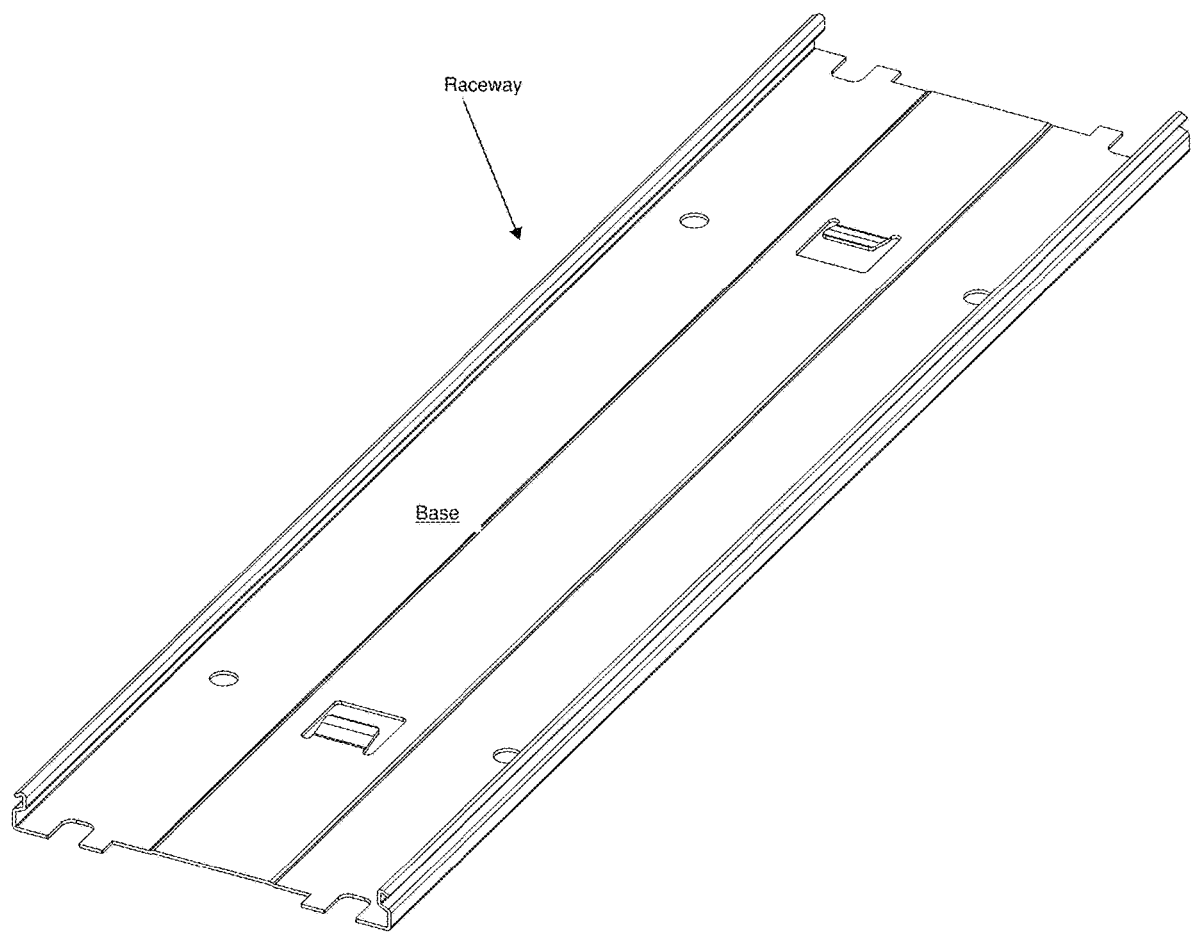
FIG. 17A illustrates a front perspective view of an implementation of an example raceway
Figure 17B:
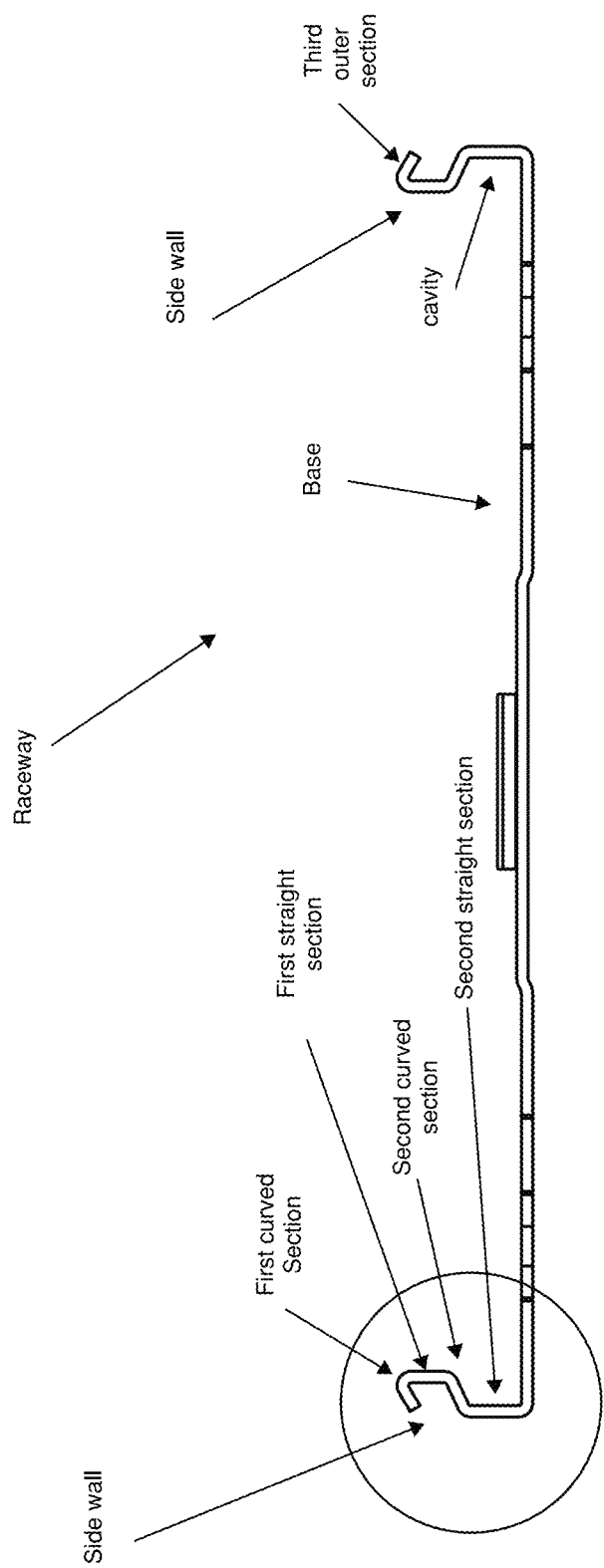
FIG. 17B illustrates a front view of a portion of the implementation of the example raceway illustrated in FIG. 17A.

Although various shapes and orientations of raceways have been described, other raceways may be utilized with the described raceway features. For example, a raceway housing similar to the raceway described in U.S. patent application Ser. No. 15/985,693, which is hereby incorporated by reference fully herein to the extent that its teachings do not conflict with the teachings herein, may be utilized with one or more of the described raceway components and/or features. As another nonlimiting example, the raceway and/or components thereof may be similar to the raceway and components described in U.S. Design patent application Ser. No. 29/684,981 filed Mar. 25, 2019, and hereby incorporated by reference fully herein to the extent that its teachings do not conflict with the teachings herein. As another example, a raceway housing such as the raceway housing described in FIG. 17A-17B may be utilized. FIG. 17A illustrates a front perspective view of an implementation of an example raceway and FIG. 17B illustrates a front view of a portion of the implementation of the example raceway. As illustrated, the raceway includes a base with a first side wall proximate a first end and a second side wall proximate a second opposing end of the base. The side walls may be similar as illustrated and/or different. The side wall may include a first curved section and a second curved section, where the second curved section is more proximate the base than the first curved section. The side wall may include a first straight section and a second straight section, where the second straight section is more proximate the base than the first straight section. The straight sections may include a section that is approximately planar. As illustrated, the curvature of the first curved section and/or the second curved section may be greater than the curvature of the first and/or second curved section of the raceway illustrated in FIGS. 2C and 2D, and the raceway side walls may have a more angular appearance. However, the curved and/or straight sections may operate similarly functionally to the side walls illustrated in FIGS. 2C and 2D. For example, the first curved section may guide a wall of a cover into a predetermined position in the raceway. The first straight section may contact a wall of the cover to facilitate retention of the cover in the raceway. The second straight section may be disposed farther away from a center of the raceway than the first section to create a cavity proximate the side wall. The cavity may facilitate retention of components, such as covers, caps, cases, etc. The side walls may at least partially deflect in some implementations.

Figure 18:
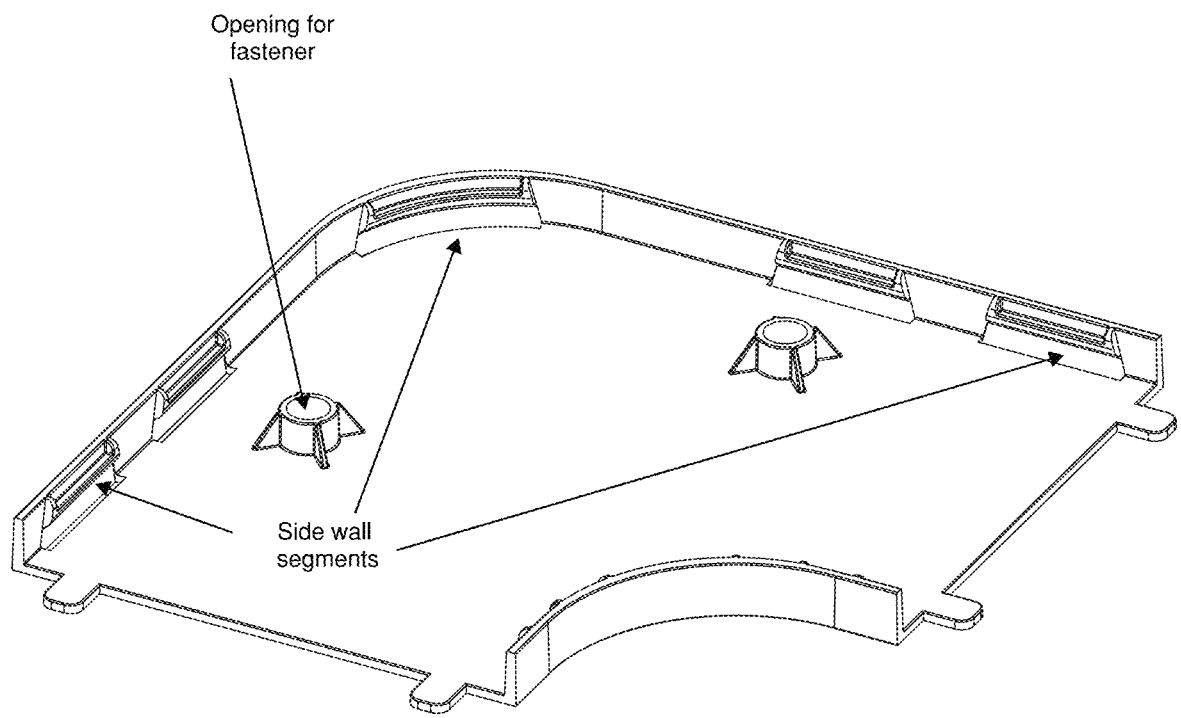
FIG. 18 illustrates an implementation of an example curved section.
Figure 19:
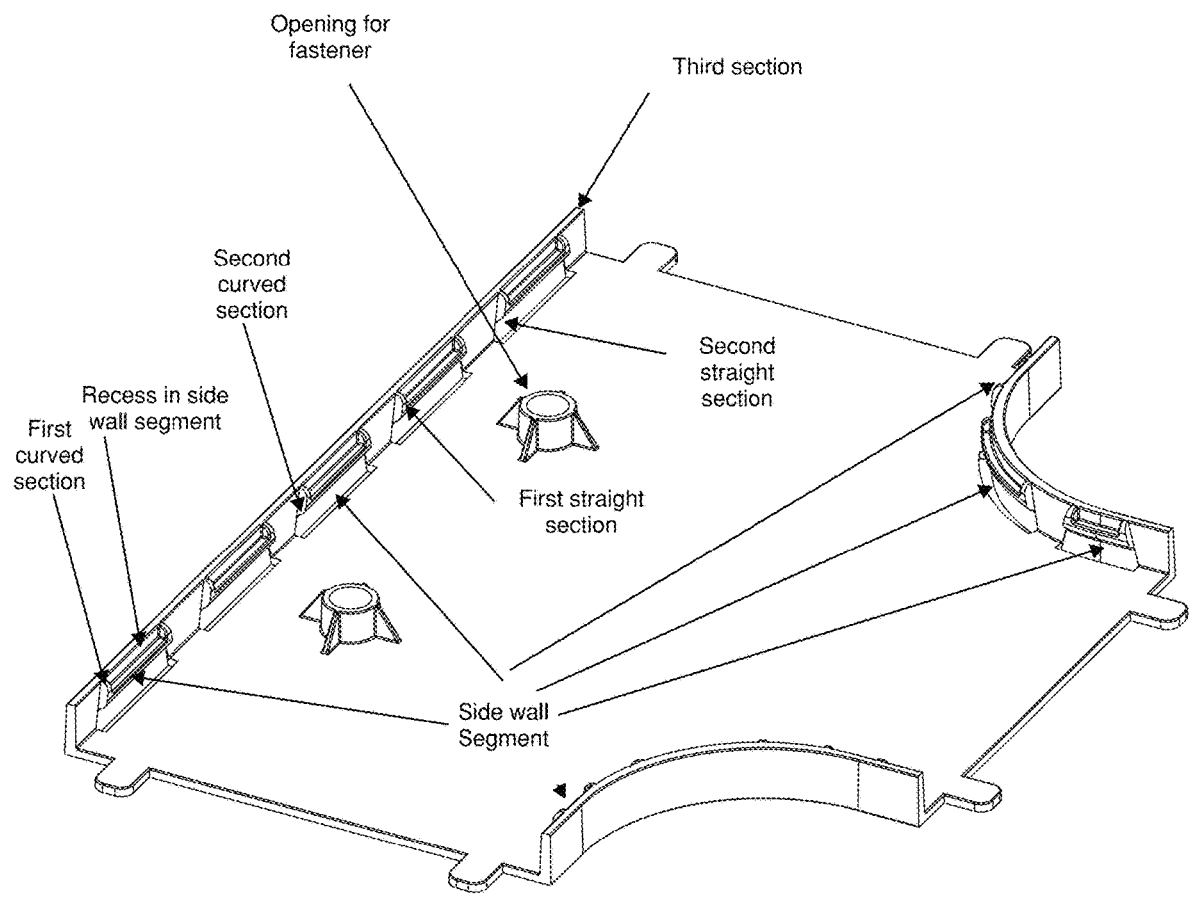
FIG. 19 illustrates an implementation of an example t-shaped section.

As another nonlimiting example, other implementations of a curved section raceway and a t-shaped raceway may be utilized. As illustrated in FIGS. 18 and 19, a curved section raceway and t-shaped raceway may include segments of couplers. For example, the first curved section may not be continuous on a side wall and segments may be utilized. In some implementations, the segment of the sidewall with the second curved section may extend along the length of the raceway segment and/or may be in segments, as illustrated in FIGS. 18 and 19. The sidewall may include a recess. The recess may be proximate the first curved section and extend at least partially in the first straight section. The cavity may facilitate removal of cover(s) coupled to the raceway. For example, a tool (e.g., screwdriver, finger) may be inserted in the gap between the third outer section of the raceway illustrated in FIG. 17B and the first curved section to lift (e.g., gently lift, pry, etc.) a cover off a raceway. However, a gap may not reside between the third section and the first curved section in the raceways illustrated in FIGS. 18 and 19. Thus, the recess may facilitate cover removal. A tool may be inserted at least partially in the recess of the side wall and the cover may be lifted off. As illustrated, the base of the curved section and/or t-shaped section may include openings for fasteners to facilitate coupling the raceway to a floor (e.g., subfloor, flooring, etc.). The base of the curved section and/or t-shaped section may include a cavity in which cables (e.g., data and/or power may be disposed).

Figure 20:
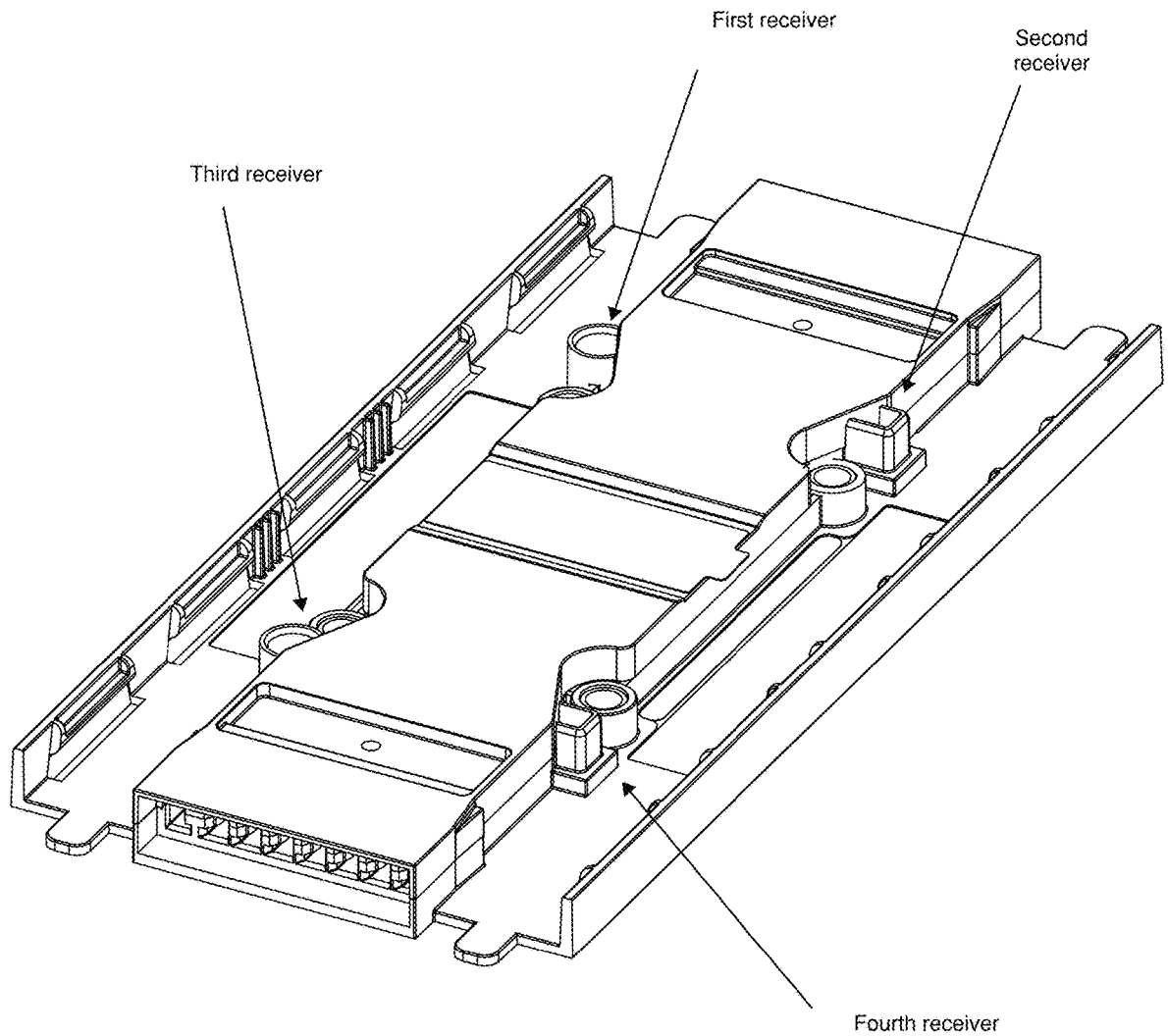
FIG. 20 illustrates an implementation of an example node in an example raceway.
Figure 21A:
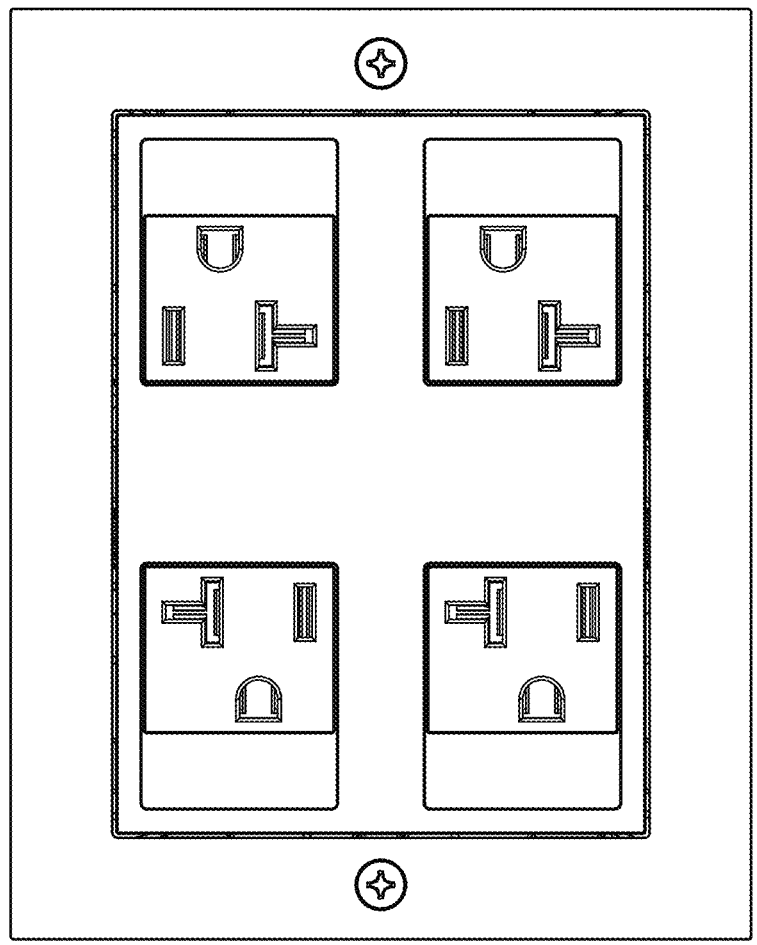
Figure 21B:
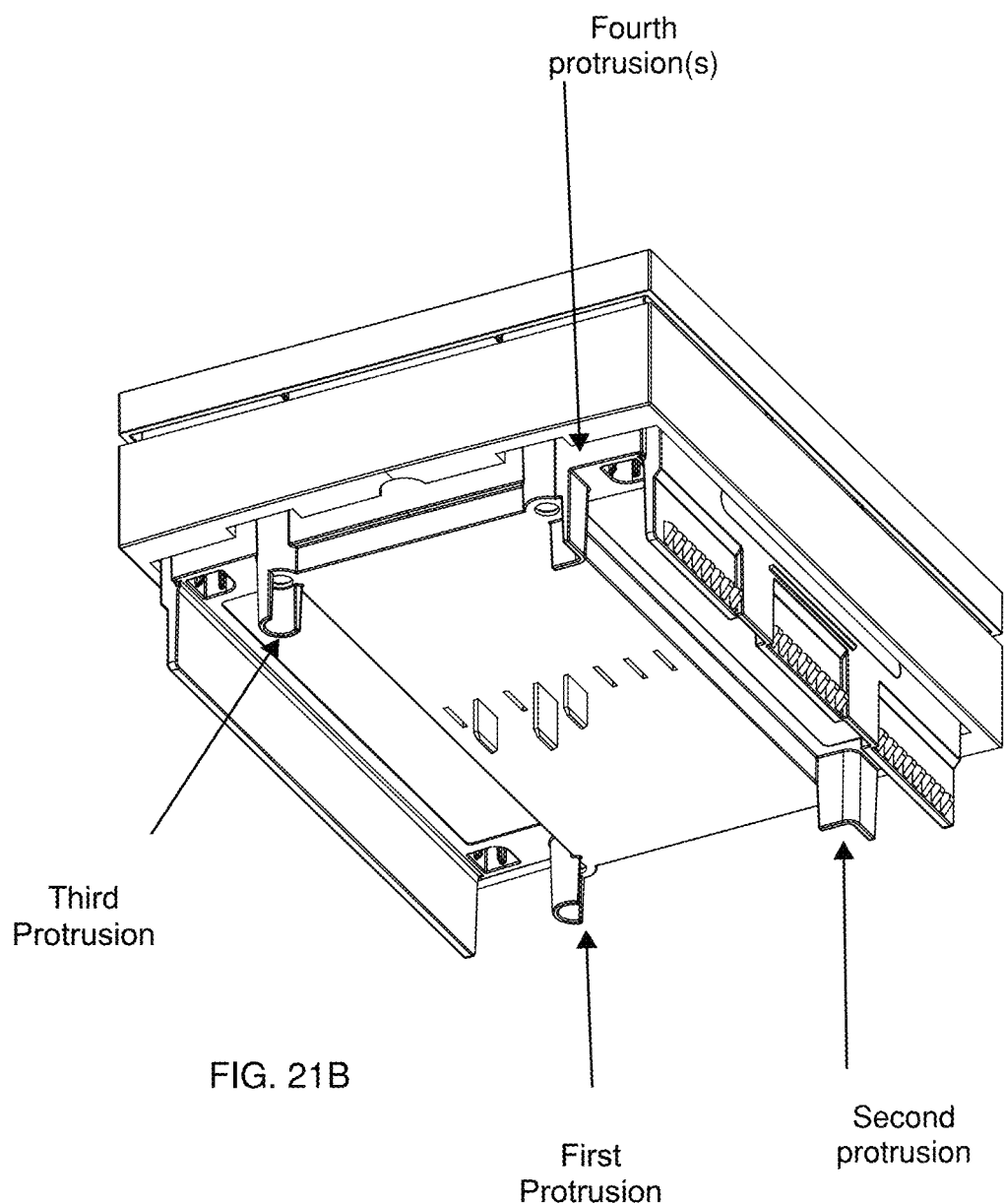

In various implementations, a user attempted to couple a component with another component in a flipped orientation (e.g., protrusions from segments and/or nodes would align rather than a protrusion aligning with a recess), the protrusion on one of the components may inhibit coupling by creating a gap between the components. This gap may or may not be greater than a connector on the component may extend in some implementations. If the connector is not capable of extending a distance greater than the gap, connection in a nonaligned arrangement may be inhibited. In some implementations, if the connector is capable of extending a distance greater than the gap, a connection in a nonaligned arrangement may be allowed. For example, an extender (e.g., with a connector on a first end and a mating style connector on the opposing second end) may be capable of extending greater than the gap to allow connectors to extenders even if the keys of the extender and/or component to which it is coupling are not coupleable (e.g., recess to recess and/or protrusion to protrusion). In some implementations, an extender may include keys capable of not inhibiting coupling (e.g., recesses) and/or may not include keys. FIG. 20 illustrates a portion of a raceway with a set of receivers to facilitate insertion of receptacles in a predetermined orientation. FIGS. 21A-21B illustrate an implementation of an example receptacle that is capable of mating with the receivers. As illustrated, the raceway includes a node with access points. The access points allow prongs of a receptacle to contact connectivity components and provide power and/or data to the receptacle. The receivers are disposed on the node housing and/or raceway housing to facilitate proper orientation of receptacles that couple with the node. As illustrated, the receivers may be similar or different. The set of receivers (e.g., first receiver, second receiver, third receiver, and fourth receiver) may allow a first orientation of the receptacle and/or may inhibit a second orientation (e.g., 180 degree rotation from the first orientation). The size and/or shapes of the receivers may operate to inhibit the second orientation. As illustrated, the protrusions on the receptacle are configured to be received, receive, and/or have properties that inhibit the protrusions being blocked by the receivers (e.g., height, shaped, etc.). As illustrated, the first receiver and the first protrusion mate, second receiver and the second protrusion mate, third receiver and the third protrusion mate, and/or fourth receiver and the fourth protrusion mate.

In some implementations, one or more prongs may be longer than other prongs in connectors and/or receptacles. For example, a ground prong on a receptacle may be longer than one or more other prongs. As another nonlimiting example, a ground prong on a male connector may extend greater (e.g., longer) than one or more other prongs. Connecting the ground prong of the male connector and/or receptacle may increase safety and/or facilitate compliance with industry and/or government regulations.

In various implementations, height 165 of the walls 164 of the cover 160 may vary. For example, a raceway kit may provide covers in more than one height. In some implementations, a first height may be associated with a first component, such as segment 200 and a second height may be associated with second components, such as raceway 400. In some implementations, the height of a cover used in an application may be based on the height of the raceway component used and/or the installation (e.g., flooring height).

In various implementations, connectors (e.g., 30, 170, 350, 1100) may be fixed in length and/or capable of extending. For example, the connector may include an extending portion between slots of the connector and the connection with the cabling. The extending portion may expand and retract within the case of the power track. Utilizing extendable connectors may facilitate placement of a segment and/or node of a raceway into the raceway. For example, a segment may be joined to a node in place on a floor of a location, the connector of the segment may extend such that it can be connected to the node. Use of extendable connectors may make the system more modular since the extending portions may help fill gaps that might otherwise exist when components of the raceway are replaced.

In some implementations, raceways may be disposed in any appropriate raceway arrangement in a location. For example, more than one raceway may be disposed (e.g., side-by-side) in a parallel arrangement. At least one first raceway may include a power track and may provide power connectivity and at least one second raceway may include data connectivity. In some implementations, a receptacle may couple to two or more raceways. For example, power and data raceways may be disposed side-by-side and a first end of a receptacle may couple with the power raceway and an opposing end of the receptacle may couple with the data raceway.

In some implementations, data connectivity may be provided over power connectivity cables. In some implementations, power and data connectivity may be provided in a single raceway.

In some implementations, PCBs may be utilized in nodes, segments, and/or other components of the raceway instead of and/or in addition to cabling. The PCB may be capable of providing power connectivity via bars. The bars may extend from the PCBs disposed in a cavity of the housing of a component.

In some implementations, a raceway may be capable of including 8 cables and may have a height less than 1 inch. In some implementations, a raceway may be capable of including 8 cables and may have a height less than a half of an inch. In some implementations, a raceway may be capable of including 8 cables and may have a height less than 1.5 inches. Ramps may not be utilized with the low profile raceway in some implementations, because the height of the raceway may not be considered a trip hazard (e.g., by government and/or industrial regulations). In some implementations, the raceway may have a height such that a recess may be created in a subfloor and the raceway may be disposed at least partially in the subfloor such that the raceway may be approximately level with the flooring.

In some implementations, caps may be used at the end of a raceway. For example a cap may have a connector at a first end and a wall at a second end (e.g., such that access to the inside of a raceway via the second end is inhibited.

In some implementations, nodes may be disposed in the power track rather than coupled separately to the power track.

In various implementations, one or more of the covers 160, 160a, 160b and/or any other appropriate cover may be utilized to cover portions of the raceway.

The raceway may have a width, height, and span (e.g., length). In various implementations, the raceway system may be low profile (e.g., height less than approximately 1 inch, less than approximately 0.6 inches, etc.). The low profile of the raceway may allow the raceway to be more easily incorporated into subfloors, may reduce trip hazards, and/or may increase the aesthetics of the raceway. The raceway may have a narrow track (e.g., a width less than conventional raceways). Use of narrow track raceways may increase the aesthetics of the raceway and may increase user satisfaction (e.g., since less space is devoted to the raceway and the raceway is less obtrusive in open areas). The narrow track and/or low profile track may reduce trip hazards (e.g., since the height and/or width of the track above flooring may be reduced and/or eliminated).

In various implementations, although a portion of a component may be described as a male connector (e.g., of another component) that couples with a female connector, the portion of the component may additionally and/or instead have a female connector that couples with a male connector. In some implementations, other types of connectors may be utilized rather than and/or in addition to male-female connectors, as appropriate.

In various implementations, the power track and/or cabling of the power track may be disposed at a height from a floor on which the housing of the component of the raceway is disposed. For example, a raised portion may be included in the housing. In some implementations, the power track may be elevated about the floor by the thickness of the housing and/or portions of the power track. By elevating the cabling of the power track, fluids from spills and/or minor flooding may be inhibited from contacting the cabling and thus damage to the cabling (e.g., data and/or power) may be inhibited.

In various implementations, raceways may be provided that are capable of providing connectivity (e.g., data and/or power). For example, raceways may be utilized to provide connectivity to receptacles, power cords, appliances, furniture, and/or any other appropriate object. A raceway may house cabling for power and/or data. The raceway may be modular to allow raceway components to be selected for an application. For example, the raceway may include a housing that is provided in segments. The segments may include a power track and/or may be capable of receiving wiring for data. In some implementations, a raceway may include a power track that allows in track coupling of power lines between segments rather than hardwired connections.

In various implementations, a raceway may include segments. The segments may be coupled together to assemble the raceway. A segment may include a raceway housing. A raceway housing may include a first side disposable on a floor and a second opposing side. The second opposing side may include a base and two side walls disposed proximate ends of the base. One or more cavities may be disposed between the side walls. A segment of the raceway may include connectivity segments, such as a power segment. A power segment may include a case and power cables disposed at least partially in the case. The case may be disposed at least partially in one of the cavities of one of the raceway housings. At least one lumen may be formed between the case and the second opposing side of the one of the raceway housings. Power cable(s) of the power segment may be directly or indirectly coupled to a power source. Segments may include node segment(s). A node segment may couple with one or more receptacles such that power and/or data is provided from the node segment to the coupled receptacle(s). A node segment may include a node housing disposed at least partially in one of the cavities of one of the raceway housings. The node segment may be coupled to at least one of the power and/or communication connectivity segments such that connectivity (e.g., power and/or communication connectivity) is provided to the node segment. The node segment may include node connectivity component(s) such that when the node segment is coupled to at least one of the power segments via the one or more node connectivity component(s) power is provided to the node segment. A node segment may include at least three access points (e.g., 6, 8, etc.). An access point may be disposed through a top surface of the node housing and may be configured to allow receptacle prongs of a coupled receptacle to contact node connectivity components to provide power to the coupled receptacle. In various implementations, a raceway may include at least two of node segments. The raceway may be configured such that one or more of the node segments are capable of providing power to the coupled one or more receptacles when one or more other node segments are and/or are not coupled to at least one of the receptacles.

Implementations may include one or more of the following features. The raceway may include cover(s) disposed over at least a portion of one or more of the segments. A cover may extend beyond a single segment, in some implementations. A cover and a receptacle may cover exposed top portions of the raceway housing to inhibit entry of dust, debris and/or fluid into the one or more cavities of the raceway. The raceway may include one or more communication connectivity cables. Communication connectivity cables may be directly or indirectly coupled to a communication connectivity source. The communication connectivity cable(s) may be disposed in the cavities of one or more segments such that communication connectivity can be provided to one or more receptacles coupled to at least one of the communication connectivity cables. A node segments may provide electrical connectivity and communications connectivity. In some implementations, a raceway housing may include both power cables and communication connectivity cables. The raceway housing of a segment may include a cable coupling member adapted to retain at least one of the communication connectivity cables. The raceway housing of a segment may include one or more wire clip coupling members. A wire clip may couple with at least one of the wire clip coupling members. A wire clips may be adapted to retain at least one of the communication connectivity cables (e.g., by retaining cables in a lumen between the wire clip body and the base of the raceway housing). In some implementations, a receptacle may include sockets for power and/or communication connectivity. A first receptacle coupled to a first node segment may provide sockets for power connectivity and a second receptacle coupled to the first node segment may provide sockets for communication connectivity, in some implementations. Receptacle(s) may be coupled to at least one of the node segments. A receptacle may include any appropriate receptacle such as a receptacle capable of providing power connectivity and/or data connectivity. A receptacle may include a modular tower receptacle. A segment may include a male connector and/or a female connector. The female connector disposed on one of the segments may receive at least a portion of the male connector disposed on another one of the segments such that the segments are coupled together. The prongs of the male connector may allowed the male connector to mate with the female connector (e.g., the prong(s) may be received in recesses of the female connector) when the male connector is oriented in a first position and/or inhibited from mating with the female connector when the male connector is oriented in a second position (e.g., a second position that is an approximately 180 rotation of the male connection in the first position). In some implementations, node segment(s) may include 4, 6, and/or 8 access points. At least three prongs of a first receptacle may be disposed at least partially in least three of the access points of one of the node segments and/or at least three prongs of a second receptacle may be at least partially disposed in at least three other access points in the one of the node segments. The first receptacle and the second receptacle may be on different circuits (e.g., to allow flexibility, to inhibit overload, to comply with industry and/or government regulation, etc.). A raceway housing may include at least one protrusion that elevates portions of the raceway disposed on the protrusion(s) to inhibit water damage. The raceway may couple with furniture (e.g., desks, tables, bookcases, media stands, WIFI hubs, etc.) to provide power and/or communication connectivity to the furniture.

In various implementations, a modular raceway kit may be provided. A user may select components from the raceway kit and assemble a raceway. Due to the modularity of the raceway kit, a user may be capable of redesigning the assembled raceway based on changing needs (e.g., increase accessibility, changing function of a room, etc.) and/or to provide maintenance and/or repair. The raceway kit may include one or more segments. Segments may include node segments, connectivity segments, and/or extenders. The connectivity segments and/or the node segments may be configured such that one or more of the node segments are capable of providing power to the coupled one or more receptacles when one or more other node segments are and/or are not coupled to at least one of the receptacles.

Implementations may include one or more of the following features. A connectivity segment may include a power segment and/or a communications segment. A node segment may include at least one female connector, a connectivity segment may include at least one male connector, and/or an extender may include a male connector at a first end and a female connector at a second end. In some implementations, a node may include a male connector and/or a connectivity segment may include a female connector. A segment may include a male connector at one end and a female connector at a second end, in some implementations. A female connectors may be capable of receiving at least a portion of a male connector (e.g., to facilitate coupling of the segments). Coupling a female connector of one of the node segments to a male connector of one of the connectivity segment may provide power to the coupled node segment (e.g., with out additional power cable coupling, such as hardwiring). The modular raceway kit may include cover(s). Walls of a cover are configured to contact the two side walls of a raceway housing and contact on a base of the raceway housing. The modular raceway kit may include receptacles and/or adapters to facilitate providing connectivity from the raceway to an device (e.g., server, computer, phone, etc.) and/or an object (e.g., furniture). The modular raceway kit node segment may be configured such that at least two of the node segments and at least one of the connectivity segments is coupled to provide an assembled raceway. The assembled raceway may be modified by adding, replacing, and/or removing one or more of the segments.

In various implementations, a raceway may include segments. The segments may be coupled together to assemble the raceway. A segment may include a raceway housing. A raceway housing may include a first side disposable on a floor and a second opposing side. The second opposing side may include a base and two side walls disposed proximate ends of the base. One or more cavities may be disposed between the side walls. A segment of the raceway may include connectivity segments, such as a power segment. A power segment may include a case and power cables disposed at least partially in the case. The case may be disposed at least partially in one of the cavities of one of the raceway housings. At least one lumen may be formed between the case and the second opposing side of the one of the raceway housings. Power cable(s) of the power segment may be directly or indirectly coupled to a power source. Segments may include node segment(s). A node segment may couple with one or more receptacles such that power and/or data is provided from the node segment to the coupled receptacle(s). A node segment may include a node housing disposed at least partially in one of the cavities of one of the raceway housings. The node segment may be coupled to at least one of the power and/or communication connectivity segments such that connectivity (e.g., power and/or communication connectivity) is provided to the node segment. The node segment may include node connectivity component(s) such that when the node segment is coupled to at least one of the power segments via the one or more node connectivity component(s) power is provided to the node segment. A node segment may include at least three access points (e.g., 6, 8, etc.). An access point may be disposed through a top surface of the node housing and may be configured to allow receptacle prongs of a coupled receptacle to contact node connectivity components to provide power to the coupled receptacle. In various implementations, a raceway may include at least two of node segments. The raceway may be configured such that one or more of the node segments are capable of providing power to the coupled one or more receptacles when one or more other node segments are and/or are not coupled to at least one of the receptacles.

Implementations may include one or more of the following features. The raceway may be provided as a kit. A user may select components of the kit and couple various segments to assembly the raceway. A user may be able to assemble the raceway by coupling male and female connectors of the segments without other tooling. In some implementations, fasteners may be utilized to couple the raceway and/or components thereof to a location. The raceway may include cover(s) disposed over at least a portion of one or more of the segments. A cover may extend beyond a single segment, in some implementations. A cover and a receptacle may cover exposed top portions of the raceway housing to inhibit entry of dust, debris and/or fluid into the one or more cavities of the raceway. The raceway may include one or more communication connectivity cables. Communication connectivity cables may be directly or indirectly coupled to a communication connectivity source. The communication connectivity cable(s) may be disposed in the cavities of one or more segments such that communication connectivity can be provided to one or more receptacles coupled to at least one of the communication connectivity cables. A node segments may provide electrical connectivity and communications connectivity. In some implementations, a raceway housing may include both power cables and communication connectivity cables. The raceway housing of a segment may include a cable coupling member adapted to retain at least one of the communication connectivity cables. The raceway housing of a segment may include one or more wire clip coupling members. A wire clip may couple with at least one of the wire clip coupling members. A wire clips may be adapted to retain at least one of the communication connectivity cables (e.g., by retaining cables in a lumen between the wire clip body and the base of the raceway housing). In some implementations, a receptacle may include sockets for power and/or communication connectivity. A first receptacle coupled to a first node segment may provide sockets for power connectivity and a second receptacle coupled to the first node segment may provide sockets for communication connectivity, in some implementations. Receptacle(s) may be coupled to at least one of the node segments. A receptacle may include any appropriate receptacle such as a receptacle capable of providing power connectivity and/or data connectivity. A receptacle may include a modular tower receptacle.

In some implementations, a segment may include quick connectors such as a male connector and/or a female connector. The female connector disposed on one of the segments may receive at least a portion of the male connector disposed on another one of the segments such that the segments are coupled together. The prongs of the male connector may allowed the male connector to mate with the female connector (e.g., the prong(s) may be received in recesses of the female connector) when the male connector is oriented in a first position and/or inhibited from mating with the female connector when the male connector is oriented in a second position (e.g., a second position that is an approximately 180 rotation of the male connection in the first position). The male connector and/or female connector may include connectivity components (e.g., electrical bars, cables, contacts, leads, etc.) such that when the prongs of the male connector are received by the recesses of the female connector, the connectivity components of the male and female connector contact and allow power and/or communication connectivity to be provided through the connection. Thus, connectivity may be provided from one segment (e.g., directly and/or indirectly coupled to a connectivity source) to another coupled segment.

In some implementations, node segment(s) may include 4, 6, and/or 8 access points. At least three prongs of a first receptacle may be disposed at least partially in least three of the access points of one of the node segments and/or at least three prongs of a second receptacle may be at least partially disposed in at least three other access points in the one of the node segments. The first receptacle and the second receptacle may be on different circuits (e.g., to allow flexibility, to inhibit overload, to comply with industry and/or government regulation, etc.). The access points associated with a circuit in a multi-circuit node may or may not be adjacent to each other. In some implementations, a node one of the access points a ground. In some implementations, the recesses of the access points may allow access to electrical bars disposed below the recesses (e.g., in the node housing) such that prongs received by the access point contact the electrical bars. The electrical bars may be coupled to electrical bars in connectors (e.g., male and/or female) proximate ends of the node via wires, in some implementations.

In some implementations, connectors proximate ends of the segments may include electrical bars (e.g., that are configured to contact electrical bars of a coupled segment). The electrical bars in opposing ends of a segment may be coupled together via wires.

In some implementations, the raceway may include segments such as extenders. An extender may be capable of coupling with one of the segments and retaining the same type of coupling member as the one of the segments, in some implementations. For example, an extender may include a male connector at a first end and a female connector at a second end. Thus, when the extender couples with a male connector (via the female connector), the end of the combined segment is the same type of connector as the segment originally had (e.g., male connector).

In some implementations, A raceway housing may include at least one protrusion that elevates portions of the raceway disposed on the protrusion(s) to inhibit water damage. The raceway may couple with furniture (e.g., desks, tables, bookcases, media stands, WIFI hubs, etc.) to provide power and/or communication connectivity to the furniture.

In various implementations, a raceway may be provided to provide connectivity (e.g., along a length of the raceway, to coupled receptacles, to devices and/or furniture plugged into receptacles, etc.). The raceway may include one or more segments.

A segment may have a housing that includes a base. The base may include a first side that is disposed proximate a location for installation and a second opposing side. The base may have a first side and a second side, and a length. The cross-section of the base along the length may not be uniformly shaped, in some implementations.

The housing may include two side walls extending from the base of the housing. One side wall may be disposed proximate the first side of the base, and the other side wall may be disposed proximate the second side of the base. A cavity may reside between the two side walls. A side wall may include a first end coupled to the base and an opposing end. The side wall may include a first curved section disposed at a first distance from the second end of the side wall and/or a second curved section disposed at a second distance from the first curved section. A side wall may include a first straight section disposed between the first curved section and the second curved section and/or a second straight section disposed between the second curved section and the first end of the side wall. The first straight section and the second straight section may be approximately parallel to each other. The first straight section and/or the second straight section may be approximately perpendicular to the base, in some implementations. The second straight sections on opposing walls may be disposed farther apart than the first straight sections on opposing sides. The wider set second straight sections may provide additional room for cabling and/or portions to facilitate coupling with other components of the raceway (e.g., node housings, wire clips, and/or power track casings). The side wall may include third curved section and a fourth curved section, and the second straight section may be disposed between the third curved section and the fourth curved section.

The second end of a side wall may be disposed below at least a portion of the first curved section such that a gap is created between the side wall and a cover of the raceway. The gap may allow a tool to be disposed between a flange of the cover and the side wall to remove the cover from the raceway. The outer portion of a side wall may include a curvature, in some implementations. The outer portion of the side wall may include an outer curved section. The outer curved section may be utilized to facilitate coupling with other parts of the raceway such as coupling with ramps, other segments (e.g., disposed in parallel), etc.

At least a portion of the side wall may be flexible. As a cover is inserted into the housing, the side wall or portion thereof may deflect to allow the cover to contact the base of the housing. The deflected side wall may then exert a force on the walls of the cover to retain the cover in place and/or inhibit fluids and/or debris from entering the cavity of the housing. As another example, as a power track housing and/or wire clip may be pushed into position in the cavity of the housing, one or more of the side walls may deflect to allow the power track housing and/or wire clip to be disposed in a specified position.

The housing of the segment may include at least one cavity disposed between the two side walls. A cavity may be capable of receiving a power track, cables (e.g., power and/or data), and/or conduit to provide connectivity. The cavity may be capable of receiving additional housings such as power track housings and/or node housings.

In some implementations, the first curved section and the second curved section may be angularly curved and/or have a smooth curve. The straight sections may be approximately straight.

The raceway may include at least one cover. The cover may couple with the housing of the segment of the raceway. A cover may include two walls extending from an inner side of the cover. A wall of the cover may be disposed such that when the cover is inserted into the raceway, the wall is disposed on the base of the housing of the segment of the raceway such that force exerted on the cover (e.g., from people walking on the raceway, from objects being disposed on the raceway, etc.) is at least partially transferred to the base of the housing of the segment of the raceway. At least a portion of the first straight sections of the side walls may guide the position of and may contact the side walls of the cover, when the cover is inserted in the housing. The cover may include one or more flanges extending from ends of the cover. The flanges may inhibit damage to the raceway. A gap may reside between the one or more flanges of the cover and the side walls of the housing and this gap may be utilized to remove the cover (e.g., to access the cavity of the raceway, to couple a receptacle, etc.).

The housing of the segment of the raceway has a height of less than approximately 1 inch and/or a width of less than approximately 3 inches.

The raceway may include a first ramp coupled to the first side of the base and a second ramp coupled to the second side of the base. The ramps may include any appropriate ramp. In some implementations, ramps may not be utilized with the raceway.

In some implementations, the segment may be a power track and the raceway may include a power track disposed in the cavity of the housing. The power track may be coupled to the housing of the segment of the raceway. The power track may include a housing with a cavity and cables and/or conduit to provide connectivity may be disposed in the power track (e.g., in the cavity in the housing of the power track). The power track housing may include at least one flange that extends from the walls of the cavity. A flange may include at least one curvature and/or protrusion to mate and/or match with the curvature of the side walls (e.g., the fourth curved section of the side wall). The walls of the cavity of the power track housing may include coupling members to facilitate coupling with wire clips and/or other components disposed in the cavity of the raceway housing. The power track may be coupled to the housing of the segment of the raceway. The raceway may include additional cable(s) to provide connectivity and the additional cable(s) to provide connectivity may be disposed outside the power track (e.g., in the housing of the segment and outside the housing of the power track). The power track may include connectors disposed at the ends of the power track housing. The connectors may include male and/or female connectors. Wiring may be at least partially utilized to transmit connectivity through the power track. The connectors may include channels at each end and/or proximate the middle in which one or more bus bars are at least partially disposed. Wiring may be coupled to ends of bus bars at each end (e.g., to connect bus bars at opposing ends). Thus, connectivity may be transmitted through the power track.

The raceway segment may include a node. The node may include a node housing disposed in the cavity of the housing. The node housing may be coupled to the housing of the segment of the raceway and/or cables and/or conduit to provide connectivity is be disposed in the node housing. The walls of the cavity (e.g., that house the wiring in the node) of the node housing may include coupling members to facilitate coupling with wire clips and/or other components disposed in the cavity of the raceway housing. The node housing may be coupled to the housing of the segment of the raceway. The node may include connectors disposed at the ends of the node housing. The connectors may include male and/or female connectors. Wiring may be at least partially utilized to transmit connectivity through the node. The node housing may include channels at each end and/or proximate the middle of the housing. Bus bars may be disposed in channels at each end and/or proximate the middle of the housing. Although channels are described as being proximate the middle of the node housing, other positions for the intermediate channels (e.g., which will be accessible via access points) may be utilized. Wiring may connect bus bars (e.g., at each end of the node and/or proximate the middle of the housing) to transmit connectivity at least partially through the node.

The node housing may include at least three access points. At least one of the access points may be coupled to a ground wire. An access point may be disposed through a top surface of the node housing and may provide access to bus bars disposed in intermediate channels (e.g., proximate a middle of the node). An access point may allow at least three receptacle prongs of at least one coupled receptacle to contact at node connectivity components via the access points to provide power to the at least one coupled receptacles. In some implementations, access points may be designed such that insertion of a standard electrical plug (e.g., 2 prong and/or 3 prong) into the access point will not provide connectivity to the plug. For example, the access point recesses may be to narrow and/or too deep for a standard electrical plug. As another example, protrusions proximate bus bars may inhibit a standard electrical plug from mating with the bus bars.

In some implementations, the housing of the raceway may include a set of receivers disposed in the housing, such as proximate the node housing. The set of receivers may mate with protrusions on coupled receptacles, devices, and/or furniture. The set of receivers may be configured such that one orientation of a mating of one of the housings in a segment (e.g., node housings) and a components (e.g., one of the coupled receptacles, furniture, device, etc.) is allowed and at least one orientation of the mating of is restricted. Restricting some orientations may inhibit overloads and/or creation of problematic circuits. Orientation may be allowed and/or restricted during mating by shapes, openings, and/or sizes of receivers in the set of receivers.

The raceway may include receptacles coupleable to the raceway. A receptacle may be coupleable to at least one node housing via the access points. The receptacle may include prongs that extend downward and can pass through the access points (e.g., for coupling to bus bars in the node). The receptacle or portions thereof (e.g., protrusions) may couple with the set of receivers, be screwed to a location, and/or otherwise secured. In some implementations, the receptacle may snap onto node housing. Coupling the receptacles to the at least one node housing provides connectivity via ports on the receptacles.

The raceway may include one or more wire clips, in some implementations. A wire clip may include a base with a first cavity to receive a power track and at least one coupling member disposed on at least one wall of the cavity. The coupling member of the wire clip may couple with a part of an outer surface of a power track and/or a part of an outer surface of a node housing. The wire clip may include one or more flanges disposed at an end of the base of the wire clip. A flange may fold to create a secondary cavity between walls of the flange and the base that is separate from the first cavity. The secondary cavity may receive a power track, cables, and/or conduit to provide connectivity.

The housing of the segment of the raceway may include at least one male connector and/or at least one female connector. The male connector of a first segment and the female connector of a different segment of the raceway may be configured to couple with each other. The connectors may be fixed in position and/or adjustable. For example, a connector may include an extending member that allows the connector to move along a length of the segment. Utilizing adjustable length connectors may facilitate removal and/or insertion of segments in existing raceway configurations and/or in obtaining a desired location of a segment (e.g., since a piece may be shortened and/or extended using the extending members). A segment may include the same connector and/or different connectors at each end of the segment.

A male connector may include a first side, a second opposing side; two arms, and one or more flanges. A first arm may be disposed on the first side of the male connector and the second arm may be disposed on the second side of the male connector. An arm may be coupled at one end to the housing and a flange at the other end of the arm. The flange may extend from the arm and is configured to couple with a ledge of a female connector to inhibit accidental release. The male connector may include a set of protrusions (e.g., 8). One or more of the protrusions in the set of protrusions may be approximately C shaped. In some implementations, at least one of the protrusions may not be different than other protrusions such that the male connector may mate in one direction and be restricted from mating in a different direction (e.g., rotated 180 degrees). The protrusions may be created by channels extending at least partially through the node housing. A bus bar may be disposed in at least one of channels and maybe coupled to a wiring to transmit connectivity. The bus bars of a male connector and a female connector may contact to transmit power and/or other connectivity between the connectors and thus their respective segments.

A female connector may include a first side, a second opposing side, and at least one ledge on the first side and second side. A ledge may couple with a flange extending from an arm of a female connector to inhibit accidental release (e.g., the flange may latch onto the ledge). The female connector may include a set of recesses. One or more of the recesses in the set of protrusions may be approximately C shaped. In some implementations, at least one of the recesses may not be different than other recesses such that the female connector may mate in one direction and be restricted from mating in a different direction (e.g., rotated 180 degrees). The recesses may be created by channels extending at least partially through the node housing. A bus bar may be disposed in at least one of channels and is coupled to a wiring to transmit connectivity.

In various implementations, a raceway may be provided to provide connectivity. The raceway may include one or more segments. A housing of a segment of a raceway may include a base and two side walls. The base may include a first side, a second side, and a length. A side wall may extend from the base of the housing. One of the side walls arms may be disposed proximate the first side of the base, and the other side wall may be disposed proximate the second side of the base. A side wall may include a first end coupled to the base and a second opposing end. The side wall may include one or more coupling members. A coupling member may extend from one end of a side wall to another end of the side wall (e.g., along a length of the wall) and/or coupling member(s) may be segments that are disposed along a length of the segment housing. A coupling member may include a first end disposed proximate to the base and a second opposing end disposed proximate a second end of the side wall. The coupling member may include a first curved section disposed proximate the second end of the coupling member and a second curved section disposed at a second distance from the first curved section. The coupling member may include a first straight section disposed between the first curved section and the second curved section. At least one recess may be disposed in the first curved section. A recess may extend from the second end of the coupling member. A recess may create at least one gap between the coupling member and a cover of the raceway (e.g., which may allow a tool to be disposed between a flange of the cover and the side wall to remove the cover from the raceway). The side wall may include a second straight section disposed between the second curved section and the first end of the coupling member. The first straight section and the second straight section may be approximately parallel to each other and/or the first straight section and the second straight section may be approximately perpendicular to the base. The housing of the segment of the raceway may include a cavity disposed between the two side walls. The cavity may receive a power track, cables, and/or conduit to provide connectivity.

In various implementations, the side wall may include a plurality of coupling members, and two or more of the coupling members of the side wall may be separated from each other by a second distance. The housing of the segment of the raceway may include a first side, second opposing side proximate the side walls, a third side disposed between the first side and the second side, and a fourth side opposing the third side and disposed between the first side and the second side. A side wall may include one coupling member that extends from proximate the third side to proximate the fourth side of the housing of the segment of the raceway. The raceway may include a power track disposed in the cavity of the housing of the segment of the raceway. The raceway housing may be linear, angled, and/or approximately T-shaped. The base of the housing may include one or more protrusions that extend from the base into the cavity of the segment of the raceway. A protrusion may inhibit crushing of cabling disposed in the cavity during use and/or may receive a fastener via an opening in the protrusion. The fastener may at couple the segment of the raceway to a location and/or couple a cover to the segment of the raceway.

The raceway may provide connectivity to devices, objects, and/or furniture via receptacles in some implementations. A receptacle may include prongs that extend from a lower surface of the receptacle and can be insertable access points of a node. The prongs may couple with bus bars in intermediary channels of the node, in some implementations. The receptacle may include ports and/or sockets that couple with sockets and/or ports on the node to provide connectivity. The receptacle may include a housing that includes a skirt. The skirt may at least partially circumscribe the receptacle. The skirt may include legs that are coupleable with the side walls of a segment of a raceway and/or housings such as power track housings and/or node housings. The skirt may be adjustable in height. The skirt may include protrusions that mate with and/or couple with the second straight sections of the side walls of the housing. The legs (e.g., on which the protrusions may be disposed) may be at least partially flexible such that the legs may deflect upon insertion of the receptacle in the housing of the segment. The legs may be segmented and/or extend the length and/or width of the receptacle. In some implementations, a device and/or furniture may directly plug via a raceway plug into a node. The raceway plug may have a body and prongs extending from the body. The prongs may be capable of accessing bus bars and/or other connectivity couplers disposed in a node via access points.

In various implementations, the raceway may be easy to install and maintain due to use of segments in the raceway. For example, since a single path of wiring is not extended through the entire raceway, but rather wiring for connectivity terminates at each end of a segment, segments may be easily added and/or removed. The segments may be self contained units, in some implementations, and allow a user to plug segments together without hardwiring internal components each time. Maintenance may be facilitated since individual segments can be replaced without splicing wiring (e.g., since connectors would instead be uncoupled).

In various implementations, the raceway may provide an encased power raceway.

In various implementations, the direction of mating of one or more of the components may be controlled. The raceway may allow mating of components in a first direction and may restrict mating in at least one other direction (e.g., rotation 180 degrees). For example, a housing of a raceway segments may include keys (e.g., protrusions and/or recesses at ends of the length of the segment) to control mating direction. As another example, a male connector may be utilized at a first end and a female connector may be utilized at a second end to control mating direction. As another non-limiting example, the protrusions and/or recesses of connectors may be designed to restrict some coupling orientations (e.g., a flipped C protrusion and/or recess at an end of a set of protrusions and/or recesses). As another example, a protrusion may extend farther than one or more other protrusions and/or a recesses may be deeper than one or more other recesses. Restricting some mating orientations may increase safety (e.g., so components are not overloaded, shorted, and/or live wires are uncoupled) and facilitate assembly of a raceway In various implementations, the raceway and/or portions thereof (e.g., nodes, receptacles, covers, etc.) may be water resistant (e.g., to comply with codes) and/or inhibit fluids from entering power cabling (e.g., wires, bus bars, etc.) and/or data cabling.

In various implementations, a raceway may be capable of providing power connectivity and/or data connectivity. Power and/or data connectivity may be provided (e.g., to ports of receptacles, devices, furniture, etc.) by the raceway. The raceway may be installed in a location as described herein. A kit may be utilized to assemble the raceway. In some implementations, the kit may include a plurality of power tracks, nodes, end caps, and/or other components and a user may select the components for the raceway based on the location and needs of the location. Since the raceway is modular the raceway configuration may be easily modified, as desired by a user. An article of furniture may have power and/or data connectivity from a raceway, in some implementations.

In some implementations, data connectivity may be provided over power cabling.

U.S. Pat. No. 9,960,554 and U.S. patent application Ser. No. 15/967,455 are incorporated by reference herein to the extent that their teachings do not conflict with the disclosure herein.

Although directions have been described (e.g., top, bottom, front), the directions are intended to convey relative direction when compared to another part and not orientation with respect to a user and/or a floor.

Although users have been described as a human, a user may be a person, a group of people, a person or persons interacting with one or more computers, and/or a computer system.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a connector" includes a combination of two or more connectors and reference to "a cabling" includes different types and/or combinations of ports. For example, a connector may include a key and socket connector and flange and protrusion (e.g., onto which a flange may be disposed around for coupling) connector.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A raceway to provide connectivity, the raceway comprising:
   one or more node segments, wherein each of the node segments of the raceway comprises
      a housing, wherein the housing comprises:
         a base, wherein the base comprises: a first side, a second side, and a length;
         two side walls extending from the base of the housing, wherein one of the side walls is disposed proximate the first side of the base, and wherein the other side wall is disposed proximate the second side of the base, and wherein each side wall comprises:
            a first end coupled to the base;
            a second opposing end;
            a first curved section disposed at a first distance from the second end of the side wall;
            a second curved section disposed at a second distance from the first curved section;
            a first straight section disposed between the first curved section and the second curved section;
            a second straight section disposed between the second curved section and the first end of the side wall;
            wherein the first straight section and the second straight section are approximately parallel to each other, and wherein the first straight section and the second straight section are approximately perpendicular to the base;
            and wherein the second end of the side wall is disposed below at least a portion of the first curved section such that a gap is created between the side wall and a cover of the raceway, and wherein the gap allows a tool to be disposed between a flange of the cover and the side wall to remove the cover from the raceway; and
            wherein at least a portion of the side wall is flexible; and
         a cavity disposed between the two side walls, wherein the cavity is capable of receiving at least one of a power track, cables, or conduit to provide connectivity; and
      a node housing disposed in the cavity of the housing, wherein the node housing is coupled to the housing, and wherein at least one of the cables or the conduit to provide connectivity is be disposed in the node housing, and wherein the node housing comprises at least three access points, wherein each access point is disposed through a top surface of the node housing and is configured to allow at least three receptacle prongs of at least one coupled receptacle to contact node connectivity components via the access points to provide power to the at least one coupled receptacles.

2. The raceway of claim 1 further comprising at least one cover configured to couple with the housing of the segment of the raceway; wherein the cover comprises two walls extending from an inner side of the cover; wherein each of the walls is disposed such that when the cover is inserted into the raceway, each of the walls is configured to be disposed on the base of the housing of the segment of the raceway such that force exerted on the cover is at least partially transferred to the base of the housing of the segment of the raceway, and wherein at least a portion of the first straight sections of the side walls guides the position of and contacts the side walls of the cover when the cover is inserted in the housing.

3. The raceway of claim 1 further comprising the cover, wherein the cover comprises one or more flanges extending from ends of the cover, wherein the flanges may inhibit damage to the raceway, and wherein the gaps may reside between the one or more flanges of the cover and the side walls of the housing.

4. The raceway of claim 1 further comprising a set of receivers disposed proximate the node housing, wherein the set of receivers are configured to mate with protrusions on the coupled receptacles, wherein the set of receivers are configured such that one orientation of a mating of one of the node housings and one of the coupled receptacle is allowed and at least one orientation of the mating of the one of the node housings and the one of the coupled receptacle is restricted.

5. The raceway of claim 1 further comprising:
one or more receptacles coupleable to the raceway, wherein each of the receptacles are coupleable to at least one node housing via the access points, and wherein coupling the one or more receptacles to the at least one node housing provides connectivity via ports on the one or more receptacles.

6. The raceway of claim 5 further comprising one or more wire clips, wherein each wire clip comprise:
a base with a first cavity to receive a power track;
at least one coupling member disposed on at least one wall of the cavity, wherein the at least one coupling member is configured to couple with at least one of:
a part of an outer surface of a power track
or a part of an outer surface of a node housing;
one or more flanges, wherein each flange is disposed at an end of the base of the wire clip, and wherein the flange is capable of folding to create a secondary cavity between walls of the flange and the base that is separate from the first cavity, and wherein the secondary cavity is capable of receiving at least one of a power track, cables, or conduit to provide connectivity.

7. The raceway of claim 1 wherein each side wall includes a plurality of coupling members, wherein two or more of the coupling members of the side wall are separated from each other by a second distance.

8. A raceway to provide connectivity, the raceway comprising:
one or more segments, wherein each segment of the raceway comprises:
a housing, wherein the housing comprises:
a base, wherein the base comprises: a first side, a second side, and a length;
two side walls extending from the base of the housing, wherein one of the side walls is disposed proximate the first side of the base, and wherein the other side wall is disposed proximate the second side of the base, and wherein each side wall comprises:
a first end coupled to the base;
a second opposing end;
a first curved section disposed at a first distance from the second end of the side wall;
a second curved section disposed at a second distance from the first curved section;
a first straight section disposed between the first curved section and the second curved section;
a second straight section disposed between the second curved section and the first end of the side wall;
wherein the first straight section and the second straight section are approximately parallel to each other, and wherein the first straight section and the second straight section are approximately perpendicular to the base;
and wherein the second end of the side wall is disposed below at least a portion of the first curved section such that a gap is created between the side wall and a cover of the raceway, and wherein the gap allows a tool to be disposed between a flange of the cover and the side wall to remove the cover from the raceway; and
wherein at least a portion of the side wall is flexible; and
a cavity disposed between the two side walls, wherein the cavity is capable of receiving at least one of a power track, cables, or conduit to provide connectivity; and
at least one male connector, wherein the at least one male connector is configured to couple with at least one female connector of a different segment of the raceway, wherein each male connector comprises:
a first side and a second opposing side;
two arms, wherein one arm is disposed on the first side and the second arm is disposed on the second side of the male connector, and wherein each arm is coupled at one end to the housing, and wherein each arm includes a flange at the other end of the arm, wherein the flange extends from the arm and is configured to couple with a ledge of a female connector to inhibit accidental release; and
a set of protrusions, wherein one or more of the protrusions in the set of protrusions is approximately C shaped, and wherein the protrusions are created by channels extending at least partially through the node housing, and wherein a bus bar is disposed in at least one of channels and is coupled to a wiring to transmit connectivity.

9. The raceway of claim 8 wherein the first curved section and the second curved section are angularly curved.

10. The raceway of claim 8 wherein the housing of the segment of the raceway has a height of less than approximately 1 inch and a width of less than approximately 3 inches.

11. The raceway of claim 8 further comprising a first ramp coupled to the first side of the base and a second ramp coupled to the second side of the base.

12. The raceway of claim 8 further comprising:
a power track disposed in the cavity of the housing, wherein the power track may be coupled to the housing of the segment of the raceway, and wherein the at least one of the cables or the conduit to provide connectivity is disposed in the power track; and
one or more additional cables to provide connectivity, wherein the one or more additional cables to provide connectivity may be disposed outside the power track.

13. The raceway of claim 8 wherein the housing of the segment of the raceway comprises:
a first side and second opposing side proximate the side walls;
a third side disposed between the first side and the second side;
and a fourth side opposing the third side and disposed between the first side and the second side, wherein each side wall comprises one coupling member that extends from proximate the third side to proximate the fourth side of the housing of the segment of the raceway.

14. The raceway of claim 8 wherein the raceway includes a power track disposed in the cavity of the housing of the segment of the raceway.

15. The raceway of claim 8 wherein the housing is linear, angled or approximately T-shaped.

16. A raceway to provide connectivity, the raceway comprising:
one or more segments, wherein each segment of the raceway comprises:

a housing, wherein the housing comprises:
  a base, wherein the base comprises: a first side, a second side, and a length;
  two side walls extending from the base of the housing, wherein one of the side walls is disposed proximate the first side of the base, and wherein the other side wall is disposed proximate the second side of the base, and wherein each side wall comprises:
    a first end coupled to the base;
    a second opposing end;
    a first curved section disposed at a first distance from the second end of the side wall;
    a second curved section disposed at a second distance from the first curved section;
    a first straight section disposed between the first curved section and the second curved section;
    a second straight section disposed between the second curved section and the first end of the side wall;
    wherein the first straight section and the second straight section are approximately parallel to each other, and wherein the first straight section and the second straight section are approximately perpendicular to the base;
    and wherein the second end of the side wall is disposed below at least a portion of the first curved section such that a gap is created between the side wall and a cover of the raceway, and wherein the gap allows a tool to be disposed between a flange of the cover and the side wall to remove the cover from the raceway; and
  wherein at least a portion of the side wall is flexible; and
  a cavity disposed between the two side walls, wherein the cavity is capable of receiving at least one of a power track, cables, or conduit to provide connectivity; and
  at least one female connector, wherein the at least one female connector is configured to couple with at least one male connector of a different segment of the raceway, and wherein each female connector comprises:
    a first side and a second opposing side;
    at least one ledge on the first side and second side, wherein the at least one ledge is configured to couple with a flange extending from an arm of a female connector to inhibit accidental release; and
    a set of recesses, wherein one or more of the recesses in the set of recesses is approximately C shaped, and wherein the recesses are created by channels extending at least partially through the node housing, and wherein a bus bar is disposed in at least one of channels and is coupled to a wiring to transmit connectivity.

17. The raceway of claim 16 further comprising a power track disposed in the cavity of the housing, wherein the power track may be coupled to the housing of the segment of the raceway, and wherein the at least one of the cables or the conduit to provide connectivity is be disposed in the power track.

18. The raceway of claim 16 wherein the housing is linear, angled or approximately T-shaped.

19. The raceway of claim 16 wherein the first curved section and the second curved section are angularly curved.

20. The raceway of claim 16 wherein each side wall includes a plurality of coupling members, wherein two or more of the coupling members of the side wall are separated from each other by a second distance.

* * * * *